United States Patent
Matsui et al.

(10) Patent No.: US 12,194,851 B2
(45) Date of Patent: Jan. 14, 2025

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 18/075,922

(22) Filed: Dec. 6, 2022

(65) Prior Publication Data

US 2023/0096047 A1  Mar. 30, 2023

Related U.S. Application Data

(63) Continuation of application No. PCT/JP2021/019532, filed on May 24, 2021.

(30) Foreign Application Priority Data

Jun. 8, 2020 (JP) ................................ 2020-099650

(51) Int. Cl.
*B60K 35/00* (2024.01)
*G02B 27/01* (2006.01)
(Continued)

(52) U.S. Cl.
CPC .......... *B60K 35/00* (2013.01); *G02B 27/0101* (2013.01); *B60K 35/23* (2024.01);
(Continued)

(58) Field of Classification Search
CPC ........ B60K 35/00; B60K 35/23; B60K 35/60; B60K 35/81; B60K 2360/334;
(Continued)

(56) References Cited

U.S. PATENT DOCUMENTS 10,944,955 B2 * 3/2021 Koyama ................ G06V 20/46
2016/0216521 A1 7/2016 Yachida et al.
(Continued)

FOREIGN PATENT DOCUMENTS

JP 2003-283964 10/2003
JP 2010-010925 1/2010
(Continued)

OTHER PUBLICATIONS

International Search Report issued Aug. 3, 2021 in International Application No. PCT/JP2021/019532, with English translation.
(Continued)

*Primary Examiner* — Yuen Wong
(74) *Attorney, Agent, or Firm* — Wenderoth, Lind & Ponack, L.L.P.

(57) ABSTRACT

A display system which controls a display of display content, includes: a processor; and a memory having stored thereon instructions executable by the processor. The instructions include: performing image correction processing involving a change in a display position of the display content based on image correction data stored in advance; detecting an attitude change amount of a moving body; calculating a vibration correction amount of the display position of the display content based on the attitude change amount of the moving body; switching an order of processing between image correction processing involving a change in the display position of the display content and vibration correction processing of correcting the display position of the display content based on the vibration correction amount; and controlling the display position of the display content by performing the image correction processing and the vibration correction processing based on the order of the processing.

20 Claims, 30 Drawing Sheets

(51) Int. Cl.
*B60K 35/23* (2024.01)
*B60K 35/60* (2024.01)
*B60K 35/81* (2024.01)

(52) U.S. Cl.
CPC .............. *B60K 35/60* (2024.01); *B60K 35/81* (2024.01); *B60K 2360/334* (2024.01); *B60K 2360/785* (2024.01); *G02B 2027/011* (2013.01); *G02B 2027/014* (2013.01)

(58) Field of Classification Search
CPC ........ B60K 2360/785; B60K 2360/167; B60K 35/28; G02B 27/0101; G02B 2027/011; G02B 2027/014; B60R 11/02; G09G 5/00; G09G 5/38; H04N 5/74
See application file for complete search history.

(56) References Cited

U.S. PATENT DOCUMENTS

| | | |
|---|---|---|
| 2018/0166002 A1 | 6/2018 | Sako et al. |
| 2019/0025580 A1 | 1/2019 | Nagano et al. |
| 2019/0295508 A1 | 9/2019 | Tsuji et al. |
| 2020/0359008 A1 | 11/2020 | Tanaka et al. |
| 2021/0019867 A1 | 1/2021 | Hayashi et al. |

FOREIGN PATENT DOCUMENTS

| | | |
|---|---|---|
| JP | 2011-090563 A | 5/2011 |
| JP | 2011-154324 | 8/2011 |
| JP | 2012-118211 | 6/2012 |
| JP | 2015-101311 | 6/2015 |
| JP | 2018-097203 | 6/2018 |
| JP | 2019-118004 A | 7/2019 |
| JP | 2019-164317 | 9/2019 |
| JP | 2019-179214 | 10/2019 |
| WO | 2017/134865 | 12/2018 |

OTHER PUBLICATIONS

English translation of International Preliminary Report on Patentability issued Dec. 22, 2022 in International Application No. PCT/JP2021/019532.

Notification of Reasons for Refusal issued Nov. 5, 2024 in corresponding Japanese patent application No. 2022- 530103, with English machine translation, 8 pages.

* cited by examiner

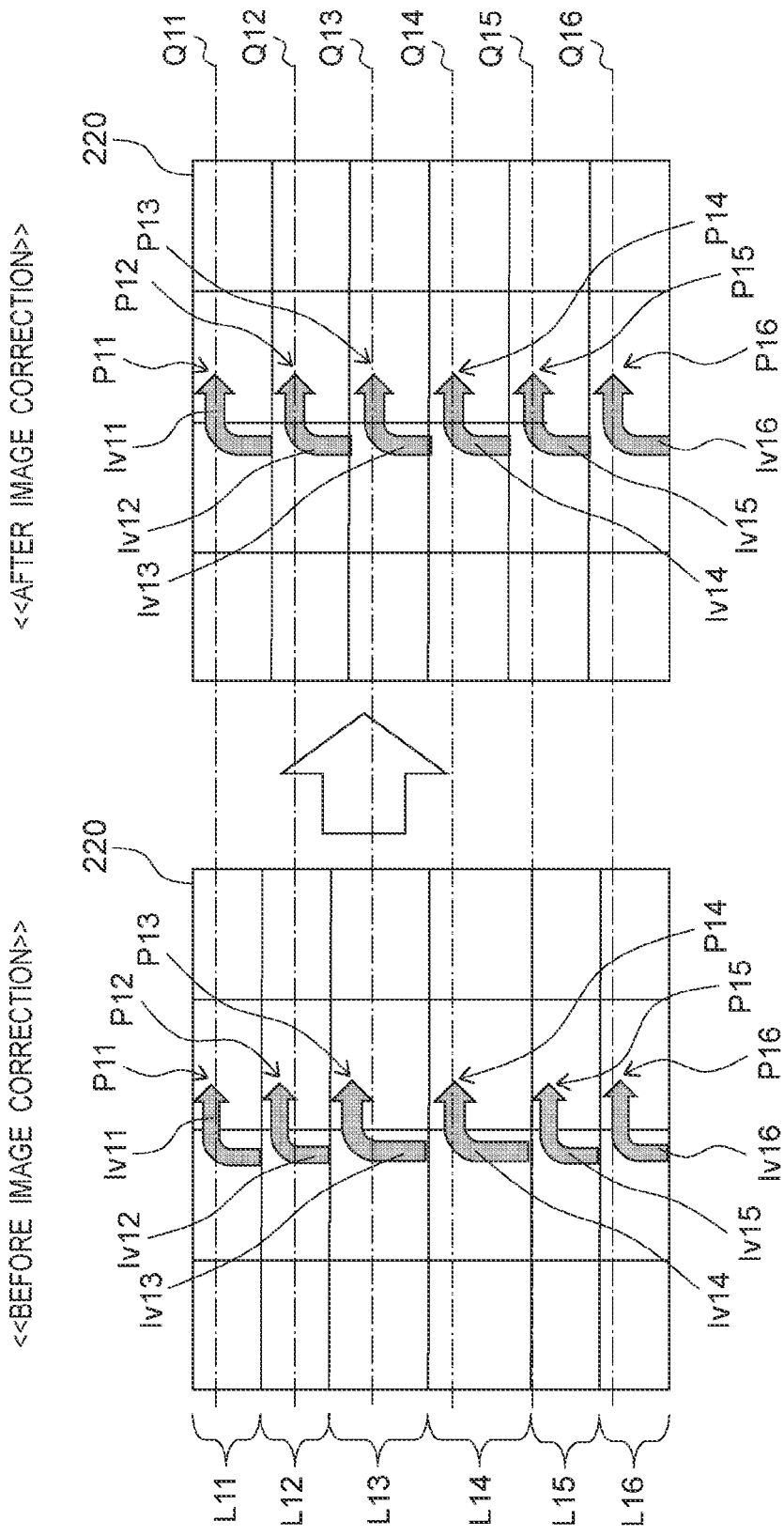

Fig.20

| INITIAL POSITION + ANGULAR DEVIATION AMOUNT AROUND Y-AXIS y [deg.] | IMAGE CORRECTION VALUE IN Z-AXIS DIRECTION Ea [pixel] |
|---|---|
| $\frac{-M}{100} \leqq y < \frac{-(M-1)}{100}$ | Em |
| ... | ... |
| $-0.02 \leqq y < -0.01$ | E101 |
| $-0.01 \leqq y < 0.00$ | E100 |
| $0.00 \leqq y < +0.01$ | E200 |
| $+0.01 \leqq y < +0.02$ | E201 |
| ... | ... |
| $\frac{+(N-1)}{100} \leqq y < \frac{+N}{100}$ | En |

Fig.22

| INITIAL POSITION + DEVIATION CORRECTION AMOUNT IN Z-AXIS DIRECTION G [pixel] | IMAGE CORRECTION VALUE IN Z-AXIS DIRECTION Eb [pixel] |
|---|---|
| $-J \leq G < -(J-1)$ | Ej |
| ... | ... |
| $-2.0 \leq G < -1.0$ | E301 |
| $-1.0 \leq G < 0.0$ | E300 |
| $0.0 \leq G < +1.0$ | E400 |
| $+1.0 \leq G < +2.0$ | E401 |
| ... | ... |
| $+(K-1) \leq G < +K$ | Ek |

DISPLAY SYSTEM

CROSS-REFERENCE TO RELATED APPLICATIONS

This is a continuation application of International Application No. PCT/JP2021/019532, with an international filing date of May 24, 2021, which claims priority of Japanese Patent Application No. 2020-099650 filed on Jun. 8, 2020, the content of which is incorporated herein by reference.

BACKGROUND OF THE INVENTION

1. Technical Field

The present disclosure relates to a display system that controls a display position of display content according to movement of a moving body.

2. Description of Related Art

JP 2015-101311 A discloses a vehicle information projection system that performs augmented reality (AR) display using a head-up display (HUD) device. The HUD device projects light representing a virtual image on a windshield of a vehicle, which allows a viewer being an occupant of the vehicle to visually recognize the virtual image together with an actual view of the outside of the vehicle. For example, a virtual image representing a guide route of the vehicle is displayed in association with a display target (for example, a road) in the actual view. Accordingly, the occupant can check the guide route while visually recognizing the actual view. The vehicle information projection system described in JP 2015-101311 A includes a vehicle speed sensor, and corrects a display position of a virtual image according to acceleration. Accordingly, the occurrence of positional deviation of the virtual image at the time of sudden deceleration and sudden acceleration of the vehicle is suppressed.

SUMMARY

The present disclosure provides a display system that suppresses positional deviation of a display position of display content.

A display system of the present disclosure which controls a display of display content, includes: a processor; and a memory having stored thereon instructions executable by the processor. The instructions include: performing image correction processing involving a change in the display position of the display content based on image correction data stored in advance; detecting an attitude change amount of a moving body; calculating a vibration correction amount of the display position of the display content based on the attitude change amount of the moving body; switching an order of processing between image correction processing involving a change in a display position of the display content and vibration correction processing of correcting a display position of the display content based on the vibration correction amount, and controlling the display position of the display content by performing the image correction processing and the vibration correction processing based on the order of the processing.

These general and specific aspects may be implemented by a system, a method, and a computer program, and a combination thereof.

According to the display system of the present disclosure, positional deviation of the display position of the display content can be suppressed.

BRIEF DESCRIPTION OF THE DRAWINGS

FIG. 5 is an image diagram for illustrating image correction processing;

FIG. 20 is a diagram showing an example of a first correction value table including the first correction value of the image correction assigned to the deviation amount from the initial position of the display content;

FIG. 22 is a diagram showing an example of a second correction value table including the second correction value of the image correction assigned to the deviation correction amount from the initial position of the display content;

DETAILED DESCRIPTION

Knowledge Underlying Present Disclosure

Figure 1:
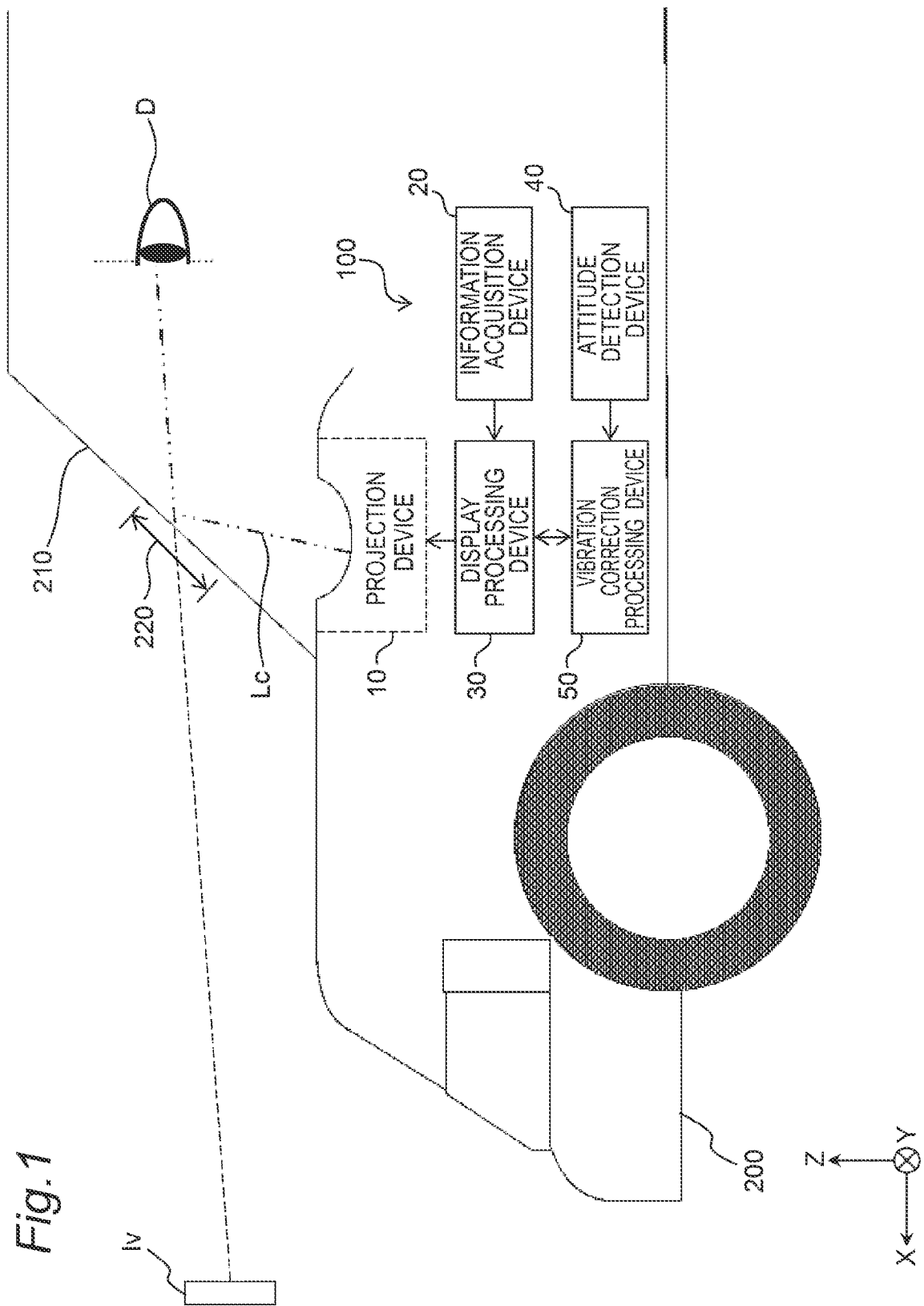
FIG. 1 is a diagram for illustrating a head-up display (HUD).

In a display system, it is known to electronically correct a display position of display content (for example, an arrow, a graphic, a character, or the like) displayed in a display area according to a state (for example, an attitude) of a moving body detected based on an output of a sensor. For example, the display system performs vibration correction processing of correcting the display position of the display content based on the vibration of the moving body detected by the sensor.

In addition, in the display system, when the display content is displayed in a display area, distortion, rotational deviation, or the like may occur in a displayed image. For example, when display content is displayed in front of a windshield of a vehicle being a moving body, distortion of the display content may occur when the display content is reflected off the windshield. Alternatively, the display content may be displayed in an inclined manner due to variations or the like during manufacturing of the display system. Therefore, in the display system, image correction processing of changing the display position of the display content is performed in order to correct distortion, rotational deviation, and the like of the display content.

For example, at the time of manufacture or design, the display system acquires information such as distortion and rotational deviation when the display content is displayed in the display area, and stores image correction data calculated based on the information in the storage. The image correction data includes information on a correction value for correcting a deviation of the display position of the display content such as distortion or rotational deviation. The display system corrects distortion, rotational deviation, and the like by performing image correction processing based on image correction data stored in advance in the storage.

In such a display system, vibration correction processing and image correction processing are performed with the order of processing fixed.

However, in the display system in which the order of the processing is fixed, there is a problem that the correction accuracy of the display position of the display content decreases due to factors such as the traveling status of the moving body and the processing time of the image correction processing. This is a problem newly found by the present inventors.

As an example, a display system that performs image correction processing after performing vibration correction processing will be described. In such a display system, as the processing time of the image correction processing becomes longer, the delay time from the completion of the change in the display position of the display content by the vibration correction processing to the display thereof becomes longer. In addition, there is a limit to an allowable delay time in order to achieve an allowable correction error by the correction processing. For example, even if the delay time from the completion of change in the display position of the display content by the vibration correction processing to the display does not change, as the frequency of the generated vibration increases, the allowable delay time for suppressing the vibration correction error to a certain value or less in the vibration correction processing becomes shorter. As a result, the vibration correction error increases, and the correction accuracy of the vibration correction processing decreases. In order to suppress a decrease in correction accuracy, it is effective to reduce the delay time.

As one method for reducing the delay time when the processing time of the image correction processing is long or when high-frequency vibration is generated, it is conceivable to perform the vibration correction processing after performing the image correction processing. However, the accuracy of the image correction is higher when the image correction processing is performed after the vibration correction processing is performed. When the vibration correction processing is performed always after the image correction processing is performed, it is difficult to improve the correction accuracy of the image correction. In addition, when the processing time of the image correction processing is short or when the high-frequency vibration is not generated, even when the vibration correction processing is performed after the image correction processing is performed, the effect of improving the accuracy of the vibration correction is small. Therefore, when the processing time of the image correction processing is short or when the high-frequency vibration is not generated, performing the image correction processing after performing the vibration correction processing allows the correction accuracy of the image correction to be improved.

Thus, in order to solve the above-described problem, the present inventors have found that the order of processing between the vibration correction processing and the image correction processing is switched. For example, when the processing time of the image correction processing is long, by switching the order of the processing so that the vibration correction processing is performed after the image correction processing is performed, the delay time from the completion of change in the display position of the display content by the vibration correction processing to the display thereof can be shortened. Accordingly, the vibration correction error can be reduced, and decrease in correction accuracy of the display position of the display content can be suppressed. On the other hand, when the processing time of the image correction processing is short, performing the image correction processing after performing the vibration correction processing makes it possible to improve the correction accuracy of the image correction processing while reducing the decrease in the correction accuracy by the vibration correction processing.

The display system of the present disclosure switches the order of processing between the vibration correction processing and the image correction processing according to the traveling status of the moving body, the processing time of the image correction processing, and the like. Accordingly, it is possible to suppress a decrease in correction accuracy of the display content. As a result, the positional deviation of the display position of the display content can be suppressed.

First Embodiment

Hereinafter, a first embodiment will be described with reference to the drawings. In the first embodiment, a case where the moving body is a vehicle such as an automobile and the display system is a head-up display (HUD) system that displays display content in front of a windshield of the vehicle will be described as an example.

1. Configuration of Display System

A configuration of a display system of the present embodiment will be described with reference to FIGS. 1 and 2.

FIG. 1 is a diagram for illustrating an HUD system. In FIG. 1, a roll axis of the vehicle 200 is an X-axis, a pitch axis of the vehicle 200 is a Y-axis, and a yaw axis of the vehicle 200 is a Z-axis. That is, the X-axis is orthogonal to the Y-axis and the Z-axis, and is an axis along the sight line direction of the occupant D who visually recognizes the display content Iv. The Y-axis is an axis along the left-right direction as viewed from the occupant D who visually recognizes the display content Iv. The Z-axis is an axis along the height direction of the vehicle 200.

The display system 100 of the present embodiment is an HUD system that performs what is called augmented reality (AR) display in which the display content Iv is superimposed on an actual view in front of the windshield 210 of the vehicle 200. The display content Iv is content indicating predetermined information displayed in the display area 220. For example, the display content Iv is graphics and characters indicating a route for guiding to a destination, an expected arrival time at the destination, a traveling direction, a speed, various warnings, and the like. In the present embodiment, an arrow indicating a route for guiding to a destination will be described as an example of the display content Iv. The display system 100 is installed in the vehicle 200, and projects the display light Lc representing the display content Iv onto within the display area 220 of the windshield 210 of the vehicle 200. In the present embodiment, the display area 220 is a partial area of the windshield 210. It should be noted that the display area 220 may be the entire area of the windshield 210. The display light Lc is reflected by the windshield 210 toward the vehicle interior. Thus, the occupant D in the vehicle 200 visually recognizes the reflected display light Lc as the display content Iv in front of the vehicle 200.

The display system 100 includes a projection device 10, an information acquisition device 20, a display processing device 30, an attitude detection device 40, and a vibration correction processing device 50.

The projection device 10 projects the display light Lc representing the display content Iv onto within the display area 220. The projection device 10 includes, for example, a liquid crystal display element that displays an image of the display content Iv, a light source such as an LED that illuminates the liquid crystal display element, a mirror and a lens that reflect the display light Lc of the image displayed by the liquid crystal display element onto the display area 220, and the like. The projection device 10 is installed, for example, within a dashboard of the vehicle 200.

The information acquisition device 20 acquires information indicating the position of the vehicle 200. Specifically, the information acquisition device 20 measures the position of the vehicle 200 and generates positional information indicating the position. The information acquisition device 20 outputs vehicle-related information including positional information of the vehicle 200.

The display processing device 30 controls the display of the display content Iv based on the vehicle-related information or the like obtained from the information acquisition device 20, and outputs the image data on the display content Iv to the projection device 10. The display processing device 30 may control the display of the display content Iv based on a display timing (display time) of the display content Iv or a combination of the vehicle-related information and the display timing. The display timing is, for example, to repeat display for 10 seconds and non-display for 1 second. In addition, the display processing device 30 performs image correction processing entailing a change in the display position of the display content Iv based on the image correction data, and corrects display deviation such as distortion or rotational deviation of the display content Iv.

The attitude detection device 40 detects an attitude variation of the vehicle 200. Specifically, the attitude detection device 40 detects an attitude change amount of the vehicle 200. The attitude change amount is an angular velocity.

In the present embodiment, the attitude detection device 40 includes, for example, a gyro sensor 41 (see FIG. 2) that detects an angular velocity. The gyro sensor 41 outputs the detected angular velocity to the vibration correction processing device 50 as an attitude change amount indicating an attitude variation of the vehicle 200.

The vibration correction processing device 50 calculates the vibration correction amount of the display position of the display content Iv based on the attitude variation of the vehicle 200 detected by the attitude detection device 40. The vibration correction processing device 50 outputs the calculated vibration correction amount to the display processing device 30. Accordingly, the display content Iv is corrected in display position within the display area 220 according to the change in the actual view seen from the windshield 210.

Figure 2:
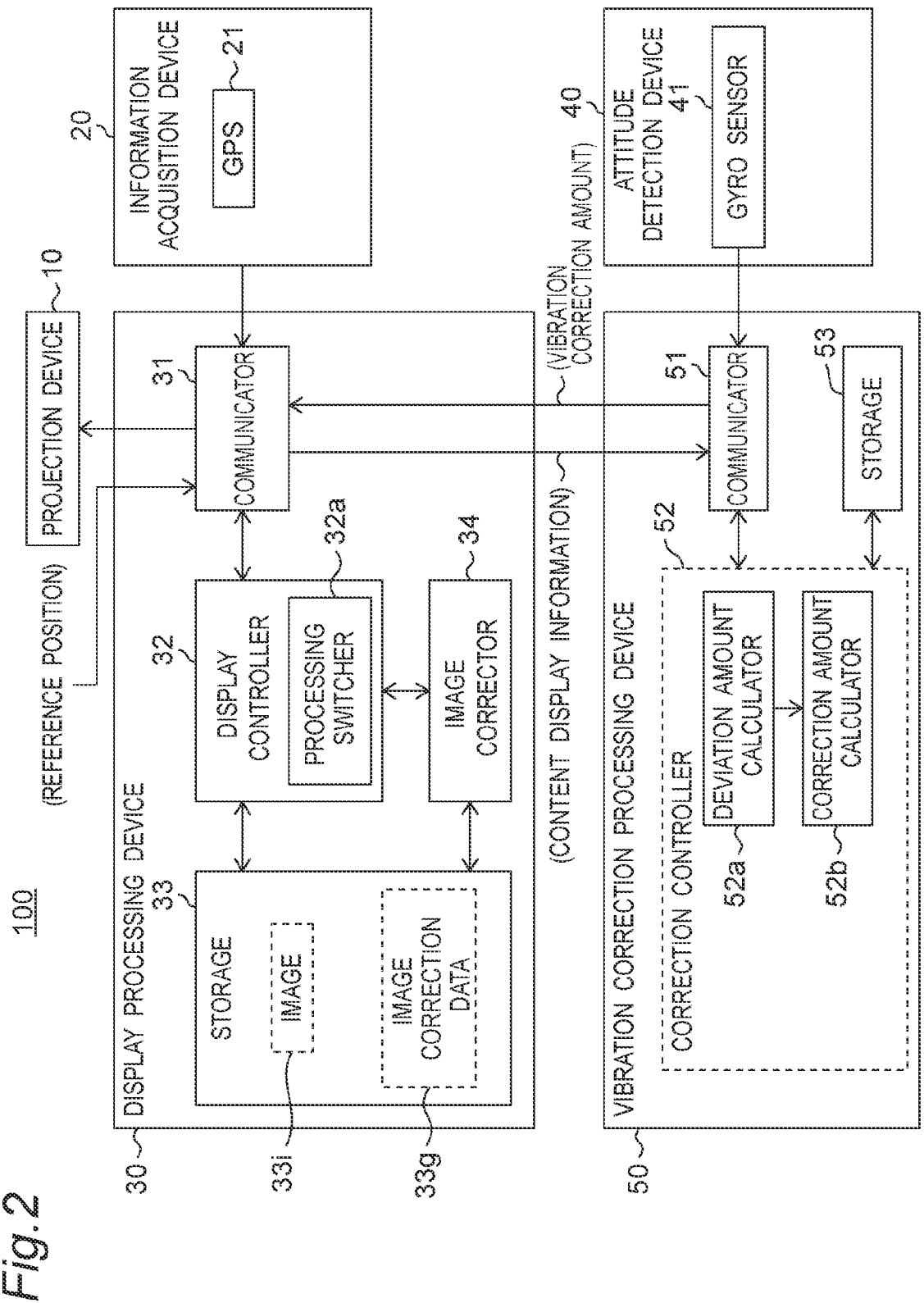
FIG. 2 is a block diagram showing an internal configuration of a display system in a first embodiment.

FIG. 2 is a block diagram showing an internal configuration of the display system 100.

In the present embodiment, the information acquisition device 20 includes a global positioning system (GPS) module 21 that detects a position indicating the current location of the vehicle 200 in the geographic coordinate system. Specifically, the GPS module 21 receives a radio wave from a GPS satellite and positions the latitude and longitude of the received point. The GPS module 21 generates positional information indicating the positioned latitude and longitude. The information acquisition device 20 outputs vehicle-related information including positional information to the display processing device 30.

The display processing device 30 includes a communicator 31, a display controller 32, a storage 33, and an image corrector 34.

The communicator 31 includes a circuit that communicates with an external apparatus in conformity with a predetermined communication standard. The predetermined communication standard includes, for example, LAN, Wi-Fi (registered trademark), Bluetooth (registered trademark), USB, HDMI (registered trademark), controller area network (CAN), and serial peripheral interface (SPI).

The display controller 32 can be achieved with a semiconductor element or the like. The display controller 32 can include, for example, a microcomputer, a CPU, an MPU, a GPU, a DSP, an FPGA, or an ASIC. The function of the display controller 32 may be configured only by hardware, or may be implemented by combining hardware and software. The display controller 32 reads data and programs stored in the storage 33 and performs various arithmetic processing to implement a predetermined function.

The display controller 32 includes a processing switcher 32a.

The processing switcher 32a switches the order of processing between the image correction processing and the vibration correction processing. The image correction processing is image correction involving a change in the display position of the display content Iv performed by the image corrector 34. The vibration correction processing is vibration correction of correcting the display position of the display content Iv based on the vibration correction amount calculated by the vibration correction processing device 50. The processing switcher 32a switches the order of processing between the image correction processing and the vibration correction processing based on a predetermined condition.

In the present embodiment, the processing switcher 32a acquires the image processing time Td of the image correction processing, and switches the order of processing between the image correction processing and the vibration correction processing based on the image processing time Td. The image processing time Td means a processing time required for change in the display position of the display content Iv by the image correction processing. For example, the image processing time Td may be a predetermined value or a value that changes for each image correction processing target. Alternatively, the image processing time Td may be calculated based on the information amount and/or the image correction value U of the display content Iv on which the image correction processing is performed. For example, when the image processing time Td is equal to or less than the first threshold value T1, the processing switcher 32a switches the order of processing so as to perform the image correction processing after performing the vibration correction processing. In addition, when the image processing time Td is larger than the first threshold value T1, the processing switcher 32a switches the order of processing so as to perform the vibration correction processing after performing the image correction processing.

The storage 33 is a storage medium that stores programs and data necessary for implementing the functions of the display processing device 30. The storage 33 can be implemented by, for example, a hard disk (HDD), an SSD, a RAM, a DRAM, a ferroelectric memory, a flash memory, a magnetic disk, or a combination thereof.

The storage 33 stores a plurality of pieces of image data 33i representing the display content Iv. In addition, the storage 33 stores image correction data 33g used for image correction processing.

The image correction data 33g includes, for example, an image correction value for correcting a display deviation such as a distortion and/or a rotational deviation of an image representing the display content Iv. The image correction value is, for example, known data calculated based on the distortion and/or the rotational deviation of an image measured by inspection at the time of manufacturing the display system 100, and is a static value.

In the present specification, the distortion is, for example, distortion generated when the display content Iv is reflected by the windshield 210 when the display content Iv is displayed in front of the windshield 210 of the vehicle 200. The rotational deviation is, for example, deviation caused by installation variations such as a case where the projection device 10 is installed to be inclined with respect to the windshield 210 onto which light is projected from the projection device 10.

For example, the display area 220 may be divided into a plurality of partitioned areas, and the image correction data 33g may store the image correction value assigned to each of the plurality of partitioned areas. Specifically, the image correction data 33g may store an image correction table indicating the image correction value assigned to each of the plurality of partitioned areas.

It should be noted that in the present embodiment, an example has been described in which the image correction data 33g includes an image correction value for correcting distortion and/or rotational deviation, but the present disclosure is not limited thereto. The image correction data 33g may include an image correction value for correcting a display deviation that causes a change in the display position of the display content Iv other than distortion and/or rotational deviation.

The image corrector 34 performs image correction processing involving a change in the display position of the display content Iv based on the image correction data 33g stored in advance in the storage 33. The image correction processing involving a change in the display position of the display content Iv includes, for example, image distortion correction and/or correction of the image rotational deviation or the like. The image corrector 34 corrects distortion, rotational deviation, and/or the like of the display content Iv projected onto the windshield 210 of the vehicle 200 by the projection device 10.

For example, the image corrector 34 reads the image correction data 33g stored in advance in the storage 33, and determines an image correction value for correcting the display deviation of the display position of the display content Iv caused by distortion, rotational deviation, and/or the like. The image corrector 34 determines the image correction value using the image correction table of the image correction data 33g.

The image correction value determined by the image corrector 34 is output to the display controller 32.

It should be noted that the image corrector 34 may be included in the display controller 32.

The display controller 32 determines the display content Iv to be displayed in the display area 220 based on the vehicle-related information obtained from the information acquisition device 20. The display controller 32 reads the image data 33i on the determined display content Iv from the storage 33 and outputs the image data to the projection device 10.

The display controller 32 acquires information indicating the display reference position from an external device (not shown) through the communicator 31. The display reference position is a position serving as a reference of display of the display content Iv in the display area 220.

The display controller 32 acquires content information indicating information on the display content Iv. The content information includes, for example, information such as a shape, a size, a display end, and a display reference position of the display content Iv. In the present specification, information on the display content including the display reference position and the content information (for example, information such as the size of the display content) is referred to as content display information. The content display information includes a feature portion that determines the shape of the display content at least. The feature portion is, for example, a pixel position of content display. The content display information is stored in the storage 33 together with the image data 331. In addition, the display controller 32 acquires vehicle-related information from the information acquisition device 20 through the communicator 31, and determines image data to be used among the plurality of pieces of image data 33i stored in the storage 33 based on the vehicle-related information. Accordingly, the display controller 32 acquires information indicating the shape, size, display end, and the like of the display content Iv.

The display controller 32 outputs the content display information to the vibration correction processing device 50.

The display controller 32 acquires the image correction value of the display content Iv from the image corrector 34, and changes the display position of the display content Iv based on the image correction value. In addition, the display controller 32 acquires the vibration correction amount from the vibration correction processing device 50. The display controller 32 sets the display position of the display content Iv based on the display reference position and the vibration correction amount.

The attitude detection device 40 includes a gyro sensor 41 that detects an angular velocity. The gyro sensor 41 outputs the detected angular velocity to the vibration correction processing device 50 as an attitude change amount indicating an attitude variation of the vehicle 200.

The arithmetic processing of the output of the attitude detection device 40 may be performed by the attitude detection device 40, the deviation amount calculator 52a of the vibration correction processing device 50, or another configuration.

The vibration correction processing device 50 includes a communicator 51, a correction controller 52, and a storage 53.

The communicator 51 includes a circuit that communicates with an external apparatus in conformity with a predetermined communication standard. The predetermined communication standard includes, for example, LAN, Dai-Fi (registered trademark), Bluetooth (registered trademark), USB, HDMI (registered trademark), controller area network (CAN), and serial peripheral interface (SPI).

The correction controller 52 can be achieved with a semiconductor element or the like. The correction controller 52 can include, for example, a microcomputer, a CPU, an MPU, a GPU, a DSP, an FPGA, or an ASIC. The function of the display controller 32 may be configured only by hardware, or may be implemented by combining hardware and software. The correction controller 52 reads data and programs stored in a storage (not shown) in the vibration correction processing device 50 and performs various arithmetic processing, to implement a predetermined function.

The correction controller 52 includes a deviation amount calculator 52a and a correction amount calculator 52b as the functional configuration.

The deviation amount calculator 52a calculates the attitude (angle deviation amount) of the vehicle 200 based on the attitude change amount output by the attitude detection device 40. The angle deviation amount is an attitude angle with respect to an attitude state serving as a reference of the moving body. The attitude state serving as a reference of the moving body is, for example, a vehicle state in a stationary state placed in a horizontal state. For example, the deviation amount calculator 52a calculates the angle (pitch angle) around the pitch axis of the vehicle 200 by performing integration operation on the angular velocity detected by the gyro sensor 41. Accordingly, it is possible to calculate the deviation amount (angle) of the vehicle 200 in the rotation direction around the Y-axis (pitch axis) shown in FIG. 1. It should be noted that in the present embodiment, the pitch angle is calculated, but the yaw angle or the roll angle may be calculated. For example, all the angles around the X-axis, the Y-axis, and the Z-axis may be calculated. In an attitude state in which the moving body is a reference, the pitch angle, the yaw angle, and the roll angle are each 0°. In this manner, the deviation amount being an angle with respect to the triaxial direction may be calculated. It should be noted that when the attitude detection device 40 outputs the pitch angle, the yaw angle, and the roll angle, these values may be processed as the deviation amount, or may be processed as the deviation amount by performing arithmetic processing other than integration.

The correction amount calculator 52b calculates the correction amount (vibration correction amount) of the display position of the display content Iv based on the attitude (angle deviation amount) of the vehicle 200. The correction amount is indicated by, for example, the number of pixels in the Y-axis direction and the Z-axis direction. Specifically, for example, the correction amount calculator 52b converts the deviation amount of the pitch angle and the yaw angle calculated by the deviation amount calculator 52a from the angle to the number of pixels, and determines such a correction amount as returns the number of pixels corresponding to the deviation to the original value. For example, for the roll angle, the correction amount calculator 52b determines such a correction amount as returns the deviation amount of the roll angle to the original value while maintaining the angle. The correction amount calculator 52b outputs the calculated correction amount to the display processing device 30.

As described above, the display processing device 30 and the vibration correction processing device 50 communicate bidirectionally through the communicators 31 and 51. The display processing device 30 outputs the content display information to the vibration correction processing device 50. The vibration correction processing device 50 outputs correction information indicating the vibration correction amount to the display processing device 30.

2. AR Display

Figure 3A:
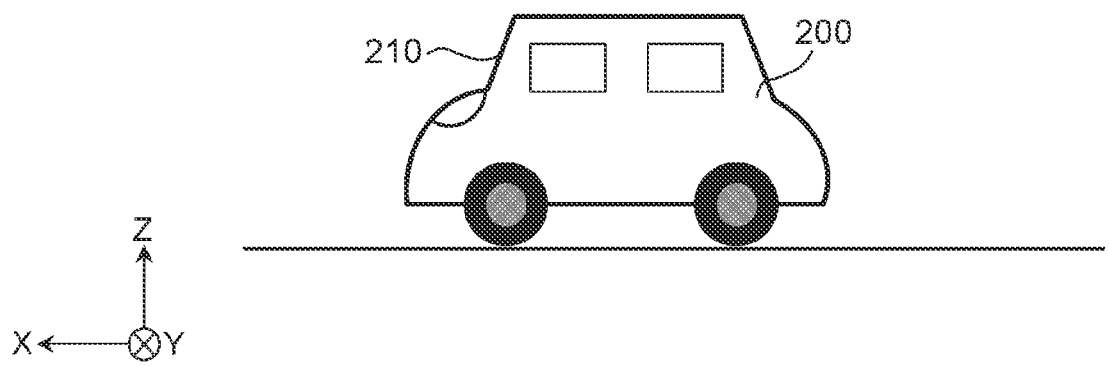
FIG. 3A is a diagram showing an example when the vehicle is not inclined.
Figure 3B:
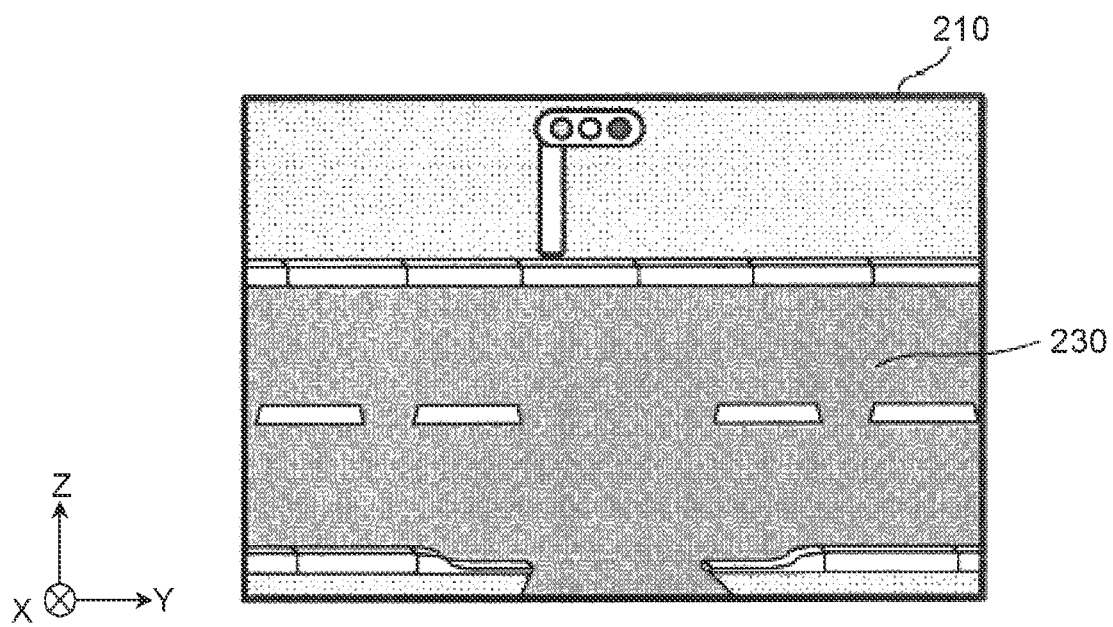
FIG. 3B is a view showing an example of an actual view visible from a windshield.
Figure 3C:
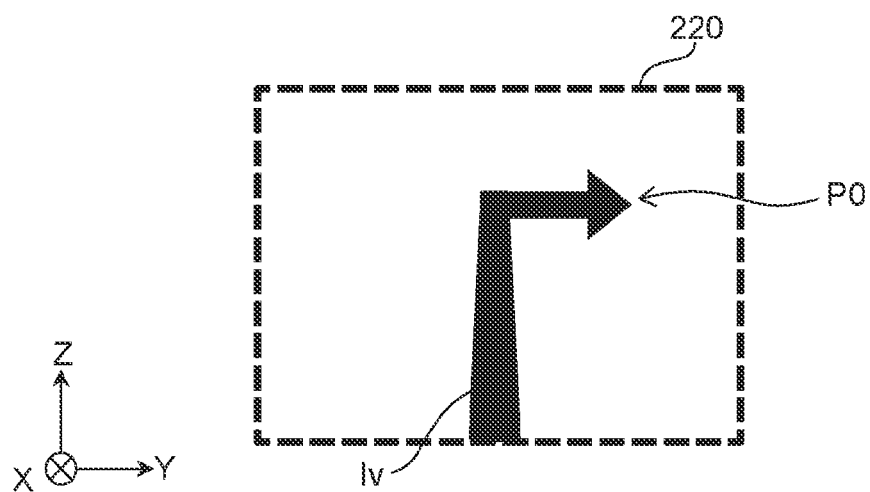
FIG. 3C is a view showing an example in which display content is displayed at a reference position.
Figure 3D:
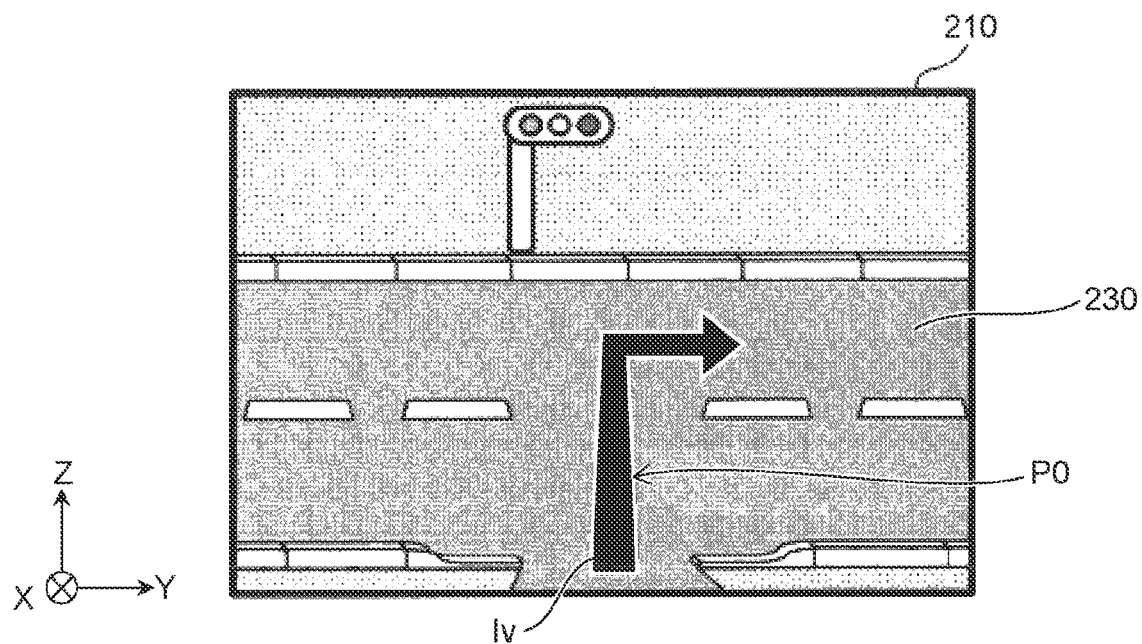
FIG. 3D is a view showing an example of augmented reality (AR) display.

The AR display will be described with reference to FIGS. 3A to 3D. FIG. 3A shows an example when the vehicle 200 is not inclined. FIG. 3B shows an example of an actual view visible from the windshield 210 of the vehicle 200 shown in FIG. 3A. FIG. 3C shows an example of display content Iv visible from the display area 220. FIG. 3D shows an example in which the display content Iv shown in FIG. 3C is displayed to be superimposed on the actual view shown in FIG. 3B. The display system 100 superimposes the display content Iv shown in FIG. 3C on the actual view shown in FIG. 3B. The display reference position P0 of the display content Iv is a position determined based on the type of the display content Iv, the state (position and attitude) of the vehicle 200, map data, and the like. For example, when the display target 230 is a traveling lane and the display content Iv is an arrow indicating the traveling direction, the display reference position P0 is a display position on the liquid crystal when the tip of the arrow points the center of the traveling lane. For example, in FIG. 3C, the display reference position P0 is set at the position of the pixel on the liquid crystal display corresponding to the values of the Y coordinate and the Z coordinate in the display area 220. The display reference position P0 is acquired from an external device. The external device can include, for example, a microcomputer, a CPU, an MPU, a GPO, a DSP, an FPGA, or an ASIC, and the GPS module 21. The function of the external device may be configured only by hardware, or may be implemented by combining hardware and software. The display reference position P0 output from the external device may change based on variation in attitude, due to the number of occupants, variation in load, a decrease in gasoline, and the like, and thus may be different from the display reference position acquired first, for example. Therefore, the display processing device 30 may change the display reference position P0 acquired from the external device based on variation in attitude, due to the number of occupants, variation in load, a decrease in gasoline, and the like. It should be noted that the display processing device 30 may set the display reference position P0 based on the vehicle-related information, the map data, and the like. The display processing device 30 may set the size of the display content Iv based on the vehicle-related information.

3. Vibration Correction Processing of Display of Display Content

Figure 4A:
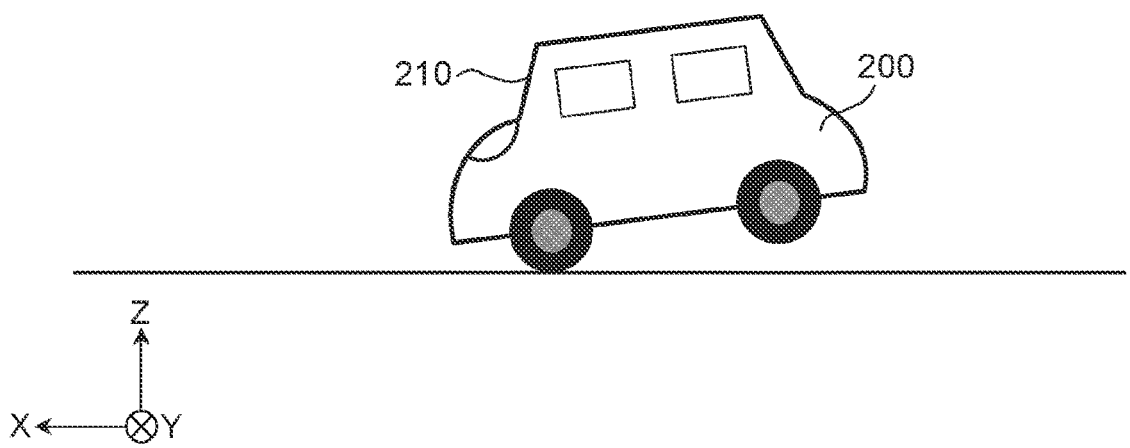
FIG. 4A is a view showing a backward tilting attitude of the vehicle.
Figure 4B:
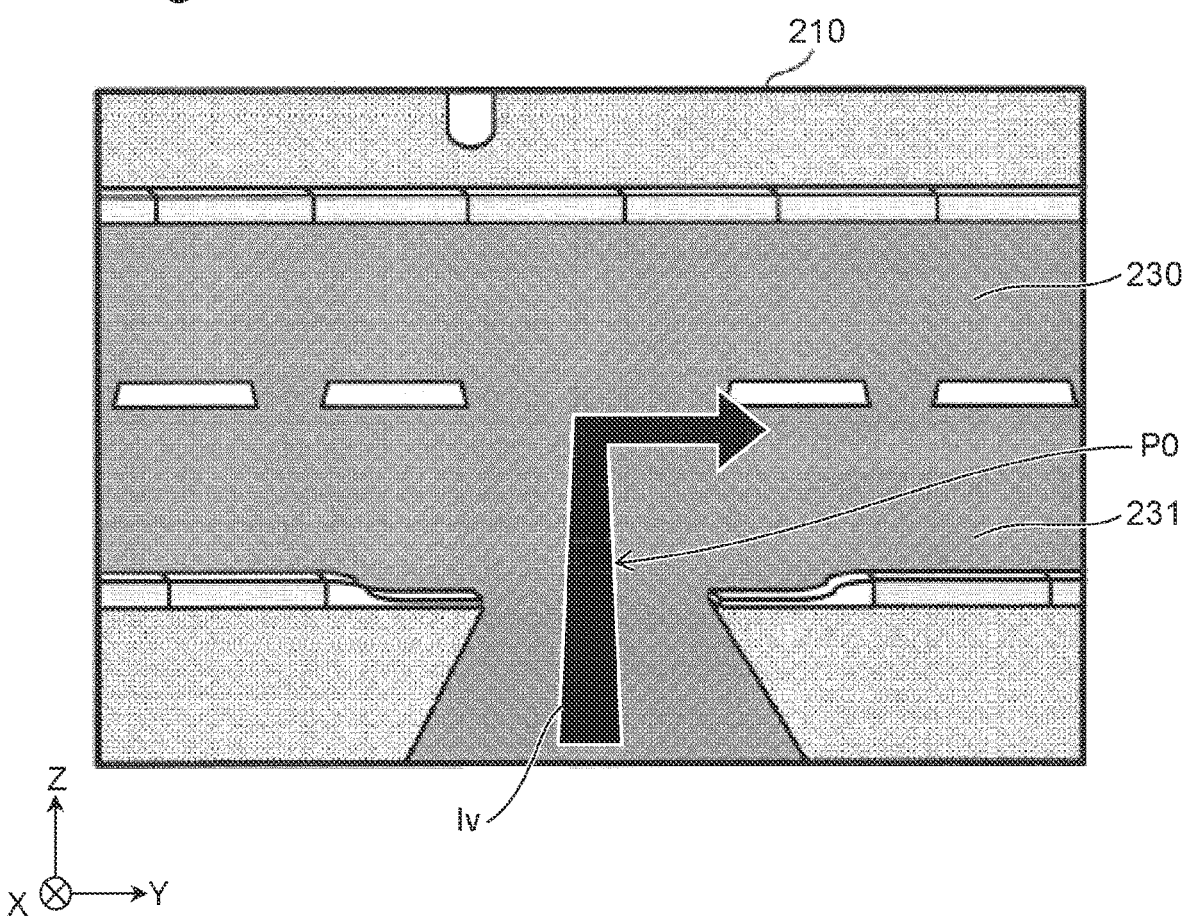
FIG. 4B is a view for illustrating an example in which positional deviation of display content occurs when the vehicle is in a backward tilting attitude.
Figure 4C:
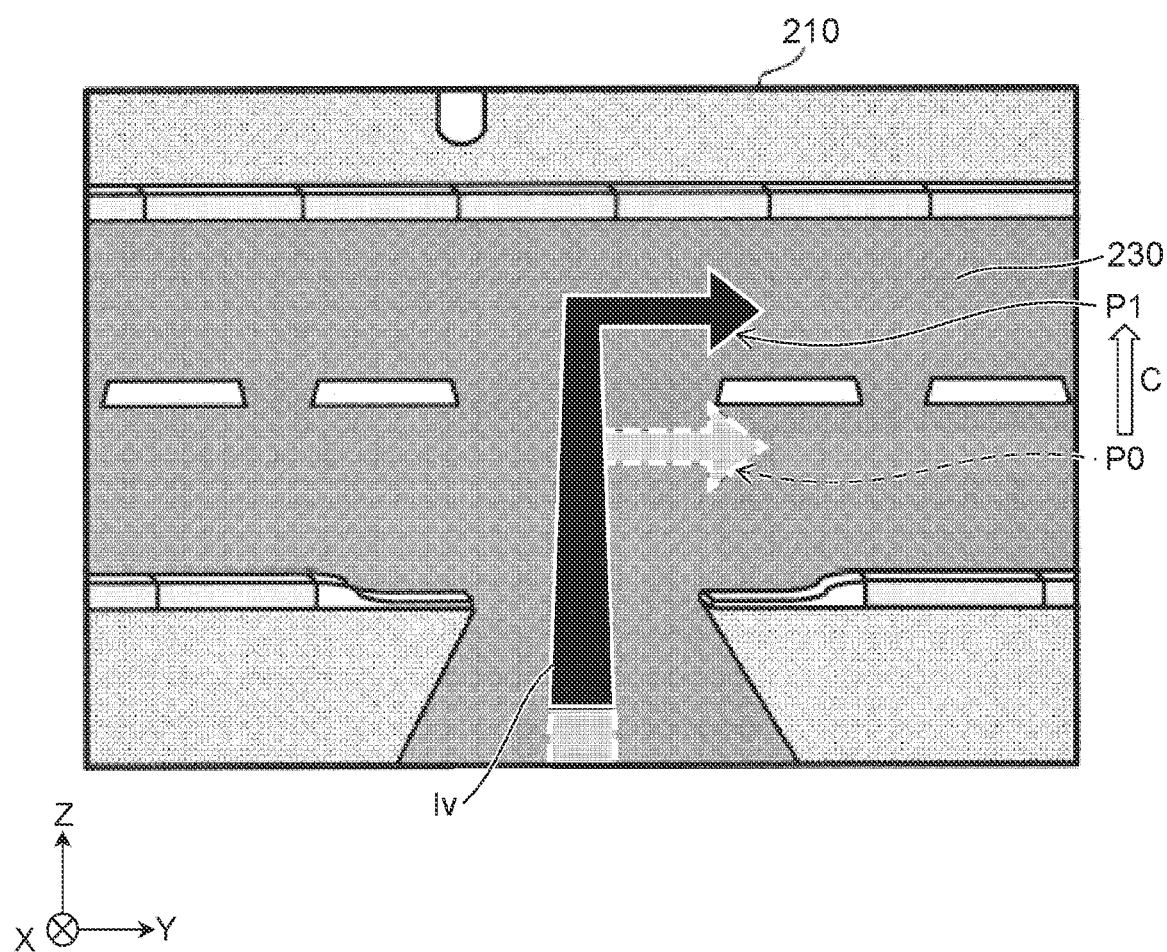
FIG. 4C is a view showing a display example of display content after the vibration correction processing.

The vibration correction processing of the display of the display content Iv will be described with reference to FIGS. 4A to 4C. FIG. 4A shows an example of a state in which the vehicle 200 is in a forward tilting attitude. FIG. 4B illustrates a case where the display position of the display content Iv is deviated from the display target 230 according to the attitude variation of the vehicle 200. FIG. 4C shows the display position of display content Iv after the vibration correction.

The vehicle 200 may incline due to unevenness of a road surface, sudden acceleration or sudden deceleration of the vehicle 200, or the like. For example, when the vehicle 200 suddenly decelerates, the vehicle 200 takes a forward tilting attitude as shown in FIG. 4A. In this case, as shown in FIG. 4B, the position of the display target 230 visible from the windshield 210 varies according to the inclination of vehicle 200. Therefore, when the display content Iv is displayed at the display reference position P0, the display content Iv is deviated from the display target 230. For example, as shown in FIG. 4B, the tip of the arrow is inside the opposite lane 231. Therefore, the display system 100 adjusts the display position of the display content Iv in the direction in which the deviation according to the attitude of the vehicle 200 is returned. Specifically, as shown in FIG. 4C, the vibration correction processing device 50 calculates the vibration correction amount C so as to be a position P1 where there is no deviation in the display position due to the angle of the vehicle 200. That is, the display processing device 30 sets the display position of the display content Iv to "display reference position P0 vibration correction amount C". Accordingly, the projection device 10 can display the display content Iv at the position P1 corresponding to the display target 230. As described above, even when the vehicle 200 is inclined, by changing the display position of the display content Iv from the display reference position P0 based on the vibration correction amount C, the display content Iv can be displayed at the position P1 corresponding to the display target 230 in the actual view.

4. Image Correction Processing of Display of Display Content

The image correction processing of the display of the display content Iv will be described with reference to FIG. 5. FIG. 5 is an image diagram for illustrating image correction processing. In the example shown in FIG. 5, distortion correction processing when distortion occurs in the vertical direction of the display area 220 will be described. As shown in FIG. 5, when the display area 220 is divided into a plurality of partitioned areas, the sizes of the plurality of partitioned areas are different due to distortion. In the example shown in FIG. 5, in the vertical direction of the display area 220, the sizes of the upper side areas L11 and L12 and the lower side areas L15 and L16 are smaller than those of the partitioned areas without distortion. In addition, the sizes of the central areas L13 and L14 are larger than those of the partitioned areas without distortion. In this case, the sizes of the display content Iv11 to Iv16 to be displayed in the respective partitioned areas are changed, and the display positions P11 to P16 at the tips of the arrows being feature portions of the display content Iv11 to Iv16 are deviated from the superimposing positions Q11 to Q16.

The image corrector 34 performs image correction processing involving a change in the display position of the display content Iv based on the image correction data 33g stored in advance in the storage 33. Specifically, the image corrector 34 determines an image correction value using the image correction table of the image correction data 33g, and outputs the image correction value to the display controller 32. In the example shown in FIG. 5, the image corrector 34 determines the image correction value so that pieces of the display content Iv11, Iv12, Iv15, and Iv16 increase in size in the vertical direction in the upper side areas L11 and L12 and the lower side areas L15 and L16. In addition, the image corrector 34 determines the image correction value so that pieces of the display content Iv13 and Iv14 decrease in size in the vertical direction in the central areas L13 and L14. Accordingly, the display controller 32 can control the display positions P11 to P16 of pieces of the display content Iv11 to Iv16 based on the determined image correction value to superimpose the pieces of display content on the superimposing positions Q11 to Q16.

Figures 6A, 6B:
FIG. 6A is a diagram showing an example of a plurality of partitioned areas in a display area.
FIG. 6B is a diagram showing an example of image correction data.

The determination of the image correction value will be described with reference to FIGS. 6A and 6B. FIG. 6A shows an example of a plurality of partitioned areas R11 to R64 in the display area 220. As shown in FIG. 6A, the display area 220 in which the display content Iv is displayed has a plurality of partitioned areas R11 to R64. For example, the plurality of partitioned areas R11 to R64 are partitioned into a mesh shape vertically and horizontally. In the example shown in FIG. 6A, the display area 220 is divided into six vertical and four horizontal partitioned areas R11 to R64. It should be noted that in the display area 220, the number and arrangement of the partitioned areas are not limited thereto. The display area 220 only needs to have a plurality of partitioned areas.

FIG. 6B shows an example of the image correction data 33g. As shown in FIG. 6B, the image correction data 33g includes an image correction table including image correction values U11 to U64 respectively assigned to the plurality of partitioned areas R11 to R64 of the display area 220. In the image correction table, the image correction values U11 to U64 of the image correction data 33g correspond to the plurality of partitioned areas R11 to R64 of the display area 220, respectively. For example, when the display content Iv is displayed in the partitioned area R22, the image correction value U22 is adopted as the image correction value.

5. Operation of Display Processing Device

Figure 7:
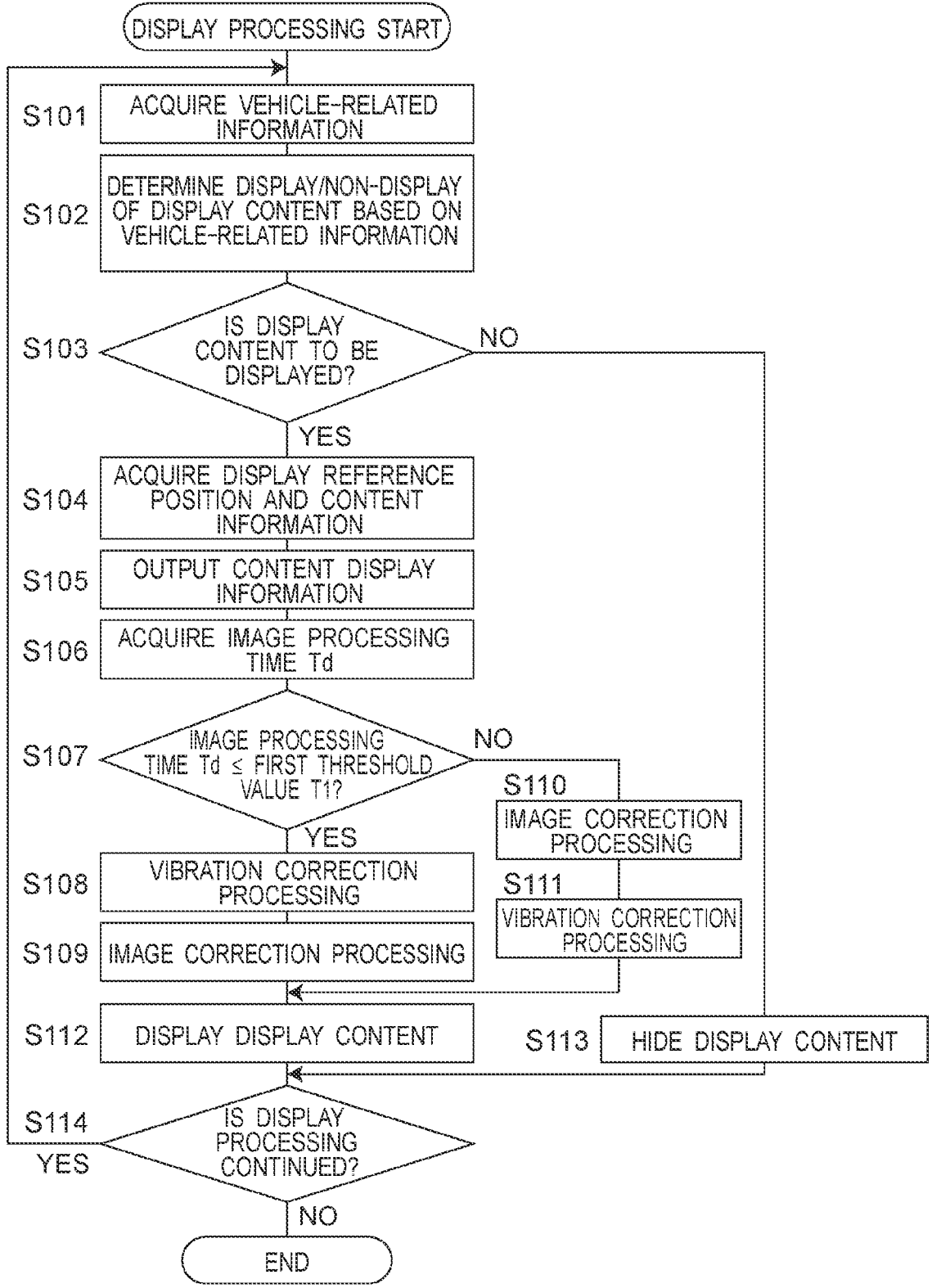
FIG. 7 is a flowchart showing display processing in the first embodiment.

The operation of the display controller 32 of the display processing device 30 will be described with reference to FIG. 7. FIG. 7 shows display processing performed by the display controller 32 of the display processing device 30. The display processing shown in FIG. 7 is started, for example, when the engine of the vehicle 200 is started, or when a button for instructing the start of the display of the display content Iv is operated.

The display controller 32 acquires vehicle-related information including positional information on the vehicle 200 from the information acquisition device 20 (S101). The display controller 32 determines whether or not to display the display content Iv corresponding to the display target 230 based on the vehicle-related information (S102).

If determining to display the display content Iv (Yes in S103), the display controller 32 acquires the information indicating the display reference position P0 of the display content Iv from the external device and acquires the content information from the storage 33 (S104). The display controller 32 outputs the content display information to the vibration correction processing device 50 (S105). For example, the content display information includes a display reference position and content information.

The display controller 32 acquires the image processing time Td (S106). For example, the processing switcher 32a of the display controller 32 calculates the image processing time Td based on the display reference position P0, the content information, and the image correction value U. It should be noted that an approximate value of the image processing time Td may be stored in the content information in advance. In this case, the display controller 32 may use the approximate value stored in the content information as it is as the image processing time Td, or may calculate the image processing time Td based on the approximate value.

The processing switcher 32a switches the order of processing between the image correction processing and the vibration correction processing based on the image processing time Td. In the present embodiment, the processing switcher 32a switches the order of processing between the image correction processing and the vibration correction processing based on the image processing time Td and the first threshold value T1.

The processing switcher 32a determines whether or not the image processing time Td is equal to or less than the first threshold value T1 (S107). If the image processing time Td is equal to or less than the first threshold value T1 (Yes in S107), the processing switcher 32a switches the order of processing so as to perform the image correction processing after performing the vibration correction processing. That is, if the image processing time Td is equal to or less than the first threshold value T1, the display processing device 30 first performs the vibration correction processing (S108). After performing the vibration correction processing, the display processing device 30 performs the image correction processing (S109).

If the image processing time Td is not equal to or less than the first threshold value T1 (No in S107), the processing switcher 32a switches the order of processing so as to perform the vibration correction processing after performing the image correction processing. That is, if the image processing time Td is larger than the first threshold value T1, the display processing device 30 performs the image correction processing (S110). After performing the image correction processing, the display processing device 30 performs the vibration correction processing (S111).

Figure 8:
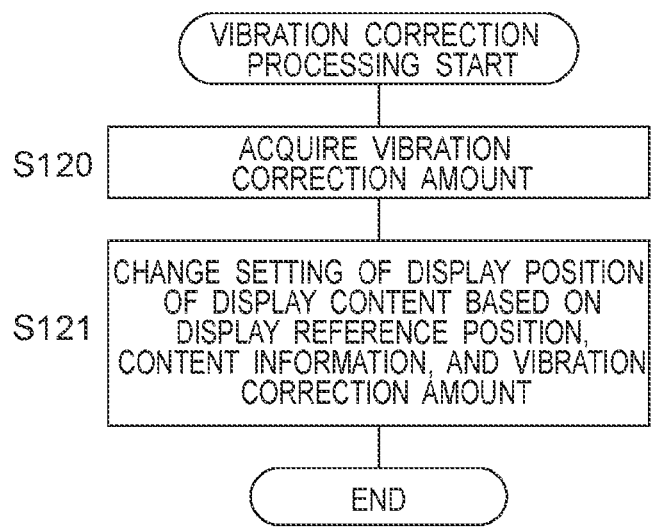
FIG. 8 is a flowchart showing vibration correction processing.

FIG. 8 shows vibration correction processing performed by the display controller 32 of the display processing device 30. The vibration correction processing shown in FIG. 8 shows details of steps S108 and S111 shown in FIG. 7.

The display processing device 30 acquires the vibration correction amount C from the vibration correction processing device 50 (S120). The display controller 32 changes the setting of the display position of the display content Iv based on the display reference position P0, the content information, and the vibration correction amount C (S221).

For example, when only the vibration correction processing is performed, that is, when the image correction value U is "0", the display controller 32 reads the image data 33i on the display content Iv corresponding to the display target from the storage 33, and sets the display position of the display content Iv to "display reference position P0+vibration correction amount C".

When the vibration correction processing is performed after the image correction processing is performed, the display controller 32 reads the image data 33i on the display content Iv from the storage 33, and sets the image on which the image correction processing is performed based on the image correction value U to "display reference position P0+vibration correction amount C".

When only the image correction processing is performed, that is, when the vibration correction amount C is "0", the display controller 32 reads the image data 33i on the display content Iv from the storage 33, and sets the image on which the image correction processing is performed based on the image correction value U to the "display reference position P0".

When the image correction processing is performed after the vibration correction processing is performed, the display controller 32 reads the image data 33i on the display content Iv from the storage 33, and sets the read image to the "display reference position P0+vibration correction amount C". In the image correction processing described below, the image correction processing is performed based on the image correction value U at the position of the image changed in the vibration correction processing.

Figure 9:
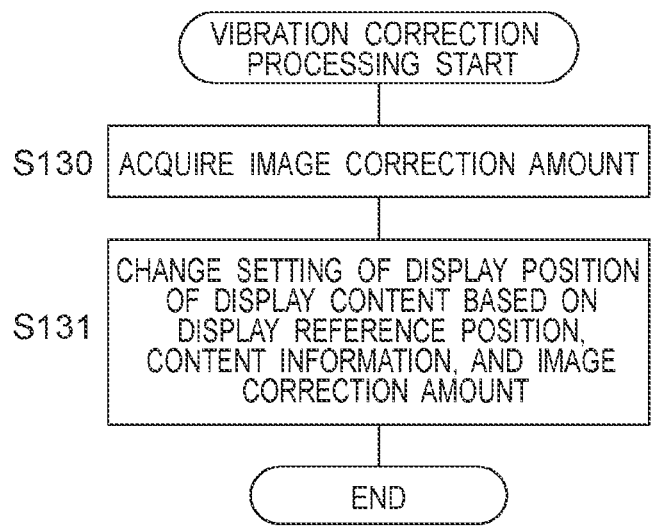
FIG. 9 is a flowchart showing image correction processing.

FIG. 9 shows image correction processing performed by the display controller 32 of the display processing device 30. The image correction processing shown in FIG. 9 shows details of steps S109 and S110 shown in FIG. 7.

The display controller 32 acquires information indicating the image correction value U of the display content Iv from the image corrector 34 (S130). The display controller 32 changes the setting of the display position of the display content Iv based on the display reference position P0, the content information, and the image correction value U (S131). For example, the display controller 32 performs correction such as enlargement, reduction, rotation, and/or the like of the image on all the regions R11 to R64 in the display area 220 using the image correction values U11 to U64. After performing the image correction, the display controller 32 sets the display position of the display content iv to the display reference position P0.

After performing the vibration correction processing and the image correction processing, the display controller 32 displays the display content Iv (S112).

If determining not to display the display content Iv (No in S103), the display controller 32 hides the display content Iv (S113).

The display controller 32 determines whether to continue the display processing (S114). For example, when the engine of the vehicle 200 is stopped, when a button for instructing termination of display of the display content Iv is operated, or the like, the display controller 32 terminates the display processing. If the display processing is continued, the process returns to step 3101.

6. Operation of Correction Processing Device

Figure 10:
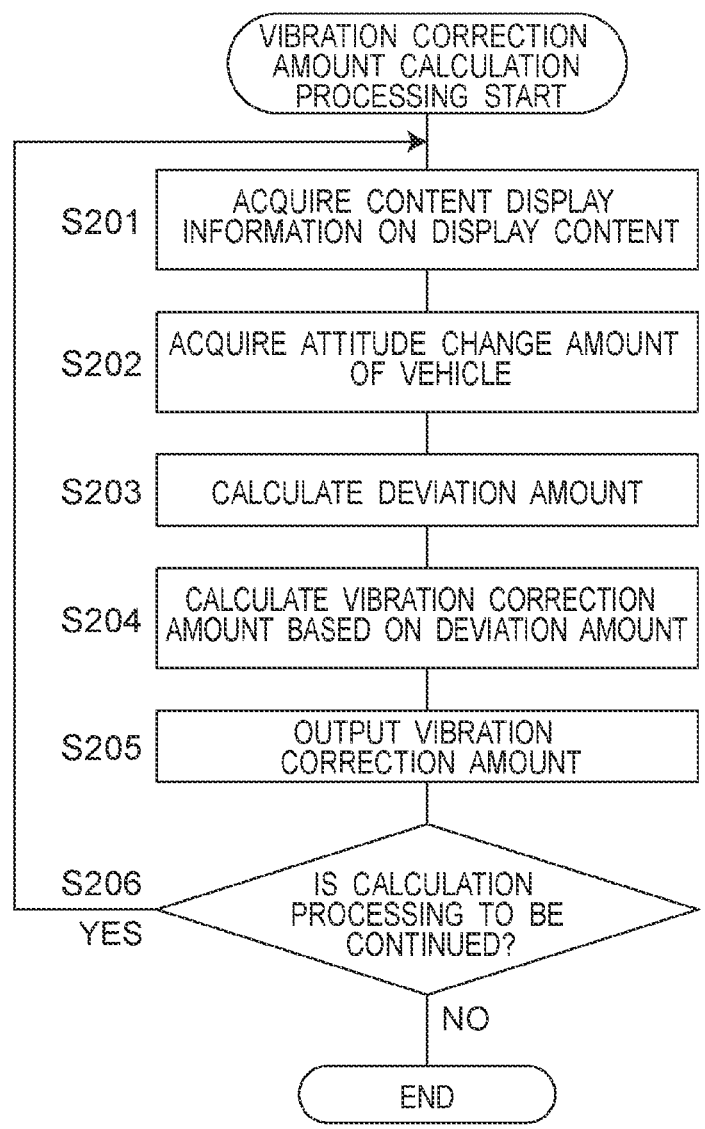
FIG. 10 is a flowchart showing calculation processing of a vibration correction amount in the first embodiment.

The operation of the correction controller 52 of the vibration correction processing device 50 according to the first embodiment will be described with reference to FIG. 10. FIG. 10 shows calculation processing of the vibration correction amount C performed by the correction controller 52 of the vibration correction processing device 50.

The calculation processing shown in FIG. 10 is started, for example, when the engine of the vehicle 200 is started, or when a button for instructing the start of the display of the display content Iv is operated. The calculation processing in FIG. 10 is started together with the display processing in FIG. 7, for example. It should be noted that the calculation processing shown in FIG. 10 may be started when a button for instructing the start of the position correction of the display content Iv is operated.

The correction controller 52 acquires the content display information on the display content Iv from the display processing device 30 (S201). The correction controller 52 acquires the attitude change amount indicating the angular velocity of the vehicle 200 output from the gyro sensor 41 (S202). The correction controller 52 calculates the attitude of the vehicle 200, that is, the deviation amount y with respect to the triaxial direction based on the attitude change amount (S203).

The correction controller 52 calculates the vibration correction amount C based on the deviation amount y calculated based on the attitude change amount (S204). For example, the correction controller 52 determines such vibration correction amount C as returns the pitch angle deviation amount y to the original value.

The correction controller 52 outputs the information on the vibration correction amount C to the display processing device 30 (S205).

The correction controller 52 determines whether to continue the calculation processing (S206). For example, when the engine of the vehicle 200 is stopped, when a button for instructing termination of display of the display content iv is operated, or the like, the correction controller 52 terminates the calculation processing. If the calculation processing is continued, the process returns to step S201.

As described above, in the present embodiment, the correction controller 52 calculates the vibration correction amount C of the display position of the display content Iv based on the attitude change amount.

7. Effects, Supplements, and the Like

The display system 100 of the present disclosure includes a display processing device 30, an image corrector 34, an attitude detection device 40, a vibration correction processing device 50, and a processing switcher 32a. The display processing device 30 controls display of the display content Iv. The image corrector 34 performs image correction processing involving a change in the display position of the display content Iv based on the image correction data 33g stored in advance. The attitude detection device 40 detects an attitude change amount of the vehicle 200 being a moving body. The vibration correction processing device 50 calculates the vibration correction amount C of the display position of the display content Iv based on the attitude change amount of the moving body. The processing switcher 32a switches the order of processing between the image correction processing involving the change in the display position of the display content Iv and the vibration correction processing of correcting the display position of the display content Iv based on the vibration correction amount C. The display processing device 30 controls the display position of the display content Iv by performing the image correction processing and the vibration correction processing based on the order of processing switched by the processing switcher 32a.

With this configuration, it is possible to suppress positional deviation of the display position of the display content Iv with respect to the superimposition target. In the display system 100, by switching the order of processing between the image correction processing and the vibration correction processing, it is possible to suppress a decrease in the correction accuracy of the display position of the display content Iv.

The processing switcher 32a acquires the image processing time Td of the image correction processing. The processing switcher 32a switches the order of processing between the image correction processing and the vibration correction processing based on the image processing time Td.

With this configuration, since the order of processing can be optimized according to the traveling status, it is possible to improve the superimposition performance and the quality while achieving both the accuracy of the vibration correction processing and the accuracy of the image correction processing. The more the processing amount of the content, the more the image processing time Td. For example, when there are a large number of pieces of content to be displayed (for example, when the moving body travels in an urban area), the image processing time Td may be long, and when there are a small number of pieces of content to be displayed (for example, when the moving body travels on an expressway), the image processing time Td may be short. Therefore, by switching the order of processing between the image correction processing and the vibration correction processing based on the image processing time Td, optimal processing can be performed according to the traveling status of the moving body. For example, when the image processing time Td is large, the delay time of the vibration correction processing can be shortened and the vibration correction error can be suppressed by performing the vibration correction processing after the image correction processing. When the image processing time Td is small, the accuracy of the image correction processing can be improved by performing the image correction processing after the vibration correction processing.

In addition, even when the display content Iv is updated and the information amount changes, the vibration correction processing and the image correction processing can be performed in the optimum processing order based on the image processing time Td. Specifically, when the display content Iv is updated and the information amount changes, the image processing Lime Td also changes. For example, when the information amount of the display content Iv increases, the image processing time Td may increase, and the delay time due to the vibration correction processing may increase. In this case, when the image correction processing is performed after the vibration correction processing is performed, the vibration correction error increases. In the display system 100, since the order of processing between the vibration correction processing and the image correction processing can be switched based on the image processing time Td, even when the display content Iv is updated and the information amount changes, it is possible to suppress a decrease in the correction accuracy of the display position of the display content Iv.

When the image processing time Td is equal to or less than the first threshold value T1, the processing switcher 32a switches the order of processing so as to perform the image correction processing after performing the vibration correction processing. When the image processing time Td is larger than the first threshold value T1, the processing switcher 32a switches the order of processing so as to perform the vibration correction processing after performing the image correction processing.

With this configuration, it is possible to easily perform switching determination of the order of processing between the image correction processing and the vibration correction processing based on the image processing time Td and the first threshold value T1.

It should be noted that in the present embodiment, an example in which the display controller 32 includes the processing switcher 32a has been described, but the present disclosure is not limited thereto. For example, the processing switcher 32a does not need to be included in the display controller 32.

In the present embodiment, an example has been described in which the processing switcher 32a switches the order of processing between the image correction processing and the vibration correction processing based on the image processing time Td of the image correction processing, but the present disclosure is not limited thereto. For example, the processing switcher 32a may switch the order of processing between the image correction processing and the vibration correction processing based on the traveling status of the moving body. Alternatively, the processing switcher 32a may be a delay time from correction to display or an increase amount thereof when the vibration correction processing is performed after the image correction processing. As described above, the processing switcher 32a may switch the order of processing based on information other than the image processing time Td.

Second Embodiment

In the first embodiment, the order of processing between the vibration correction processing and the image correction processing is switched based on the image processing time Td of the image correction processing. In the present embodiment, the order of processing between the vibration correction processing and the image correction processing is switched based on whether or not the specific frequency vibration is generated.

Figure 11:
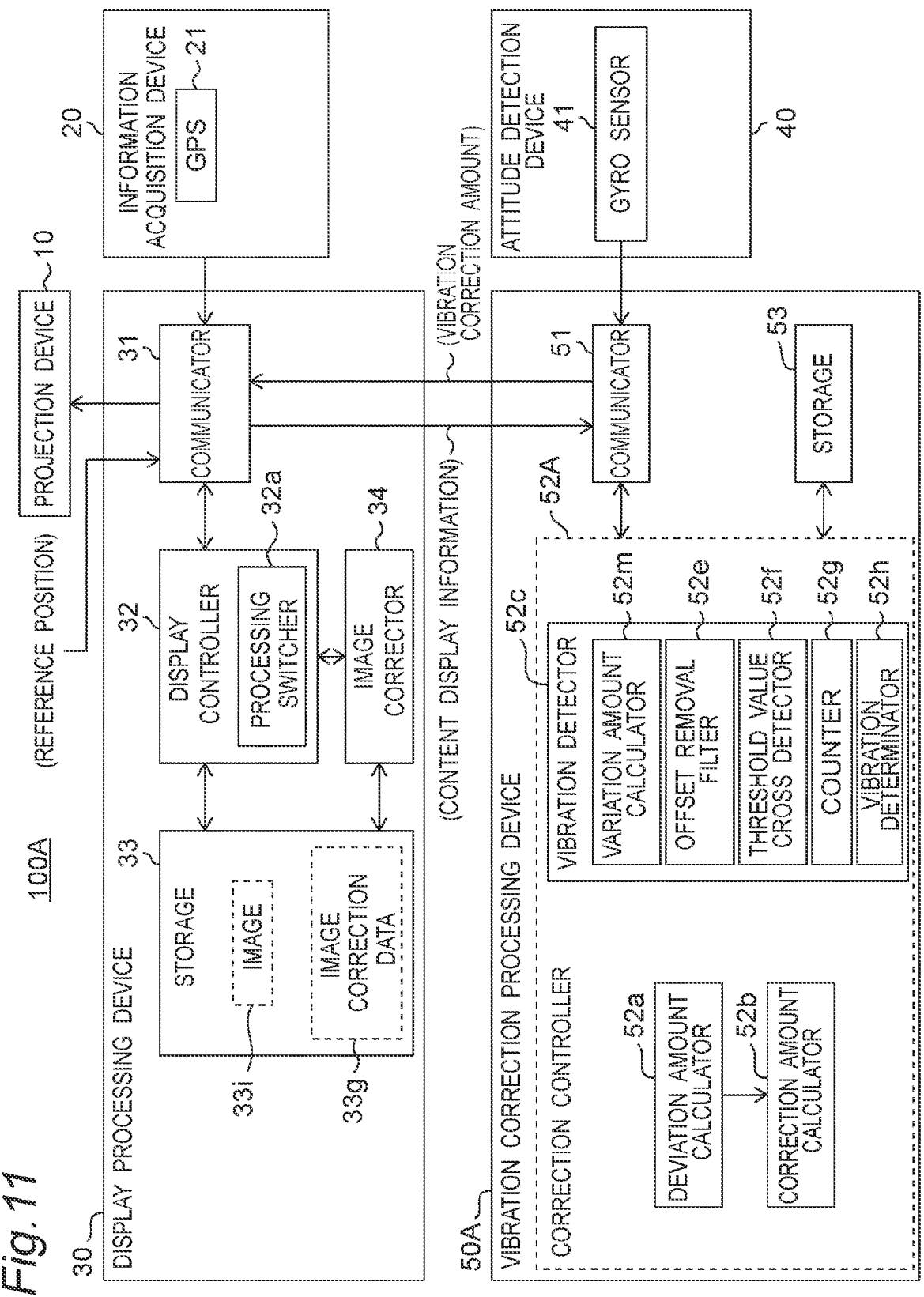
FIG. 11 is a block diagram showing an internal configuration of a display system in a second embodiment.

An internal configuration of a display system 100A will be described with reference to FIG. 11. FIG. 11 is a block diagram showing an internal configuration of a display system 100A in the second embodiment. The display system 100A shown in FIG. 11 is different from display system 100 of the first embodiment in that the correction controller 52A includes the vibration detector 52c. The other configuration of the display system 100A shown in FIG. 11 is similar to that of the display system 100 of the first embodiment.

The vibration detector 52c detects whether the signal to be input includes a specific frequency band component. In the present embodiment, the specific frequency band component is a high-frequency band component. Specifically, the vibration detector 52c detects whether or not the signal to be input includes a high-frequency band component of a predetermined frequency band or more. The vibration detector 52c includes a variation amount calculator 52m, an offset removal filter 52e, a threshold value cross detector 52f, a counter 52g, and a vibration determinator 52h.

The variation amount calculator 52m calculates the variation amount of the vehicle 200 based on the attitude change amount output by the attitude detection device 40. For example, the variation amount calculator 52m calculates the angle (pitch angle) around the pitch axis of the vehicle 200 by performing integration operation on the pitch angular velocity detected by the gyro sensor 41 as the variation amount. Accordingly, it is possible to detect the variation amount (pitch angle) of the vehicle 200 in the rotation direction with the Y axis (pitch axis) shown in FIG. 1 as the central axis. It should be noted that in the present embodiment, the pitch angle is calculated, but the yaw angle or the roll angle may be calculated. For example, all the angles around the X-axis, the Y-axis, and the Z-axis may be calculated. It should be noted that since both the deviation amount calculated by the deviation amount calculator 52a and the variation amount calculated by the variation amount calculator 52m are angle information, they may be shared or may be calculated as separate angle information.

The offset removal filter 52e removes an offset component of the input signal (variation amount), and as a result, attenuates a low frequency band component of the input signal. The offset removal filter 52e is, for example, a high-pass filter. The relationship between the cutoff frequency Fc of the offset removal filter 52e and the frequency band lower limit F to be detected satisfies, for example, the following inequality (1).

$$Fc < F \leq 1/(2 \times T[\sec]) \quad (1)$$

T is a total delay time (time lag) [sec] from the calculation of the correction amount of the virtual image to the display. However, the frequency setting method is not limited to inequality (1), and may be appropriately adjusted.

The threshold value cross detector 52f detects that an input value has crossed a predetermined threshold value. Here, "detecting that the input value has crossed a threshold value" means, for example, detecting that the input value has changed from less than the threshold value to greater than or equal to the threshold value or from greater than or equal to the threshold value to less than the threshold value. When detecting that the threshold value has been crossed, the threshold value cross detector 52f outputs a detection signal to the counter 52g. The threshold value is, for example, zero or any specific value. The any specific value is, for example, a value of an offset error.

The counter 52g measures the number of times the input value to the threshold value cross detector 52f has crossed a predetermined threshold value. That is, the counter 52g counts the number of times of detection signals input from the threshold value cross detector 52f to the counter 52g.

Based on the number of times measured by the counter 52g per unit time, the vibration determinator 52h determines whether a specific frequency band component has been generated in the variation amount for a certain period of time or more. For example, the vibration determinator 52h is provided with a time window, and determines generation of vibration having a specific frequency band component based on a change amount of the count value in a certain period of time. The determination result is sent from the vibration determinator 52h to the correction amount calculator 52b.

In the present embodiment, based on the number of times measured by the counter 52g per unit time, the vibration determinator 52h determines whether a high-frequency band component has been generated in the variation amount for a certain period of time or more.

Figure 12:
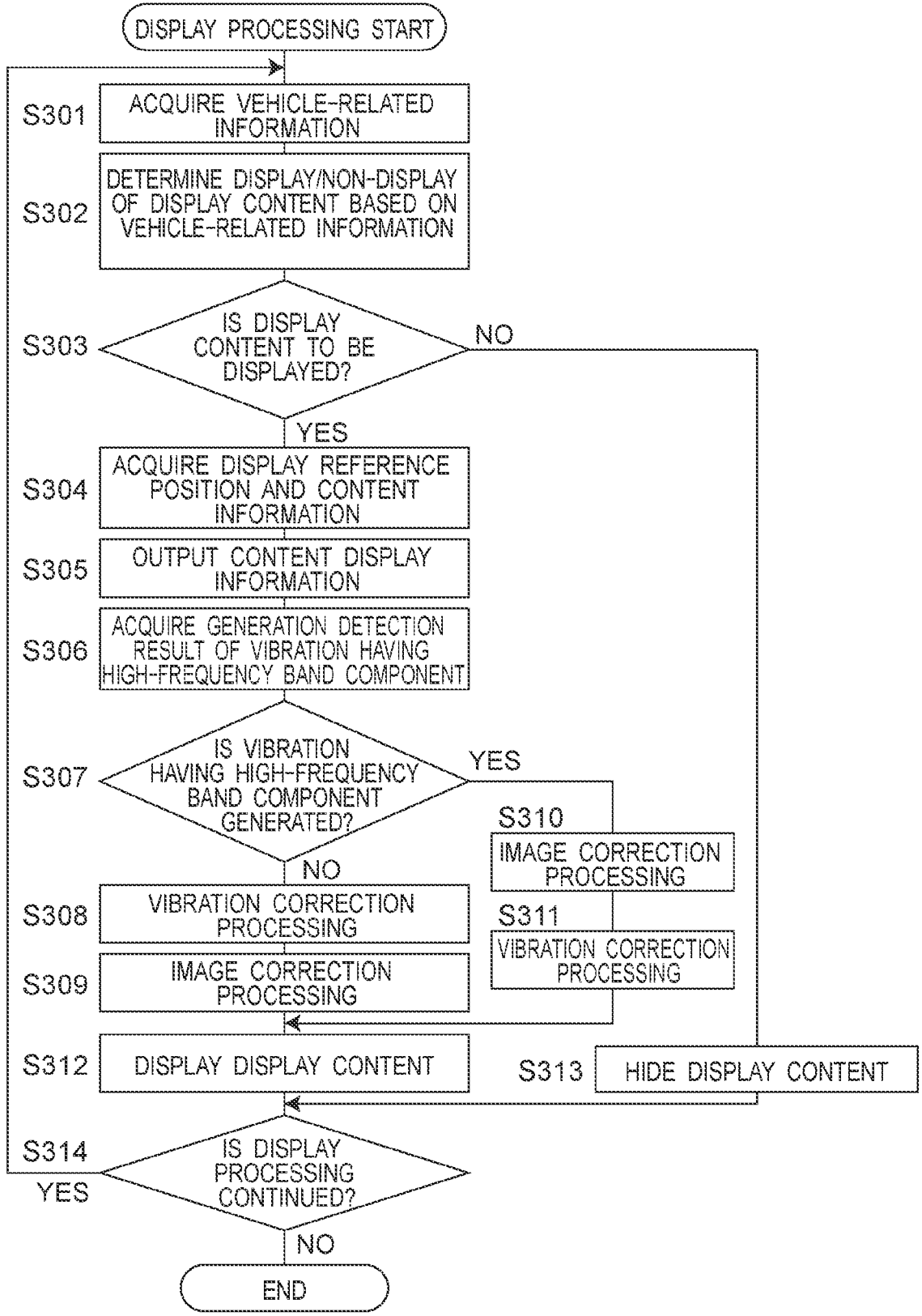
FIG. 12 is a flowchart showing display processing in the second embodiment.

The operation of the display controller 32 of the display processing device 30 will be described with reference to FIG. 12. FIG. 12 shows display processing performed by the display controller 32 of the display processing device 30. Steps S301 to S305 and S308 to S314 in FIG. 12 are similar to steps S101 to S105 and S108 to S114 in FIG. 7 of the first embodiment.

The display controller 32 acquires vehicle-related information including positional information on the vehicle 200 from the information acquisition device 20 (S301). The display controller 32 determines whether or not to display the display content Iv corresponding to the display target 230 based on the vehicle-related information (S302).

If determining to display the display content Iv (Yes in S303), the display controller 32 acquires the information indicating the display reference position P0 of the display content Iv from the external device and acquires the content information from the storage 33 (S304). The display controller 32 outputs the content display information to the vibration correction processing device 50A (S305). For example, the content display information includes a display reference position and content information.

The display controller 32 acquires a generation detection result of vibration having a high-frequency band component (S306). The processing switcher 32a of the display controller 32 acquires the generation detection result of vibration having a high-frequency band component from the vibration correction processing device 50A. Specifically, the display controller 32 acquires a signal indicating that vibration of a specific frequency output from the vibration correction processing device 50A is generated. When receiving the signal from the vibration correction processing device 50A, the display controller 32 recognizes that vibration of a specific frequency is generated. When not receiving the signal from the vibration correction processing device 50A, the display controller 32 recognizes that vibration of a specific frequency is not generated.

The processing switcher 32a switches the order of processing between the image correction processing and the vibration correction processing based on the generation detection result of vibration of a specific frequency. In the present embodiment, the processing switcher 32a determines whether or not vibration having a high-frequency band component has been generated for a certain period of time or more (S307). The processing switcher 32a switches the order of processing between the image correction processing and the vibration correction processing based on a determination whether or not vibration having a high-frequency band component has been generated for a certain period of time or more.

If vibration having a high-frequency band component has not been generated for a certain period of time or more (No in S307), the processing switcher 32a switches the order of processing so as to perform the image correction processing after performing the vibration correction processing. That is, if it is not detected that vibration having a high-frequency band component has been generated for a certain period of time or more, the display processing device 30 first performs vibration correction processing (S308). After performing the vibration correction processing, the display processing device 30 performs the image correction processing (S309).

If vibration having a high-frequency band component has been generated for a certain period of time or more (Yes in S307), the processing switcher 32a switches the order of processing so as to perform the vibration correction processing after performing the image correction processing. That is, if it is detected that vibration having a high-frequency band component has been generated for a certain period of time or more, the display processing device 30 performs image correction processing (S310). After performing the image correction processing, the display processing device 30 performs the vibration correction processing (S311).

The vibration correction processing may be the same as the vibration correction processing of the first embodiment shown in FIG. 8. The image correction processing may be the same as the vibration correction processing of the first embodiment shown in FIG. 9.

After performing the vibration correction processing and the image correction processing, the display controller 32 displays the display content Iv (S312).

If determining not to display the display content Iv (No in S303), the display controller 32 hides the display content Iv (S313).

The display controller 32 determines whether to continue the display processing (S314). If the display processing is continued, the process returns to step S301.

Figure 13:
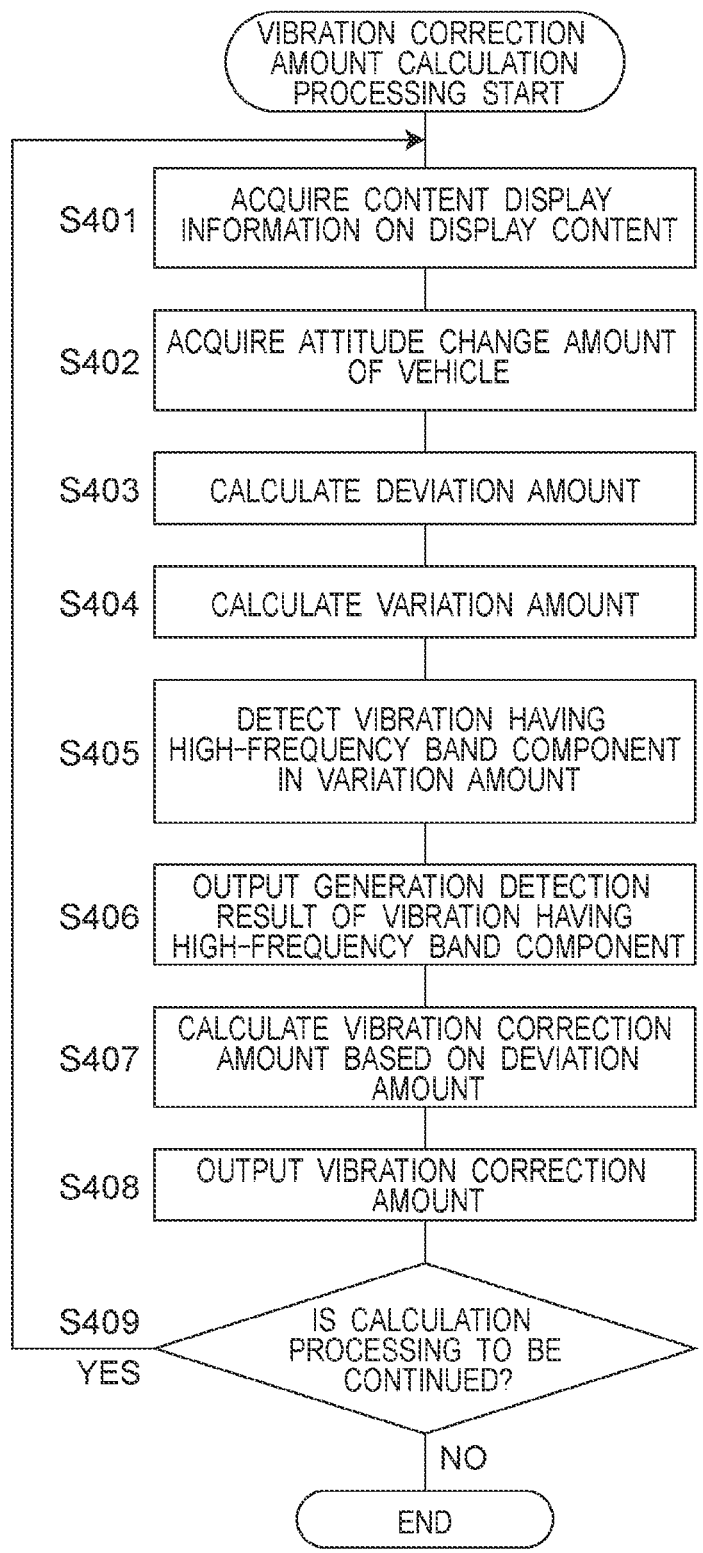
FIG. 13 is a flowchart showing calculation processing of a vibration correction amount in the second embodiment.

The operation of the correction controller 52A of the vibration correction processing device 50A according to the second embodiment will be described with reference to FIG. 13. FIG. 13 shows calculation processing of the vibration correction amount C performed by the correction controller 52A of the vibration correction processing device 50A according to the second embodiment. Steps S401 to S403 and S406 to S408 in FIG. 13 are similar to steps S201 to S206 in FIG. 10 of the first embodiment.

The correction controller 52A acquires the content display information on the display content Iv from the display processing device 30 (S401). The correction controller 52A acquires the attitude change amount indicating the angular velocity of the vehicle 200 output from the gyro sensor 41 (S402). The correction controller 52A calculates the attitude of the vehicle 200, that is, the deviation amount y with respect to the triaxial direction based on the acquired attitude change amount (S403). Specifically, the deviation amount calculator 52a calculates the pitch angle of the vehicle 200 by performing integration operation on the angular velocity. The calculated deviation amount y is sent to the correction amount calculator 52b.

The variation amount calculator 52m of the vibration detector 52c of the correction controller 52A calculates the attitude of the vehicle 200, for example, the variation amount being an angle with respect to the pitch direction, based on the acquired attitude change amount (S404). Specifically, the variation amount calculator 52m calculates the pitch angle of the vehicle 200 by performing integration operation on the angular velocity. The calculated variation amount is sent to the offset removal filter 52e. It should be noted that the variation amount may be calculated after the offset removal.

Figure 14A:
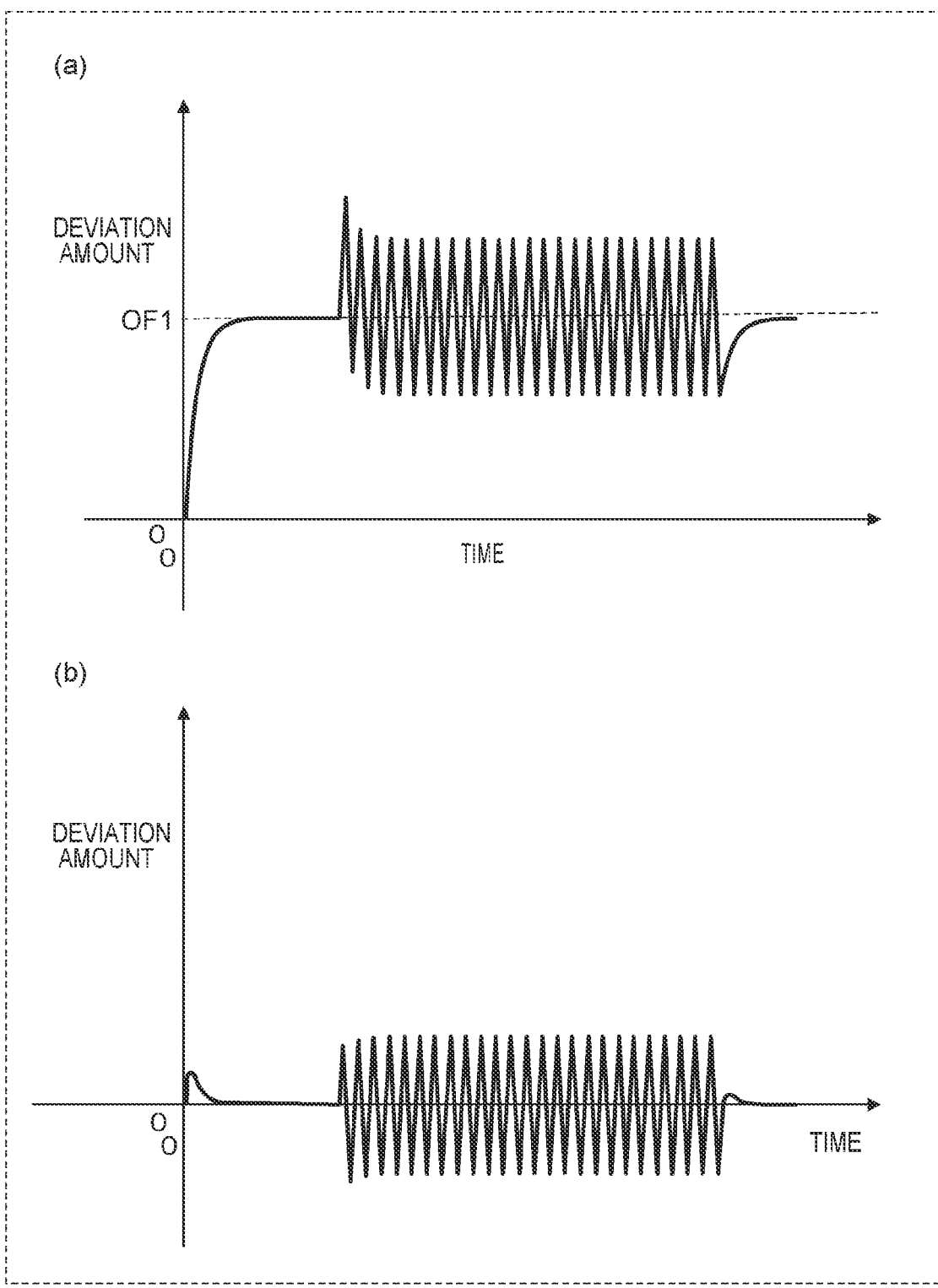
FIG. 14A are explanatory diagrams showing an effect of an offset removal filter, FIG. 14A(a) is an explanatory diagram showing an offset error of a variation amount, and FIG. 14A(b) is an explanatory diagram showing a variation amount from which the offset error is removed.

The offset removal filter 52e of the vibration detector 52c removes the offset component of the detected variation amount, and as a result, the low frequency band component of the variation amount is also attenuated. For example, when the variation amount varies as shown in FIG. 14A(a), the offset removal filter 52e removes the offset component OF1 included in the variation amount, whereby the variation amount that vibrates with the 0 value as the center of the amplitude as shown in FIG. 14A(b) can be obtained. The variation amount obtained by removing the offset component OF1 and attenuating the low frequency band component is sent to the threshold value cross detector 52f.

Figure 14B:
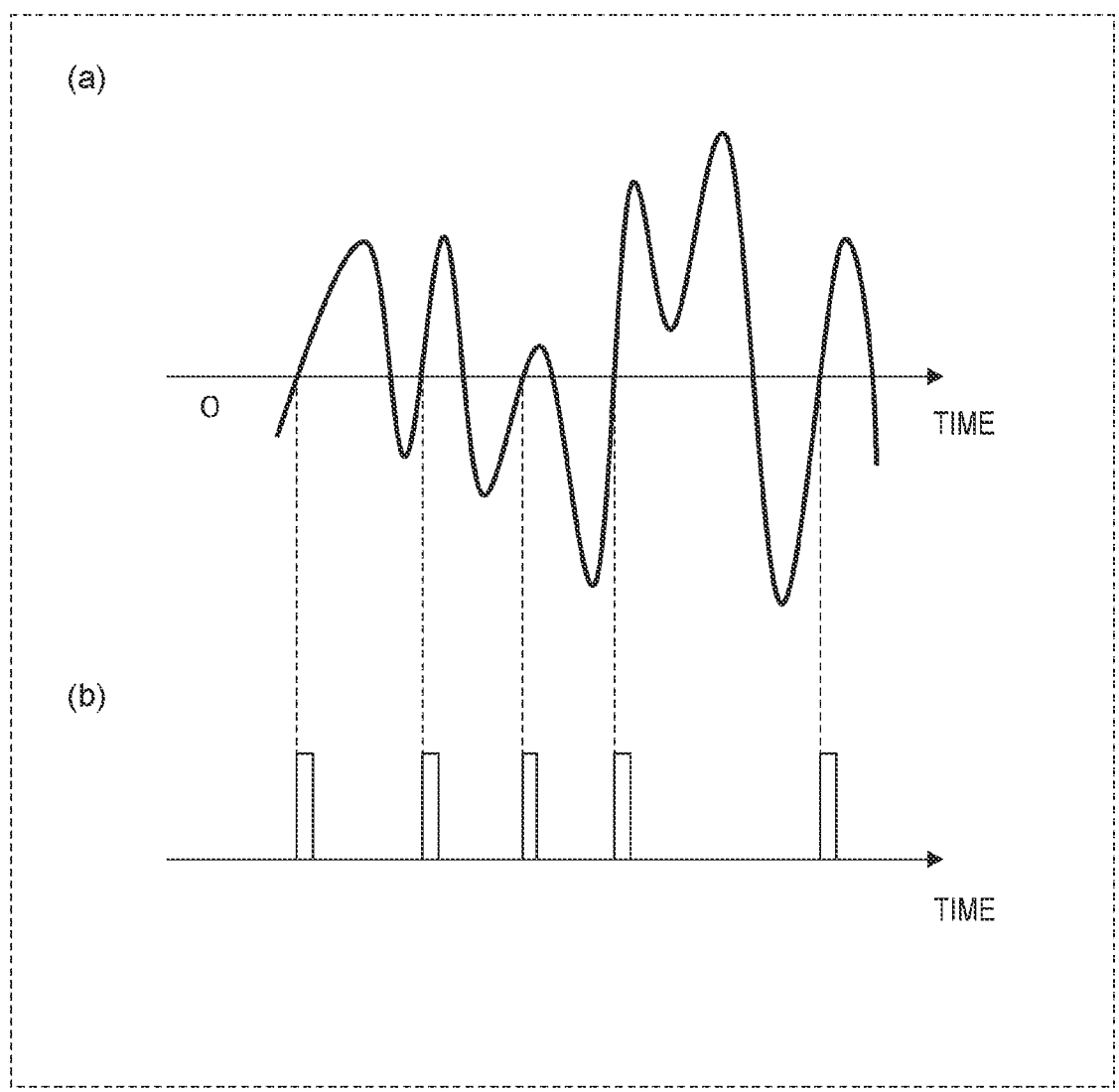
FIG. 14B are explanatory diagrams showing an example of counting, FIG. 14B(a) is an explanatory diagram showing an example of vibration of a variation amount, and FIG. 14B(b) is an explanatory diagram showing a counted flag.

The threshold value cross detector 52f detects that the input variation amount has crossed a predetermined threshold value. For example, when the variation amount varies as shown in FIG. 14B(a), the threshold value cross detector 52f detects that, for example, the variation amount has changed from less than the zero value being the threshold value to the zero value or more, and outputs a detection signal to the counter 52g as shown in FIG. 14B(b). It should be noted that the threshold value cross detector 52f may halve the detection cycle, and may also count a decrease change from the zero value or more to less than the zero value in addition to an increase change in the variation amount from less than the zero value being the threshold value to the zero value or more.

The counter 52g measures the number of detection signals to be input during a predetermined period. The predetermined period may be, for example, in the form of a time window, or may be the most recent predetermined time.

The vibration determinator 52h determines whether vibration having a high-frequency band component is generated in the variation amount (S405). The vibration determinator 52h determines whether or not a high-frequency band component is included in the variation amount, for example, by comparing the number of times the variation amount has crossed the threshold value within a predetermined period with the count threshold value. The vibration determinator 52h compares the number of times the counter 52g has counted with the count threshold value.

When determining that the number of times counted by the counter 52g is smaller than the count threshold value, the vibration determinator 52h determines that the high-frequency band component is not included in the variation amount for a certain period of time or more, and recognizes that the vibration having the high-frequency band component is not included in the vibration of the vehicle 200 based on the determination result.

When determining that the number of times counted by the counter 52g is equal to or larger than the count threshold value, the vibration determinator 52h recognizes that the variation amount includes vibration having a high-frequency band component.

The correction controller 52A outputs the generation detection result of vibration having a high-frequency band component to the display processing device 30 (S405). Specifically, when vibration having a high-frequency band component is generated, a signal indicating that vibration having a high-frequency band component is generated is sent to the display processing device 30.

The correction controller 52A calculates the vibration correction amount C based on the deviation amount y calculated based on the attitude change amount (S407). For example, the correction controller 52A determines such vibration correction amount C as returns the pitch angle deviation amount y to the original value.

The correction controller 52A outputs the information on the vibration correction amount C to the display processing device 30 (S408).

The correction controller 52A determines whether to continue the calculation processing (S409). For example, when the engine of the vehicle 200 is stopped, when a button for instructing termination of display of the display content Iv is operated, or the like, the correction controller 52A terminates the calculation processing. If the calculation processing is continued, the process returns to step S401.

As described above, the display system 100A of the present embodiment includes the vibration detector 52c that detects that vibration having a specific frequency band component has been generated for a certain period of time or more in the attitude variation of the moving body. The processing switcher 32a switches the order of processing between the image correction processing and the vibration correction processing based on the detection result of the vibration detector 52c.

With this configuration, it is possible to suppress positional deviation of the display position of the display content Iv with respect to the superimposition target. In the display system 100A, by switching the order of processing between the image correction processing and the vibration correction processing, it is possible to suppress a decrease in the correction accuracy of the display position of the display content Iv.

The vibration having a specific frequency band component is high-frequency vibration having a high-frequency band component. If vibration having a high-frequency band component has been generated for a certain period of time or more, the processing switcher 32a switches the order of processing so as to perform the vibration correction processing after performing the image correction processing. In addition, if vibration having a high-frequency band component has not been generated for a certain period of time or more, the processing switcher 32a switches the order of processing so as to perform the image correction processing after performing the vibration correction processing.

With this configuration, since the order of processing can be optimized according to the traveling status, it is possible to improve the superimposition performance and the quality while achieving both the accuracy of the vibration correction processing and the accuracy of the image correction processing. The delay time of the vibration correction processing allowable with respect to the superimposition accuracy to be a target varies for each frequency of vibration. The delay time of the vibration correction processing means the time from the calculation of the vibration correction amount to the display. For example, the higher the vibration frequency, the shorter the delay time of the vibration correction processing allowable in order to suppress the vibration correction error to a certain level or less. Therefore, by detecting that vibration having a high-frequency band component of a specific frequency band or more has been generated for a certain period of time or more in the attitude variation of the moving body and switching the order of processing between the image correction processing and the vibration correction processing according to the detection result, optimal processing can be performed according to the traveling status of the moving body. For example, when vibration having a high-frequency band component has been generated for a certain period of time or more, by performing the vibration correction processing after the image correction processing, it is possible to reduce the delay time of the vibration correction processing, enlarge the band on the high-frequency side that can be corrected, and suppress the vibration correction error. When vibration having a high-frequency band component has not been generated for a certain period of time or more, by performing the image correction processing after the vibration correction processing, the accuracy of the image correction processing can be improved.

In addition, similarly to the first embodiment, also in the present embodiment, even when the display content Iv is updated and the information amount changes, the vibration correction processing and the image correction processing can be performed in the optimum order of processing based on the detection result of the vibration having a high-frequency band component.

In addition, since the frequency band and amplitude of the vibration generated depending on the situation of the track change variously, for example, when filter processing of a high-pass filter, a low-pass filter, a band-pass filter, and the like is applied, the amplitude of the vibration needs to be included in a determination criterion, but it is difficult to predict the amplitude of the vibration. It is difficult to set an optimum threshold value of the filter processing. On the other hand, according to the present embodiment, when the high-frequency component is detected by the counter value, the amplitude of the vibration does not need to be included in the determination criterion, and the high-frequency band can be accurately detected.

It should be noted that in the present embodiment, an example has been described in which the vibration detector 52c includes the variation amount calculator 52m, the offset removal filter 52e, the threshold value cross detector 52f, the counter 52g, and the vibration determinator 52h, but the present disclosure is not limited thereto. The vibration detector 52c only needs to be able to detect that vibration having a specific frequency band component has been generated for a certain period of time or more.

In the present embodiment, an example has been described in which when vibration having a high-frequency band component is generated, the vibration correction processing is performed after the image correction processing is performed, but the present disclosure is not limited thereto. For example, when vibration having a high-frequency band component is generated, the vibration correction processing does not need to be performed. Alternatively, the vibration correction amount C may be set to "0".

In the present embodiment, an example has been described in which the specific frequency vibration is vibration having a high-frequency band component, but the present disclosure is not limited thereto. For example, the specific frequency vibration may be vibration having a low frequency band component of a predetermined frequency band or less. The processing switcher 32a may switch the order of processing between the vibration correction processing and the image correction processing based on whether or not vibration having a low frequency band component has been generated for a certain period of time or more. Specifically, when vibration having a low frequency band component has been generated for a certain period of time or more, the processing switcher 32a may perform the image correction processing after performing the vibration correction processing. When vibration having a low frequency band component has not been generated for a certain period of time or more, the processing switcher 32a may perform the vibration correction processing after performing the image correction processing.

Third Embodiment

In the first to second embodiments, the vibration correction amount C is calculated based on the deviation amount regardless of the order of processing. In the present embodiment, when the image correction processing is performed after the vibration correction processing, the vibration correction amount C is calculated based on the deviation amount, and when the vibration correction processing is performed after the image correction processing, the vibration correction amount C is calculated based on the deviation amount and the image correction error. In addition, in the present embodiment, the calculation processing of the vibration correction amount C is switched based on the image processing time Td.

Figure 15:
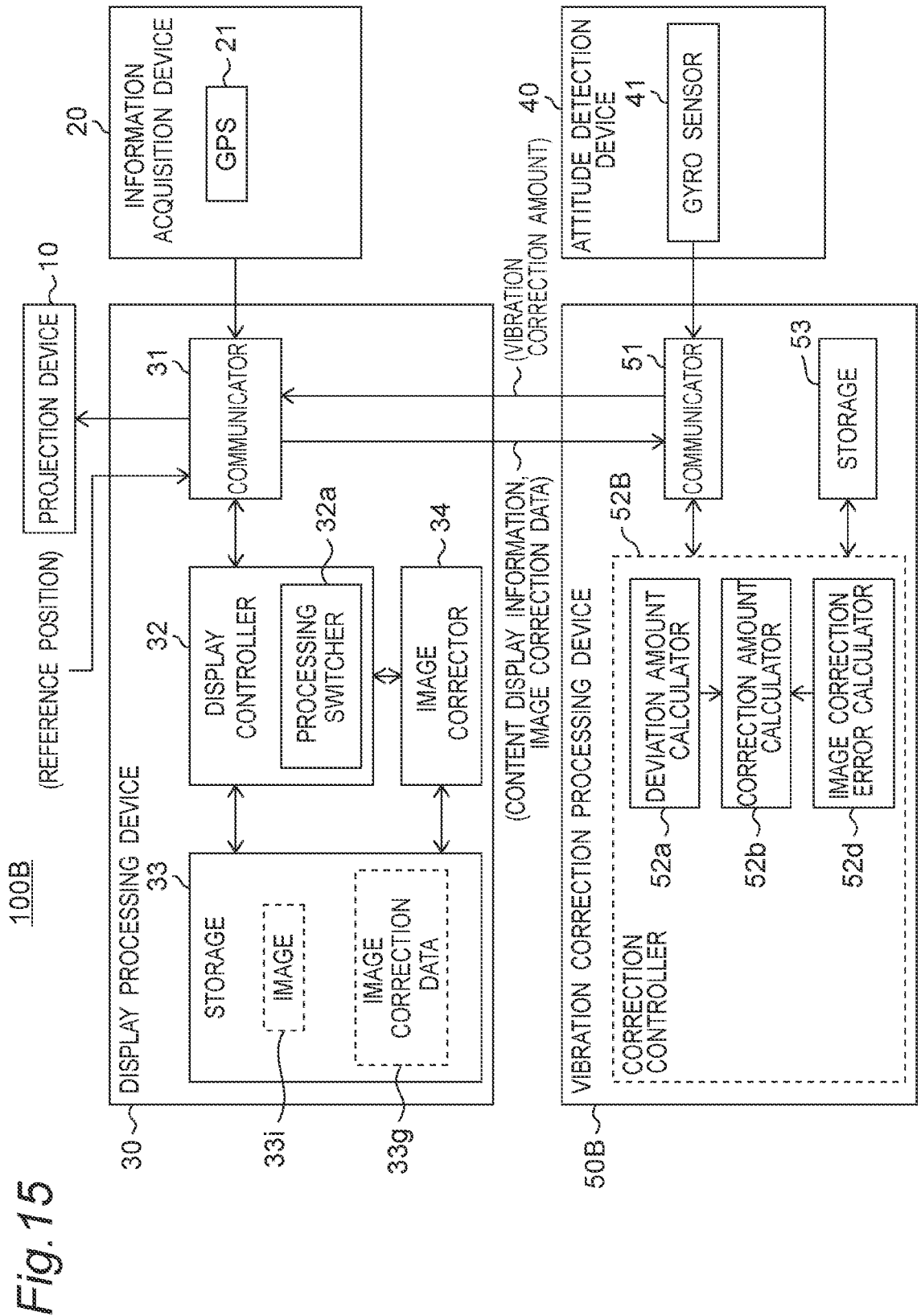
FIG. 15 is a block diagram showing an internal configuration of a display system in a third embodiment.

An internal configuration of a display system 100B will be described with reference to FIG. 15. FIG. 15 is a block diagram showing an internal configuration of a display system 100B in the third embodiment. The display system 100B shown in FIG. 15 is different from the display system 100 of the first embodiment in that the correction controller 528 includes an image correction error calculator 52d. The other configuration of the display system 100B shown in FIG. 15 is similar to that of the display system 100 of the first embodiment.

The image correction error calculator 52d calculates an image correction error of the image correction processing caused by the vibration correction processing of correcting the display deviation caused by the attitude variation of the vehicle 200. Specifically, the image correction error calculator 52d calculates the initial position of the display content Iv based on the content display information output from the display processing device 30. The initial position means the display position of the display content Iv when the vibration correction amount is "0". For example, the initial position may be a display reference position first acquired from an external device, or may be a position of a feature portion of the display content Iv when the vibration correction amount is "0".

Figure 16A:
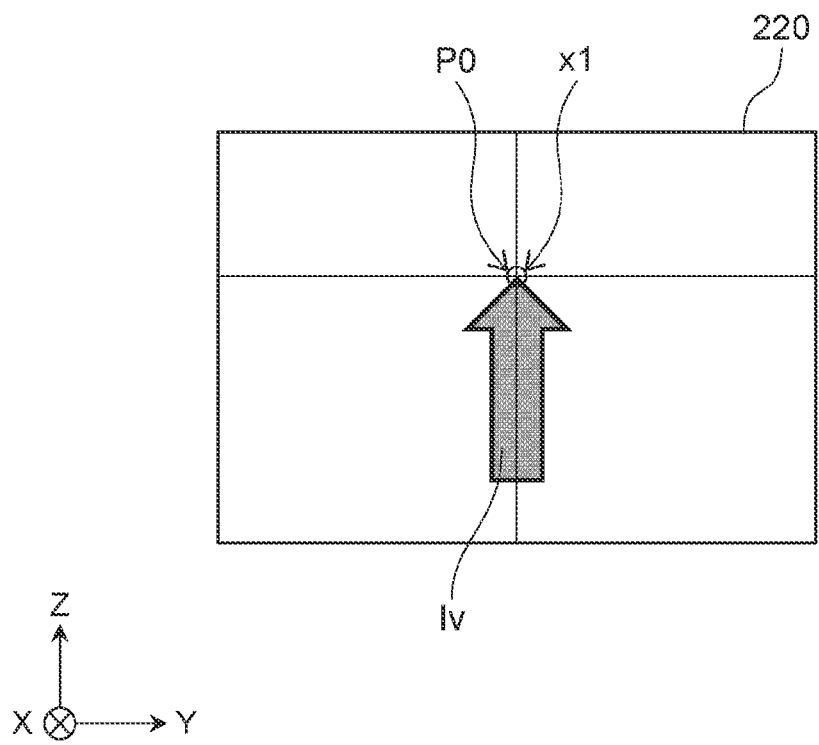
FIG. 16A is a view showing an example of an initial position of display content.
Figure 16B:
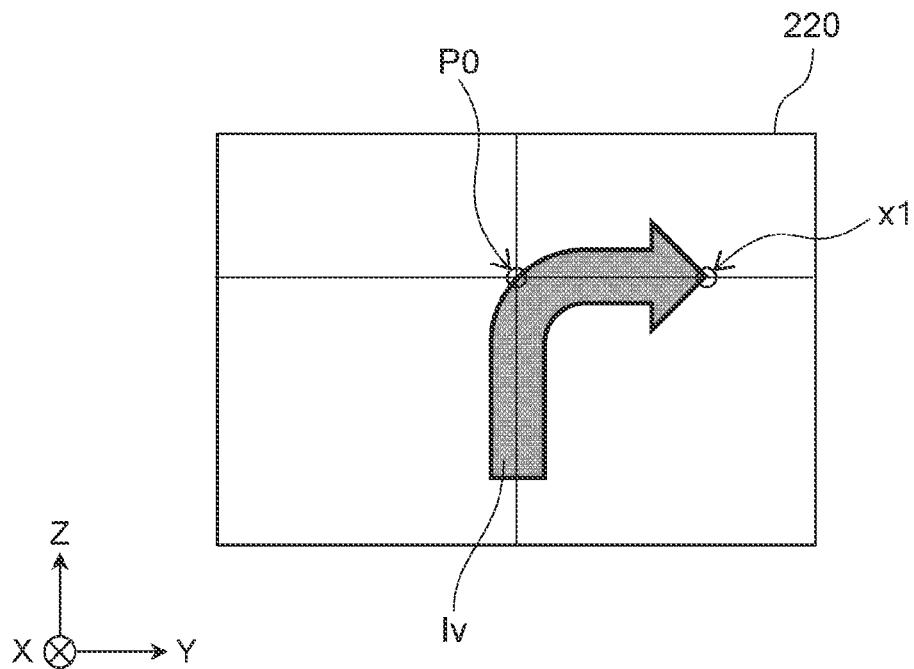
FIG. 16B is a view showing another example of an initial position of display content.

In the present embodiment, the initial position is the display position of the feature portion of the display content Iv when the vibration correction amount is "0". For example, when the display content Iv is an arrow, the feature portion is a tip portion of the arrow. In this case, the initial position is the display position of the tip portion of the arrow. FIG. 16A is a view showing an example of the initial position x1 of the display content Iv. The display content Iv shown in FIG. 16A is an arrow having a linear shape extending in one direction. In the example shown in FIG. 16A, the initial position x1 of the display content Iv coincides with a display reference position P0 being the display position of the display content Iv when the vibration correction amount is "0". FIG. 16B is a view showing another example of the initial position x1 of the display content Iv. The display content Iv shown in FIG. 16B is an arrow having a shape bent by 90°. In the example shown in FIG. 16B, the initial position x1 of the display content Iv is different from the display reference position P0.

The image correction error calculator 52d acquires the image correction value (image correction data) from the display processing device 30 through the communicator 31. The image correction error calculator 52d calculates the image correction error based on the initial position of the display content Iv, the deviation amount calculated by the deviation amount calculator 52a, and the image correction value (image correction data) acquired from the display processing device 30.

For example, the image correction error calculator 52d acquires the correction value (first image correction value) of the image correction at the initial position of the display content Iv. In addition, the image correction error calculator 52d acquires the correction value (second image correction value) of the image correction at the display position of the display content Iv on which the vibration correction is performed based on the deviation amount calculated by the deviation amount calculator 52a. The image correction error calculator 52d calculates the image correction error by subtracting the first image correction value from the second image correction value. That is, the image correction error is a difference between the first image correction value at the initial position of the display content Iv and the second image correction value at the display position of the display content Iv to be displayed when vibration correction based on the deviation amount calculated by the deviation amount calculator 52a is performed.

In the present embodiment, the image correction error calculator 52d stores the correction value table to which the correction value of the image correction corresponding to the deviation amount from the initial position is assigned. For example, the image correction error calculator 52d includes a storage, and stores the correction value table in the storage. The image correction error calculator 52d calculates the image correction error based on the initial position, the deviation amount, and the correction value table.

In the present specification, the correction value of the image correction corresponding to the deviation amount from the initial position may be referred to as a first correction value, and the correction value table may be referred to as a first correction value table.

When the image correction processing is performed after the vibration correction processing, the correction amount calculator 52b calculates the vibration correction amount C based on the deviation amount y. In the present embodiment, when the image processing time Td is equal to or less than the first threshold value T1, the correction amount calculator 52b calculates the vibration correction amount C based on the deviation amount y.

When the vibration correction processing is performed after the image correction processing, the correction amount calculator 52b calculates the vibration correction amount C based on the deviation amount y and the image correction error of the image correction processing caused by the vibration correction processing of correcting the display deviation caused by the attitude variation of the vehicle 200. In the present embodiment, when the image processing time Td is larger than the first threshold value T1, the correction amount calculator 52b calculates the vibration correction amount C based on the deviation amount y and the image correction error. Specifically, the correction amount calculator 52b calculates the vibration correction amount C based on the deviation amount y calculated by the deviation amount calculator 52a and the image correction error calculated by the image correction error calculator 52d.

Figure 17:
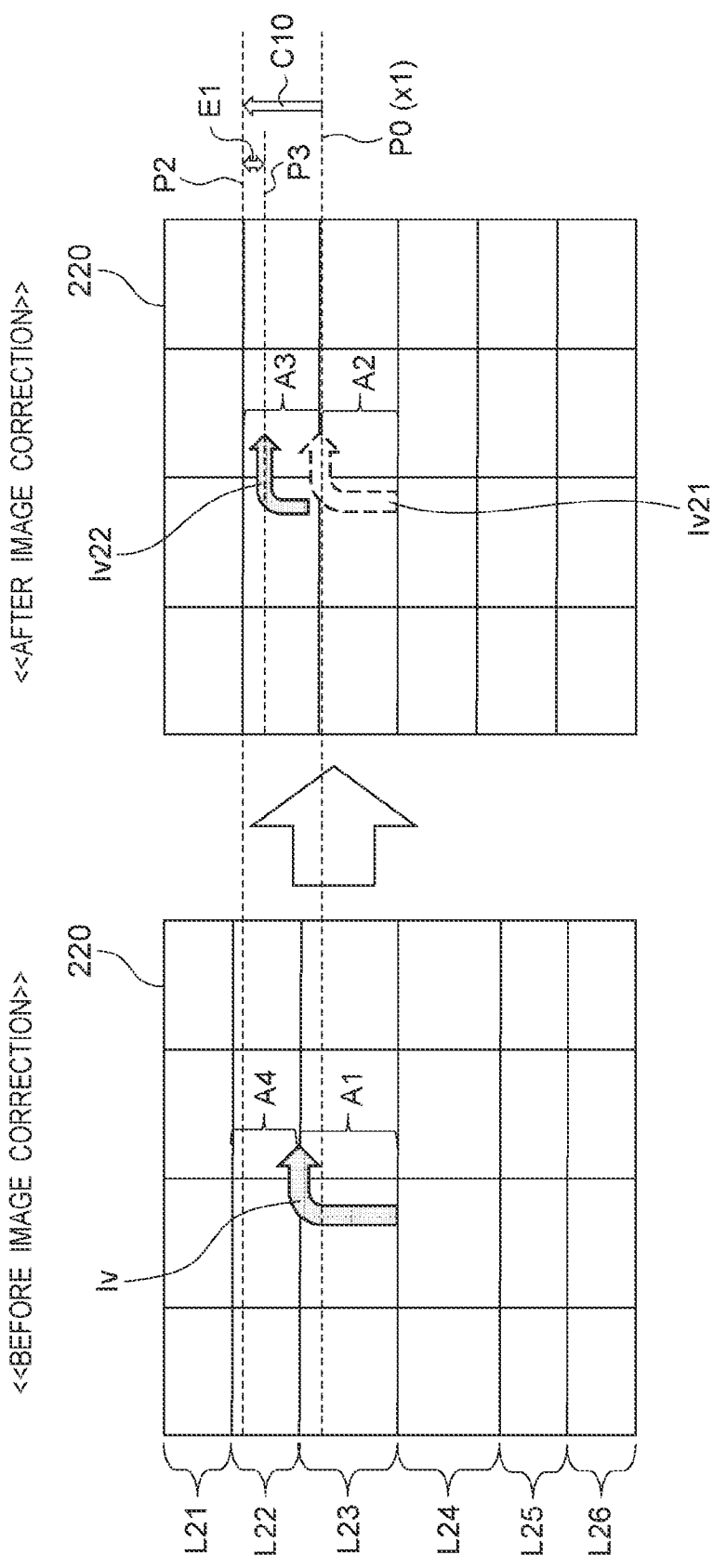
FIG. 17 is a diagram showing an example in which an image correction error occurs when vibration correction processing is performed after image correction processing.

With reference to FIG. 17, the image correction error E1 of the image correction processing caused by the vibration correction processing of correcting the display deviation caused by the attitude variation of the vehicle 200 will be described. FIG. 17 shows an example in which the image correction error E1 of the image correction processing occurs when the vibration correction processing is performed after the image correction processing is performed. In the example shown in FIG. 17, distortion occurs in the vertical direction of the display area 220. Therefore, when the display area 220 is divided into a plurality of partitioned areas, the sizes of the plurality of partitioned areas are different due to distortion.

In the example shown in FIG. 17, in the vertical direction of the display area 220, the sizes of the upper side areas L21 and L22 and the lower side areas L25 and L26 are smaller than those of the partitioned areas without distortion. In addition, the sizes of the central areas L23 and L24 are larger than those of the partitioned areas without distortion. Therefore, in the upper side areas L21 and L22 and the lower side areas L25 and L26, the display content Iv is corrected so as to increase in size in the vertical direction. In addition, in the central areas L23 and L24, the display content Iv is corrected so as to decrease in size in the vertical direction.

That is, in the image correction processing of correcting from "A1 to A2" in the central area L23 in FIG. 17, the reduction processing is applied, and the display content Iv is corrected to decrease in size in the vertical direction. In the image correction processing of correcting from "A4 to A3" in the upper side area L22 in FIG. 17, the enlargement processing is applied, and the display content Iv is corrected to increase in size in the vertical direction.

First, a case will be described where the display content Iv is displayed at the central area L23 before the correction processing, and the vibration correction amount by the vibration correction processing is "0". In this case, in the image correction processing, the reduction processing of correcting "from A1 to A2" in the central area L23 in FIG. 17 is applied, and the display content Iv is corrected to decrease in size in the vertical direction.

In the vibration correction processing, since the vibration correction amount is "0", the display position of the display content Iv is not changed by the vibration correction processing. Therefore, the display position of the display content Iv21 after the vibration correction is not changed from the display reference position P0. That is, the display content Iv21 is not deviated from the superimposing position. It should be noted that in the example shown in FIG. 17, the display content Iv is an arrow having a shape bent by 90°, and the initial position x1 is the same as the display reference position P0 in the yaw axis direction (Z-axis direction), but the present disclosure is not limited thereto. The initial position x1 may be different from the display reference position P0.

Next, a case will be described where the display content Iv is displayed at the central area L23 before the correction processing, and the vibration correction amount in the yaw axis direction (Z-axis direction) by the vibration correction processing is "C10". In this case, the target display position P2 of the display content Iv22 after the correction is calculated by "display reference position (initial position) P0+vibration correction amount C10". For example, when the initial position (display reference position P0) of the display content Iv when the vibration correction amount is "0" is x1, the target display position P2 is calculated by "initial position x1 vibration correction amount C10". In the example shown in FIG. 17, the display content Iv22 is displayed at the upper side area L22, one area above the central area L23 (see "A3" in FIG. 17).

When the display content Iv22 is displayed at the upper side area L22, it is preferable that the enlargement processing of correcting from "A4 to A3" of the upper side area L22 in FIG. 17 is applied as the image correction processing. That is, when the display content Iv22 is displayed at the upper side area L22, the display content Iv is preferably corrected so as to increase in size in the vertical direction.

However, as described above, in the correction processing, the vibration correction processing is performed after the image correction processing is performed. In the example shown in FIG. 17, before the vibration correction processing is performed, that is, when the image correction processing is performed, the display content Iv is displayed at the central area L23. Therefore, in the image correction processing, the reduction processing of correcting from "A1 to A2" at the central area L23 in FIG. 17 is applied instead of the enlargement processing of correcting from "A4 to A3" at the upper side area L22 in FIG. 17. That is, the display content Iv is corrected so as to decrease in size in the vertical direction.

As described above, when the display position of the display content Iv22 is changed by the vibration correction processing, an image correction error E1 occurs in the image correction processing performed before the vibration correction processing. Accordingly, the display content Iv22 after the correction is displayed at the display position P3 lower than the target display position P2.

Thus, in the display system 100B of the present embodiment, when the vibration correction processing is performed after the image correction processing, the vibration correction amount C at the display position of the display content Iv is calculated based on the vibration and the image correction error. Accordingly, the display position of the display content Iv after the correction can be prevented from deviating from the target display position, and the decrease in the correction accuracy of the display position of the display content Iv can be prevented.

Figure 18:
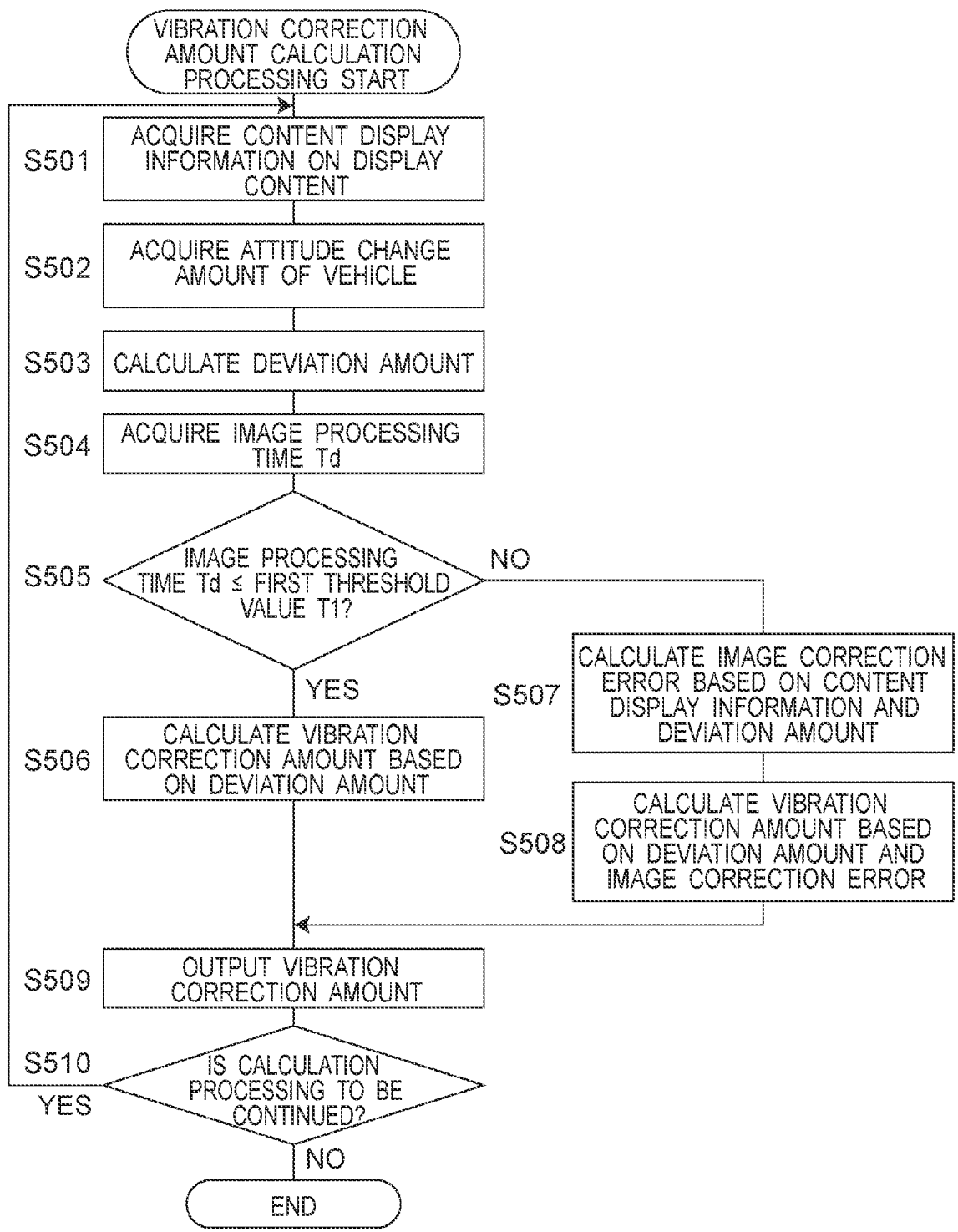
FIG. 18 is a flowchart showing calculation processing of a vibration correction amount in the third embodiment.

The operation of the correction controller 52B of the vibration correction processing device 50B according to the third embodiment will be described with reference to FIG. 18. FIG. 18 shows correction processing performed by the correction controller 52B of the vibration correction processing device 50B. Steps S501 to S503, S506, and S509 to S510 in FIG. 18 are similar to steps S201 to S206 in FIG. 10 of the first embodiment.

The correction controller 52B acquires the content display information on the display content Iv from the display processing device 30 (S501). The correction controller 52B acquires the attitude change amount indicating the angular velocity of the vehicle 200 output from the gyro sensor 41 (S502). The correction controller 52B calculates the attitude of the vehicle 200, that is, the deviation amount y with respect to the triaxial direction based on the attitude change amount (S503).

The correction controller 52B changes the calculation processing of the vibration correction amount C based on the order of processing between the image correction processing and the vibration correction processing. Specifically, when the image correction processing is performed after the vibration correction processing, the correction controller 52B calculates the vibration correction amount based on the deviation amount y. When the vibration correction processing is performed after the image correction processing, the correction controller 52B calculates the vibration correction amount C based on the deviation amount y and the image correction error E1. In the present embodiment, the correction controller 52B switches the calculation processing of the vibration correction amount C based on the image processing time Td of the image correction processing and the first threshold value T1.

The correction controller 52B acquires information on the image processing time Td (S504). For example, the correction controller 52B acquires information on the image processing time Td from the display processing device 30.

The correction controller 52B determines whether the image processing time Td is equal to or less than the first threshold value T1 (S505). If the image processing time Td is equal to or less than the first threshold value T1 (Yes in S505), the correction controller 52B calculates the vibration correction amount C based on the deviation amount y (S506).

If the image processing time Td is larger than the first threshold value T1 (No in S504), the correction controller 52B calculates the vibration correction amount C based on the deviation amount y and the image correction error E1. Specifically, based on the content display information, the deviation amount y calculated based on the attitude change amount, and the image correction value U (image correction data), the correction controller 52B calculates the image correction error E1 of the image correction caused by the vibration correction processing of correcting the display deviation caused by the attitude variation of the vehicle 200 (S507). Based on the content display information output from the display processing device 30, the correction controller 52B calculates an initial position x1 serving as a display position of the display content Iv when the vibration correction amount is "0". The initial position x1 may change depending on the display reference position P0 and/or the feature portion of the display content Iv (see FIGS. 16A and 16B). Therefore, the initial position x1 is calculated based on the content display information (for example, the display reference position P0 and the content information). The correction controller 52B calculates the image correction error E1 based on the initial position x1 of the display content Iv, the deviation amount y, and the image correction value U (image correction data). The image correction error E1 is calculated by a difference between the first image correction value at the initial position x1 of the display content Iv and the second image correction value at the display position of the display content Iv after the vibration correction based on the deviation amount y.

Calculation of the image correction error E1 will be described. The image correction error E1 can be calculated in all the partitioned areas shown in FIGS. 6A and 6B, whereas the number of the vibration correction amounts C is one. Therefore, the number of the image correction errors E1 that can be added to the vibration correction is also one. Since the display content Iv is displayed across the plurality of partitioned areas, the correction accuracy of the display content Iv can be improved by selecting an image correction error at which partitioned area among the plurality of partitioned areas in which the display content Iv is positioned to be added to the vibration correction amount. In the present embodiment, the partitioned area to be used for the calculation of the image correction error E1 is selected based on the display position of the feature portion of the display content Iv, that is, the initial position x1. Accordingly, the accuracy of the display deviation correction of the feature portion of the display content Iv can be improved.

Figure 19A:
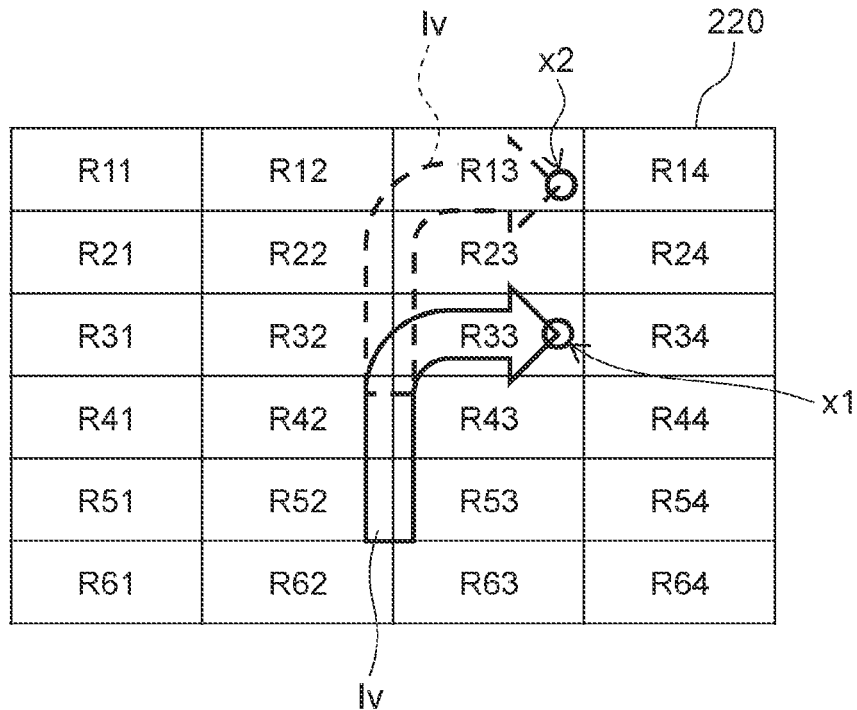
FIG. 19A is a diagram showing an example of a display position of display content before and after vibration correction in the display area.
Figure 19B:
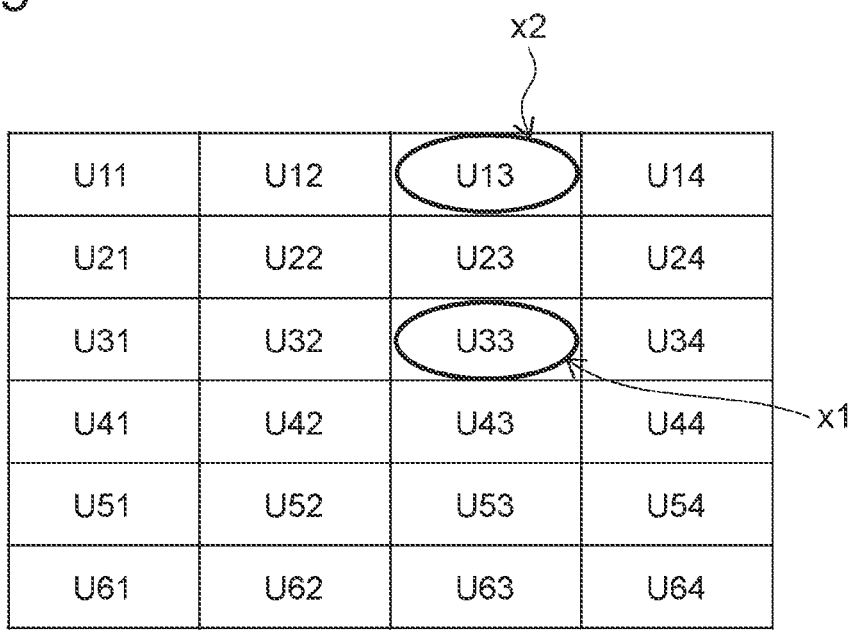
FIG. 19B is a diagram for illustrating a first image correction value before vibration correction and a second image correction value after vibration correction.

An example of calculation of the image correction error E1 will be described with reference to FIGS. 19A and 19B. FIG. 19A shows an example of a display position of display content Iv before and after vibration correction in the display area 220. FIG. 19B is a diagram illustrating the first image correction value before the vibration correction and the second image correction value after the vibration correction in the example in FIG. 19A. It should be noted that in FIG. 19A, the display content Iv represented by a solid line indicates the display position before the vibration correction, and the display content Iv represented by a dotted line indicates the display position after the vibration correction. FIG. 19B shows an image correction table including image correction values U11 to U64 respectively assigned to the plurality of partitioned areas R11 to R64 of the display area 220 shown in FIG. 19A.

In the example shown in FIG. 19A, before the vibration correction, that is, when the vibration correction amount is "0", the tip of the arrow being the feature portion of the display content Iv is positioned in the first partitioned area R33. Therefore, the initial position x1 of the display content Iv is the first partitioned area R33. After the vibration correction, the tip of the arrow being the feature portion of the display content Iv is positioned in the second partitioned area R13 above the first partitioned area R33. Therefore, the display position x2 of the feature portion of the display content Iv after the vibration correction is the second partitioned area R13.

Referring to FIG. 19B, the first image correction value assigned to the first partitioned area R33 is "U33". In addition, the second image correction value assigned to the second partitioned area R13 is "U13".

Therefore, the image correction error E1 is calculated by subtracting the first image correction value U33 from the second image correction value U13.

In the present embodiment, the correction controller 52B has a first correction value table to which the first correction value Ea of the image correction corresponding to the deviation amount y from the initial position x1 is assigned. The correction controller 52B calculates the image correction error E1 based on the initial position x1, the deviation amount y, and the first correction value table. Specifically, the correction controller 52B acquires the correction value Ex as the first image correction value of the image correction at the initial position x1. For example, the correction value Ex is acquired from the image correction values U11 to U64 assigned to the plurality of partitioned areas R11 to R64 shown in FIGS. 6A and 6B. In addition, the correction controller 52B refers to the first correction value table and acquires the first correction value Ea as the second image correction value of the image correction at the display position x2 of the display content Iv after the vibration correction based on the deviation amount y from the initial position x1. The correction controller 52B calculates the image correction error E1 by subtracting the correction value Ex from the first correction value Ea.

FIG. 20 shows an example of the first correction value table including the first correction value Ea of the image correction assigned to the deviation amount y from the initial position x1 of the display content Iv. In the example shown in FIG. 20, the first correction value table including the first correction value Ea indicating the image correction value in the Z-axis direction corresponding to the angular deviation amount y about the Y-axis from the initial position x1 is shown. As shown in FIG. 20, in the first correction value table, the first correction value Ea is determined every time the angular deviation amount y changes by 0.01 [deg.]. For example, when the angular deviation amount y is $-0.01 \leq y < 0.00$, the first correction value Ea is E100, and when the angular deviation amount y is $-M/100 \leq y < -(M-1)/100$, the first correction value Ea is Em. In addition, when the angular deviation amount y is $0.00 \leq y < +0.01$, the first correction value Ea is E200, and when the angular deviation amount y is $+(N-1)/100 \leq y < +N/100$, the first correction value Ea is En. It should be noted that "M" and "N" mean any constants.

It should be noted that in the example shown in FIG. 20, an example in which the first correction value Ea is assigned every time the deviation amount y from the initial position x1 changes by 0.01 [deg.] has been described, but the present disclosure is not limited thereto. The range of the deviation amount y to which the first correction value Ea is assigned is not limited to every 0.01 [deg.]. In addition, in the example shown in FIG. 20, the first correction value Ea is assigned to the deviation amount y in the pitch axis direction from the initial position x1, but a correction value may be assigned to the deviation amount in the yaw axis direction and the roll direction from the initial position x1.

An example of calculation of the image correction error E1 using the first correction value table shown in FIG. 20 will be described. The correction value Ex (first image correction value) of the image correction at the initial position x1 of the display content Iv is calculated based on the initial position x1 and the image correction data 33g. For example, when initial position x1 is within the partitioned area R23 shown in FIG. 6A, the correction value Ex is determined as the image correction value U23. The first correction value Ea (second image correction value) of the image correction at the display position x2 of the display content Iv after the vibration correction based on the deviation amount y from the initial position x1 is calculated based on the initial position x1, the deviation amount y, and the first correction value table. For example, when the display position x2 of the display content Iv after the vibration correction is a position of −0.015 [deg.] around the Y-axis from the initial position x1, the image correction value E101 in the Z direction corresponding to the deviation amount "$-0.02 \leq y < -0.01$" is determined as the first correction value Ea with reference to the first correction value table shown in FIG. 20. In this case, the image correction error E1 is calculated by subtracting the image correction value U23 from the image correction value E101.

In the present embodiment, the correction controller 52B calculates the initial position x1, being the display position of the feature portion of the display content Iv when the vibration correction amount is "0" based on the content display information. For example, when the display content Iv is an arrow, the correction controller 52B calculates the display position of the tip of the arrow when the vibration correction amount is "0" as the initial position x1. The first correction value Ea is calculated based on a difference between the first image correction value (correction value Ex) at the first display position (initial position) of the feature portion of the display content Iv when the vibration correction amount is "0" and the second image correction value (first correction value Ea) at the second display position of the feature portion of the display content Iv after vibration correction. Accordingly, the display processing device 30 can control the display position of the feature portion of the display content Iv.

Returning to FIG. 18, after calculating the image correction error E1, the correction controller 52B calculates the vibration correction amount C based on the deviation amount y and the image correction error E1 (S508). For example, the correction controller 52B returns the pitch angle deviation amount y to the original value and determines such vibration correction amount C as eliminates the image correction error E1. Specifically, the correction controller 52B calculates the deviation correction amount by converting the deviation amount y being angle information into the number of pixels. The correction controller 52B adds the image correction error E1 to the deviation correction amount to determine such vibration correction amount C as returns the number of pixels corresponding to the deviation to the original value.

The correction controller 52B outputs the information on the vibration correction amount C to the display processing device 30 (S509).

The correction controller 52B determines whether to continue the calculation processing (S510). If the calculation processing is continued, the process returns to step S501.

As described above, in the present embodiment, when the processing switcher 32a switches the order of processing so as to perform the vibration correction processing after performing the image correction processing, the vibration correction processing device 50B calculates the vibration correction amount C based on the deviation amount y and the image correction error E1. Specifically, when the image processing time Td is larger than the first threshold value T1, the vibration correction processing device 50B calculates the deviation amount y of the display position of the display content Iv based on the attitude change amount of the moving body. The vibration correction processing device 50B calculates an initial position x1 of the display content Iv based on the content display information output from the display processing device 30. The vibration correction processing device 50B calculates the image correction error E1 based on the initial position x1, the deviation amount y, and the image correction value U (image correction data). The vibration correction processing device 50R calculates the vibration correction amount C based on the deviation amount y and the image correction error E1.

With this configuration, it is possible to suppress positional deviation of the display position of the display content Iv with respect to the superimposition target. Specifically, when the vibration correction processing is performed after the image correction processing is performed, it is possible to suppress the positional deviation of the display position of the display content Iv due to the image correction error E1 of the image correction caused by the vibration correction processing. Accordingly, it is possible to suppress a decrease in correction accuracy of the display position of the display content Iv.

The vibration correction processing device 50B includes a first correction value table to which the first correction value Ea of the image correction processing corresponding to the deviation amount y from the initial position x1 is assigned, and calculates the image correction error E1 based on the initial position x1, the deviation amount y, and the first correction value table.

With this configuration, the image correction error E1 can be easily calculated based on the deviation amount y from the initial position x1. As a result, the positional deviation of the display position of the display content Iv can be further suppressed.

It should be noted that in the present embodiment, an example has been described in which the calculation processing of the vibration correction amount C is switched based on the image processing time Td, but the present disclosure is not limited thereto. For example, the vibration correction processing device 50B may acquire the processing switching signal from the processing switcher 32a of the display processing device 30 and switch the calculation processing of the vibration correction amount C based on the processing switching signal. In this case, when the image processing time Td is larger than the first threshold value T1, the display processing device 30 may output, to the vibration correction processing device 50B, a signal for switching to calculation processing of the vibration correction amount C that is based on the deviation amount y and the image correction error E1. In addition, when the image processing time Td is equal to or less than the first threshold value T1, the display processing device 30 may output, to the vibration correction processing device 50B, a signal for switching to calculation processing of the vibration correction amount C that is based on the deviation amount y.

In the present embodiment, an example has been described in which the correction controller S213 includes the first correction value table indicating the first correction value Ea of the image correction corresponding to the deviation amount y from the initial position of the display content Iv, but the present disclosure is not limited thereto. For example, the correction controller 52B does not need to have the first correction value table. In this case, the storage 53 may store the first correction value table. The correction controller 52B may read the first correction value table stored in the storage 53 to calculate the image correction error E1.

In the present embodiment, an example has been described in which the image correction error E1 is calculated using the first correction value table to which the first correction value Ea of the image correction corresponding to the angle deviation amount y from the initial position x1 of the display content Iv is assigned, but the present disclosure is not limited thereto. For example, the image correction error E1 may be calculated using the second correction value table to which the second correction value of the image correction corresponding to the deviation correction amount of the number of pixels from the initial position of the display content Iv is assigned.

Figure 21:
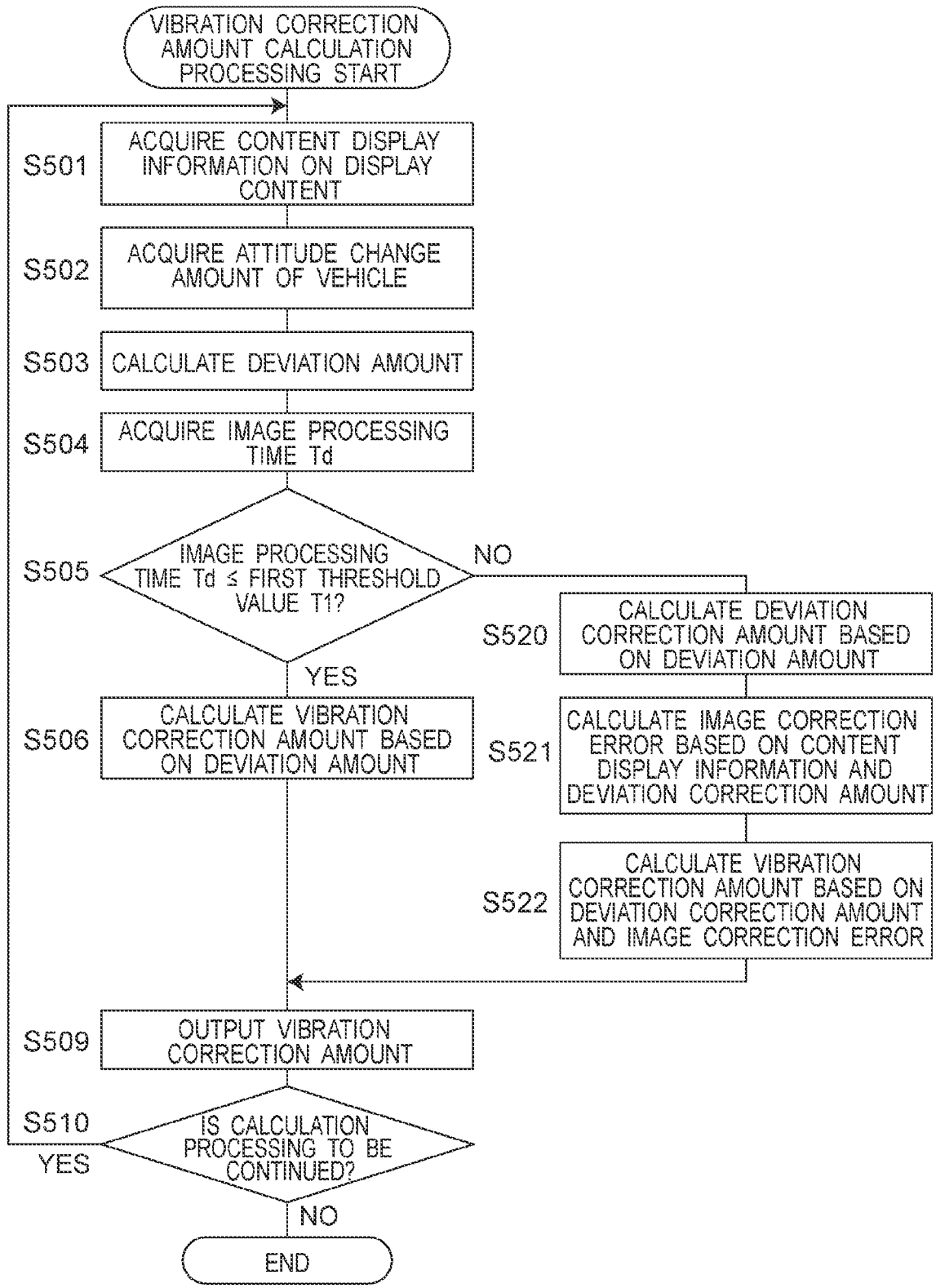
FIG. 21 is a flowchart showing calculation processing of a vibration correction amount according to a modification of the third embodiment.

FIG. 21 shows a flowchart showing calculation processing of a vibration correction amount C according to a modification of the third embodiment. The calculation processing of the vibration correction amount C in the modification shown in FIG. 21 includes steps S520 to S522 instead of steps S507 to S508 of the third embodiment shown in FIG. 18. Steps S520 to S522 show the calculation processing of the vibration correction amount C when the vibration correction processing is performed after the image correction processing. In the following, processing in steps S520 to S522 in FIG. 21 will be described.

The correction controller 52B calculates the deviation correction amount G based on the deviation amount y calculated based on the attitude change amount (S520). The correction controller 52B converts the deviation amount y into the number of pixels, and determines such a deviation correction amount G as offsets the deviation amount indicated by the number of pixels.

The correction controller 52B calculates the image correction error E1 based on the content display information and the deviation correction amount G (S521). The correction controller 52B includes a second correction value table to which the second correction value Eb of the image correction corresponding to the deviation correction amount G from the initial position x1 of the display content Iv is assigned. For example, the second correction value table is stored in a storage included in the image correction error calculator 52d.

FIG. 22 shows an example of the second correction value table including the second correction value Lb of the image correction assigned to the deviation correction amount G from the initial position x1 of the display content Iv. In the example shown in FIG. 22, the second correction value table including the second correction value Lb indicating the image correction value in the Z-axis direction corresponding to the deviation correction amount G in the Z direction from the initial position x1 is shown. As shown in FIG. 22, in the second correction value table, the second correction value Lb is determined for each deviation correction amount G of 1 [pixel]. For example, when the deviation correction amount G is $-1.0 \leq G < 0.0$, the second correction value Eb is E300, and when the deviation correction amount G is $-J \leq G < -(J-1)$, the second correction value Eb is Ej. In addition, when the deviation correction amount G is $0.0 \leq G < +1.0$, the second correction value Kb is E400, and when the deviation correction amount G is $+(K-1) \leq G < +K$, the second correction value Eb is Ek. It should be noted that "J" and "K" mean any constants.

It should be noted that in the example shown in FIG. 22, an example in which the second correction value Eb is assigned every time the deviation correction amount G from the initial position x1 changes by 1 [pixel] has been described, but the present disclosure is not limited thereto. The range of the deviation correction amount G to which the second correction value Kb is assigned is not limited to 1 [pixel]. In addition, in the example shown in FIG. 22, the second correction value Eb is assigned to the deviation correction amount G in the pitch axis direction, but the second correction value may be assigned to the deviation correction amount in the yaw axis direction and the roll direction.

The correction controller 52B calculates the image correction error E1 based on the initial position x1, the deviation correction amount G, and the second correction value table of the display content Iv. Specifically, the correction controller 52B acquires the correction value Ex (the first image correction value) of the image correction at the initial position x1. In addition, the correction controller 522 refers to the second correction value table and acquires the second correction value Eb (the second image correction value) of the image correction at the display position of the display content Iv after the vibration correction based on the deviation correction amount G from the initial position x1. The correction controller 528 calculates the image correction error E1 by subtracting the correction value Ex from the second correction value Eb.

An example of calculation of the image correction error E1 using the second correction value table shown in FIG. 22 will be described. The image correction error E1 is calculated by a difference between the correction value Ex (first image correction value) at the initial position x1 of the display content Iv and the second correction value Eb (second image correction value) at the display position x2 of the display content Iv after the vibration correction based on the deviation correction amount G from the initial position x1. The correction value Ex of the image correction at the initial position x1 of the display content Iv is calculated based on the initial position x1 and the image correction data 33g. For example, when initial position x1 is within the partitioned area R23 shown in FIG. 6A, the correction value Ex is determined as the image correction value U23 shown in FIG. 6B. The second correction value Eb of the image correction at the display position of the display content Iv after the vibration correction based on the deviation correction amount G is calculated based on the initial position x1, the deviation correction amount G, and the second correction value table. For example, when the display position of the display content Iv after the vibration correction based on the deviation correction amount G is a position of −0.8 [pixel] in the Z-axis direction from the initial position x1, the image correction value E300 in the Z direction corresponding to the deviation correction amount "−1.0≤G<0.0" is determined as the second correction value Eb with reference to the second correction value table shown in FIG. 22. In this case, the image correction error E1 is calculated by subtracting the image correction value U23 from the image correction value E300.

Returning to FIG. 21, the correction controller 52B calculates the vibration correction amount C based on the deviation correction amount G and the image correction error E1 (S522). The correction controller 52B calculates the vibration correction amount C by adding the image correction error E1 to the deviation correction amount G. Specifically, the correction controller 52B adds the image correction error E1 to the deviation correction amount G to determine such vibration correction amount C as returns the number of pixels corresponding to the deviation to the original value. For example, the correction controller 52B returns the pitch angle deviation correction amount G to the original value and determines such vibration correction amount C as eliminates the image correction error E1.

Even with this configuration, it is possible to suppress positional deviation of the display position of the display content Iv with respect to the superimposition target. Specifically, when the vibration correction processing is performed after the image correction processing is performed, it is possible to suppress the positional deviation of the display position of the display content Iv due to the image correction error E1 of the image correction caused by the vibration correction processing. Accordingly, it is possible to suppress a decrease in correction accuracy of the display position of the display content Iv.

Fourth Embodiment

In the third embodiment, the calculation processing of the vibration correction amount C is switched based on the image processing time Td. In the present embodiment, the calculation processing of the vibration correction amount C is switched based on whether specific frequency vibration is generated.

Figure 23:
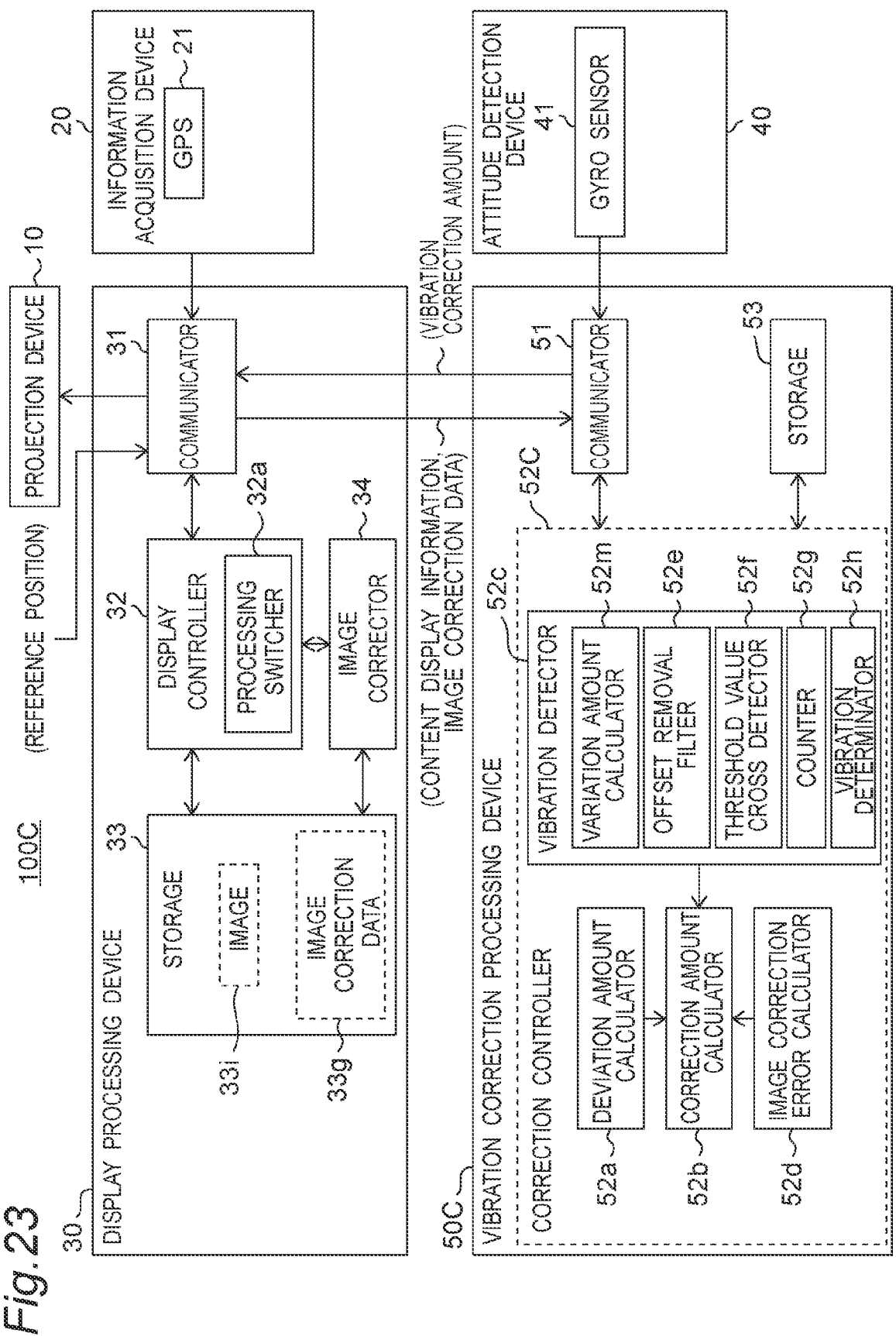
FIG. 23 is a block diagram showing an internal configuration of a display system in a fourth embodiment.

An internal configuration of a display system 100C will be described with reference to FIG. 23. FIG. 23 shows a block diagram showing an internal configuration of a display system 100C in the fourth embodiment. The display system 100C shown in FIG. 23 has the same configuration as the display system 100A of the second embodiment except that the correction controller 52C includes an image correction error calculator 52d. In addition, the image correction error calculator 52d of the fourth embodiment is similar to that of the third embodiment.

When the image correction processing is performed after the vibration correction processing, the correction amount calculator 52b calculates the vibration correction amount C based on the deviation amount y. In the present embodiment, the specific frequency vibration is vibration having a high-frequency band component. When vibration having a high-frequency band component has not been generated for a certain period of time or more, the correction amount calculator 52b calculates the vibration correction amount C based on the deviation amount y.

When the vibration correction processing is performed after the image correction processing, the correction amount calculator 52b calculates the vibration correction amount C based on the deviation amount y and the image correction error of the image correction processing caused by the vibration correction processing of correcting the display deviation caused by the attitude variation of the vehicle 200. In the present embodiment, when vibration having a high-frequency band component has been generated for a certain period of time or more, the correction amount calculator 52b calculates the vibration correction amount C based on the deviation amount y and the image correction error. Specifically, the correction amount calculator 52b calculates the vibration correction amount C based on the deviation amount y calculated by the deviation amount calculator 52a and the image correction error calculated by the image correction error calculator 52d.

Figure 24:
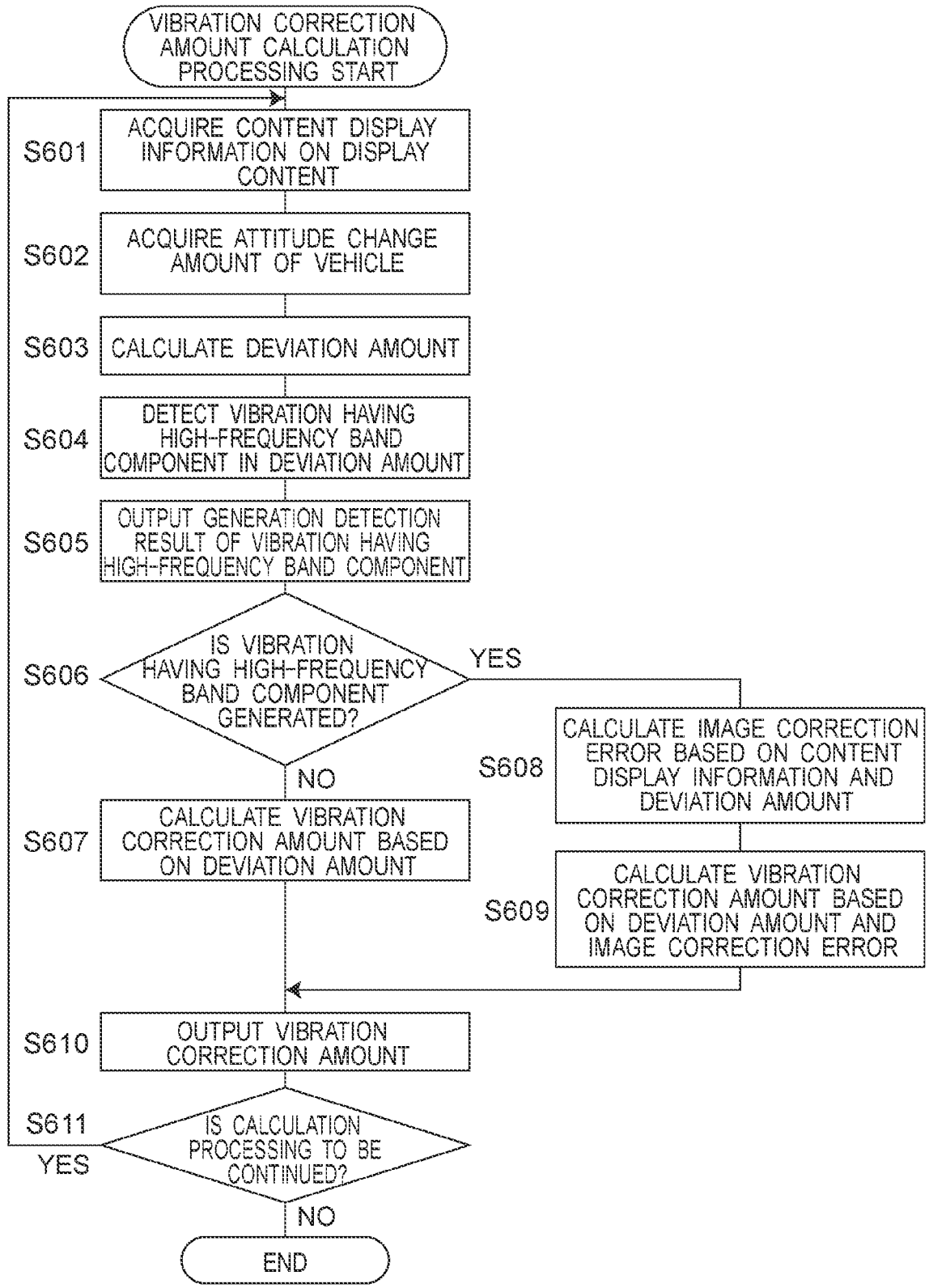
FIG. 24 is a flowchart showing calculation processing of a vibration correction amount in the fourth embodiment.

The operation of the correction controller 32C of the vibration correction processing device SOC according to the fourth embodiment will be described with reference to FIG. 24. FIG. 24 shows correction processing performed by the correction controller 52C of the vibration correction processing device 50C. Steps S601 to S603 and S607 to S611 in FIG. 24 are similar to steps S501 to S503 and S506 to S510 in FIG. 18 of the third embodiment. In addition, steps S604 and S605 in FIG. 24 are similar to steps S404 and S405 in FIG. 13 of the second embodiment.

The correction controller 52C acquires the content display information on the display content Iv from the display processing device 30 (S601). The correction controller 52C acquires the attitude change amount indicating the angular velocity of the vehicle 200 output from the gyro sensor 41 (S602). The correction controller 52C calculates the attitude of the vehicle 200, that is, the deviation amount y with respect to the triaxial direction based on the attitude change amount (S603). The correction controller 52C detects whether vibration having a high-frequency band component has been generated for a certain period of time or more in the deviation amount y (S604). The correction controller 52C outputs the detection result of vibration having a high-frequency band component to the display processing device 30 (S605).

The correction controller 52C switches the calculation processing of the vibration correction amount C based on the detection result of vibration having a high-frequency band component. Specifically, the correction controller 52C determines whether vibration having a high-frequency band component is generated (S606). If vibration having a high-frequency band component is not generated (No in S606), the correction controller 52C calculates the vibration correction amount C based on the deviation amount y (S607).

If vibration having a high-frequency band component is generated (Yes in S606), the correction controller 52C calculates the vibration correction amount C based on the deviation amount y and the image correction error. E1. Specifically, the correction controller 52C calculates the image correction error E1 based on the content display information, the deviation amount y, and the image correction value U (image correction data) (S608). After calculating the image correction error E1, the correction controller 52C calculates the vibration correction amount C based on the deviation amount y and the image correction error E1 (S609).

The correction controller 52C outputs the information on the vibration correction amount C to the display processing device 30 (S610).

The correction controller 52C determines whether to continue the calculation processing (S611). If the calculation processing is continued, the process returns to step S601.

As described above, in the present embodiment, when the processing switcher 32a switches the order of processing so as to perform the vibration correction processing after performing the image correction processing, the vibration correction processing device 50B calculates the vibration correction amount C based on the deviation amount y and the image correction error E1. Specifically, when the specific frequency vibration has been generated for a certain period of time or more, the vibration correction processing device 50B calculates the deviation amount y of the display position of the display content Iv based on the attitude change amount of the moving body. The vibration correction processing device 50B calculates an initial position x1 of the display content Iv based on the content display information output from the display processing device 30. The vibration correction processing device 50B calculates the image correction error E1 based on the initial position x1, the deviation amount y, and the image correction value U (image correction data). The vibration correction processing device 50B calculates the vibration correction amount C based on the deviation amount y and the image correction error E1.

With this configuration, it is possible to suppress positional deviation of the display position of the display content Iv with respect to the superimposition target. For example, when the vibration correction processing is performed after the image correction processing is performed when vibration having a high-frequency band component has been generated for a certain period of time or more, it is possible to suppress the positional deviation of the display position of the display content Iv due to the image correction error E1 of the image correction caused by the vibration correction processing. Accordingly, it is possible to suppress a decrease in correction accuracy of the display position of the display content Iv.

It should be noted that in the present embodiment, an example has been described in which when the processing switcher 32a switches the order of processing so as to perform the vibration correction processing after performing the image correction processing, the vibration correction processing device 50B calculates the vibration correction amount C based on the deviation amount y and the image correction error E1, but the present disclosure is not limited thereto. For example, the vibration correction processing device 50B may calculate the vibration correction amount C based on the deviation correction amount G based on the deviation amount y and the image correction error E1.

Figure 25:
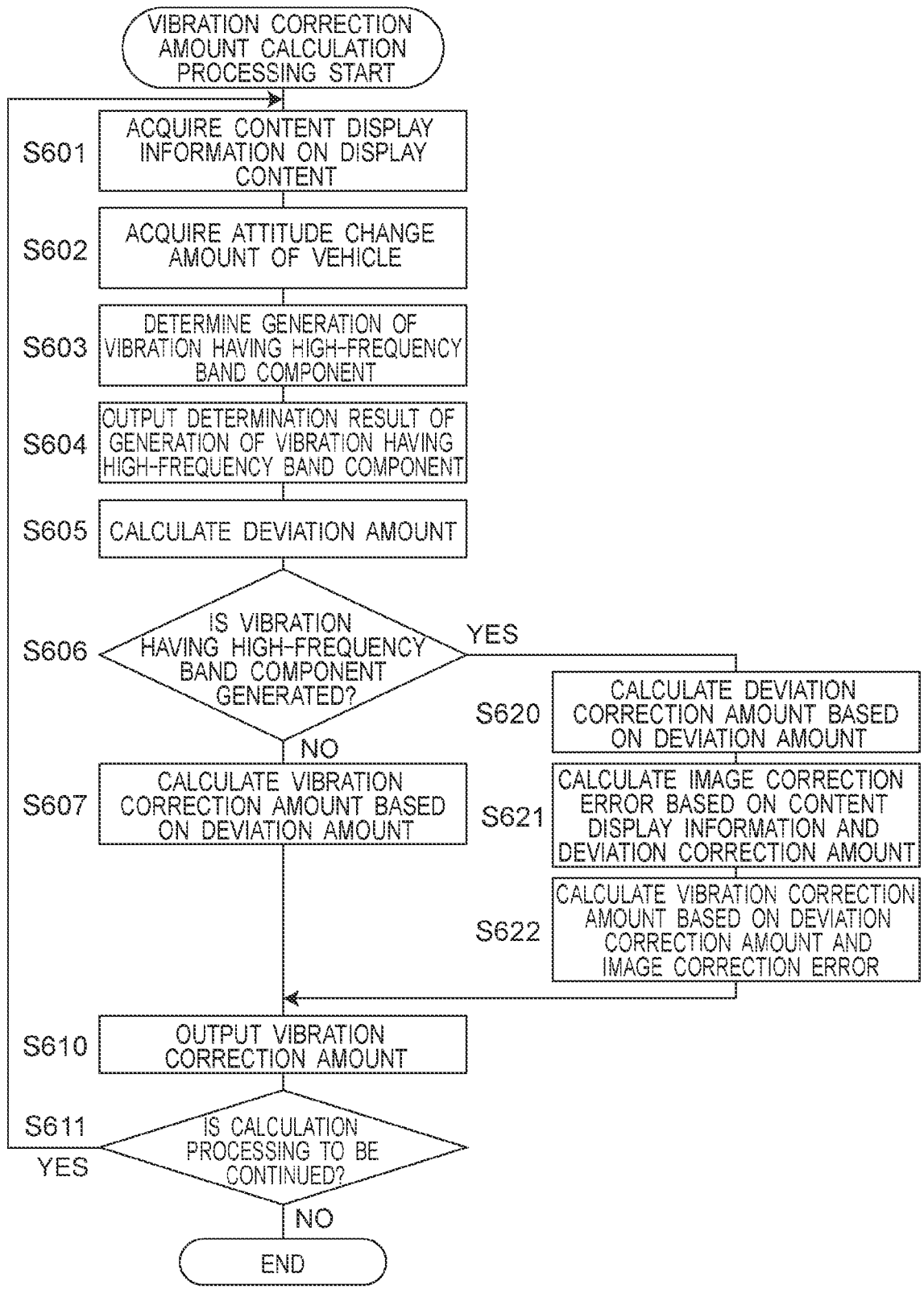
FIG. 25 is a flowchart showing calculation processing of a vibration correction amount according to a modification of the fourth embodiment.

FIG. 25 shows a flowchart showing calculation processing of a vibration correction amount C according to a modification of the fourth embodiment. The calculation processing of the vibration correction amount C in the modification shown in FIG. 25 includes steps S620 to S622 instead of steps S608 to S609 of the fourth embodiment shown in FIG. 22. Steps S620 to S622 show the calculation processing of the vibration correction amount C when the vibration correction processing is performed after the image correction processing. It should be noted that steps S620 to S622 are similar to steps S520 to S522 of the modification of the third embodiment shown in FIG. 21, and thus description thereof will be omitted.

Even with this configuration, it is possible to suppress positional deviation of the display position of the display content Iv with respect to the superimposition target. Specifically, when the vibration correction processing is performed after the image correction processing is performed, it is possible to suppress the positional deviation of the display position of the display content Iv due to the image correction error E1 of the image correction caused by the vibration correction processing. Accordingly, it is possible to suppress a decrease in correction accuracy of the display position of the display content Iv.

In the present embodiment, an example has been described in which the specific frequency vibration is vibration having a high-frequency band component, but the present disclosure is not limited thereto. For example, the specific frequency vibration may be vibration having a low frequency band component of a predetermined frequency band or less. The processing switcher 32a may switch the order of processing between the vibration correction processing and the image correction processing based on whether or not vibration having a low frequency band component has been generated for a certain period of time or more. Specifically, when vibration having a low frequency band component has been generated for a certain period of time or more, the processing switcher 32a may perform the image correction processing after performing the vibration correction processing. When vibration having a low frequency band component has not been generated for a certain period of time or more, the processing switcher 32a may perform the vibration correction processing after performing the image correction processing.

Fifth Embodiment

In the first to fourth embodiments, the order of the correction processing and the calculation processing of the vibration correction amount C are switched based on the image processing time Td or the detection result of vibration having a high-frequency band component of a specific frequency band or more. In the present embodiment, the order of the correction processing and the calculation processing of the vibration correction amount C are switched based on the first image correction error assigned to each of the plurality of partitioned areas of the display area.

The internal configuration of the display system of the fifth embodiment is similar to the internal configuration of the display system 100B of the third embodiment shown in FIG. 15. Therefore, in the fifth embodiment, the same reference numerals as those of the third embodiment will be used for description.

Figure 26:
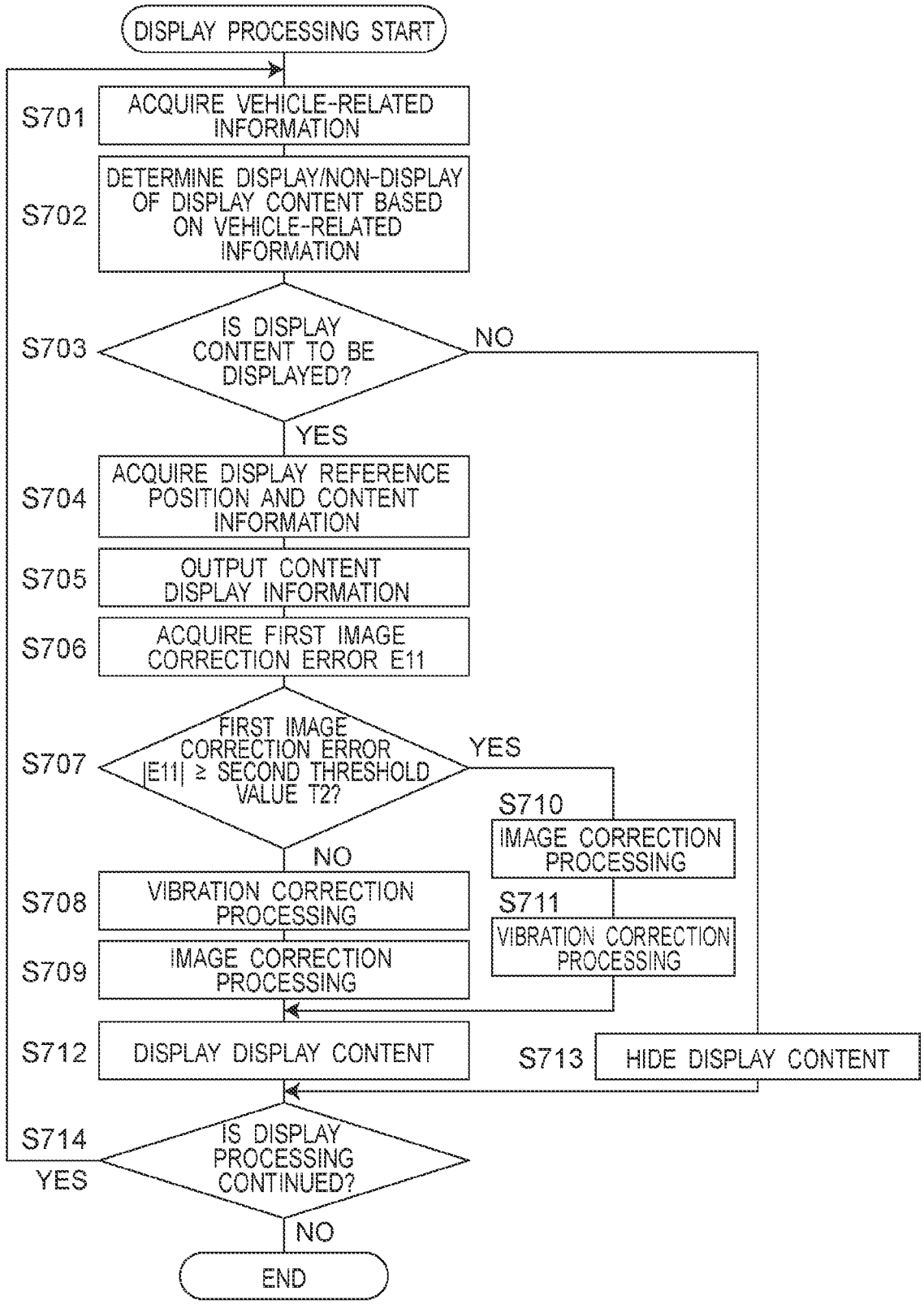
FIG. 26 is a flowchart showing display processing in a fifth embodiment.

The operation of the display controller 32 of the display processing device 30 in the fifth embodiment will be described with reference to FIG. 26. FIG. 26 shows display processing performed by the display controller 32 of the display processing device 30 according to the fifth embodiment. Steps S701 to S705 and S708 to S714 in FIG. 26 are similar to steps S101 to S105 and S108 to S114 in FIG. 7 of the first embodiment.

The display controller 32 acquires vehicle-related information including positional information on the vehicle 200 from the information acquisition device 20 (S701). The display controller 32 determines whether or not to display the display content Iv corresponding to the display target 230 based on the vehicle-related information (S702).

If determining to display the display content Iv (Yes in S703), the display controller 32 acquires the information indicating the display reference position P0 of the display content Iv from the external device and acquires the content information from the storage 33 (S704). The display controller 32 outputs the content display information to the vibration correction processing device 50B (S705).

The display controller 32 acquires the first image correction error E11 (S706). The first image correction error E11 is an image correction error caused by the change in the display position by the vibration correction processing after the image correction involving the change in the display position of the display content Iv. In the present embodiment, the first image correction error E11 is an error in consideration of the image correction errors of all the partitioned areas R11 to R64 in the display area 220 of the display content Iv.

The first image correction error E11 is calculated by a method similar to the method for calculating the image correction error E1 described in the third embodiment.

For example, the first image correction error E11 is calculated based on the initial position x1 and the deviation amount y of the display content Iv using the first correction value table shown in FIG. 20. Alternatively, the first image correction error E11 is calculated based on the initial position x1 and the deviation correction amount G of the display content Iv using the second correction value table shown in FIG. 22.

The first image correction error E11 is calculated by the vibration correction processing device 50B and output to the display processing device 30. The display processing device 30 acquires the first image correction error E11 from the vibration correction processing device 50B.

The processing switcher 32a of the display controller 32 switches the order of processing between the image correction processing and the vibration correction processing based on the first image correction error E11.

The processing switcher 32a determines whether the absolute value of the first image correction error E11 is greater than or equal to the second threshold value T2 (S707). If the absolute value of the first image correction error E11 is greater than or equal to the second threshold value T2 (Yes in S707), the display controller 32 switches the order of processing so as to perform the image correction processing after performing the vibration correction processing. That is, if the absolute value of the first image correction error E11 is greater than or equal to the second threshold value T2, the display processing device 30 first performs the vibration correction processing (S708). After performing the vibration correction processing, the display processing device 30 performs the image correction processing (S709).

If the absolute value of the first image correction error E11 is smaller than the second threshold value T2 (No in S707), the processing switcher 32a switches the order of processing so as to perform the vibration correction processing after performing the image correction processing. That is, if the absolute value of the first image correction error E11 is smaller than the second threshold value T2, the display processing device 30 performs the image correction processing (S710). After performing the image correction processing, the display processing device 30 performs the vibration correction processing (S711).

After performing the vibration correction processing and the image correction processing, the display controller 32 displays the display content Iv (S712).

If determining not to display the display content Iv (No in S703), the display controller 32 hides the display content Iv (S713).

The display controller 32 determines whether to continue the display processing (S714). If the display processing is continued, the process returns to step S701.

Figure 27:
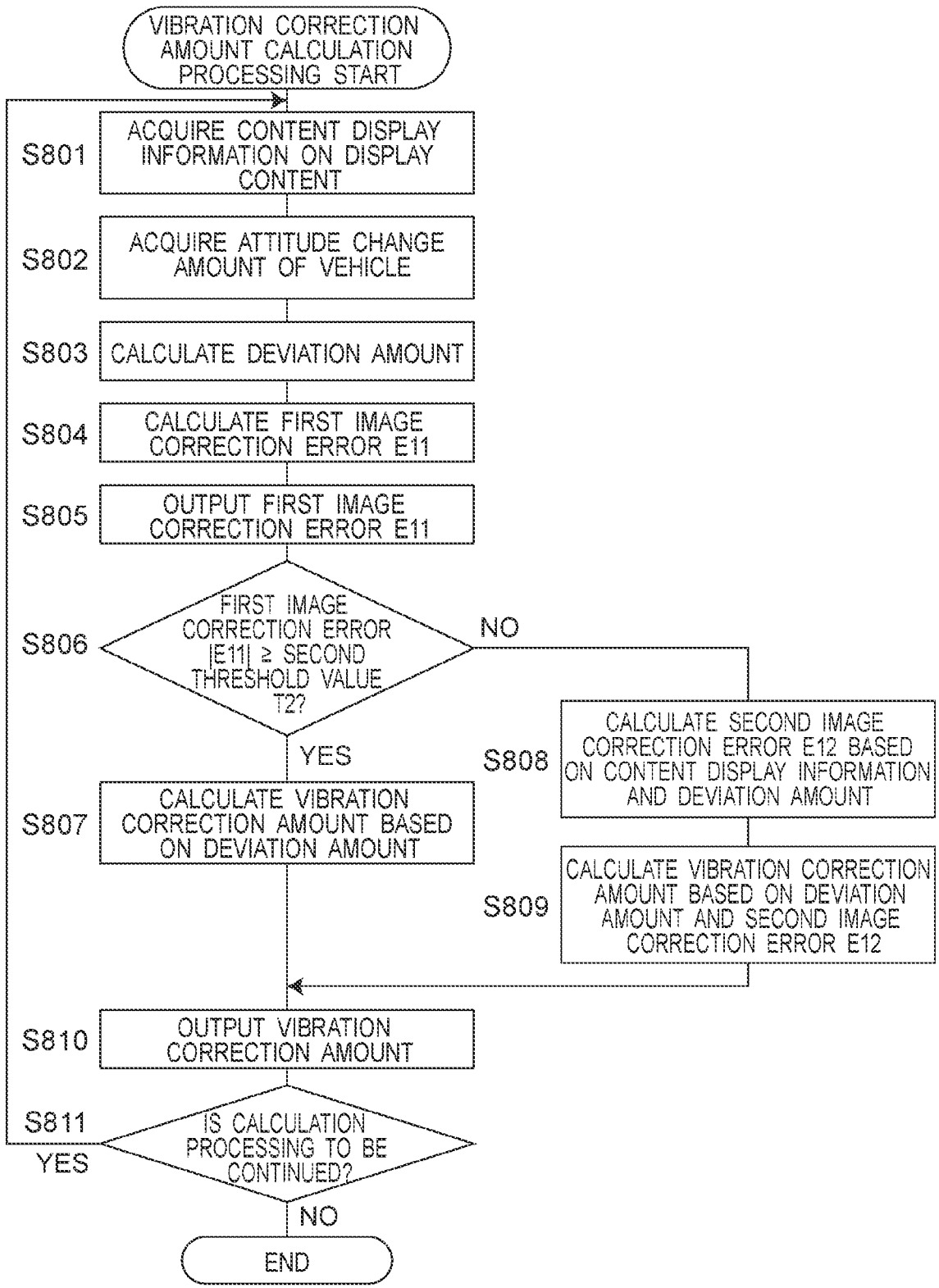
FIG. 27 is a flowchart showing calculation processing of a vibration correction amount in the fifth embodiment.

The operation of the correction controller 52B of the vibration correction processing device 50B according to the fifth embodiment will be described with reference to FIG. 27. FIG. 27 shows calculation processing of the vibration correction amount C performed by the correction controller 52B of the vibration correction processing device 50B according to the fifth embodiment. Steps S801 to S803 and S807 to S811 in FIG. 27 are similar to steps S501 to S503 and S506 to S510 in FIG. 18 of the third embodiment.

The correction controller 52B acquires the content display information on the display content Iv from the display processing device 30 (S801). The correction controller 52B acquires the attitude change amount indicating the angular velocity of the vehicle 200 output from the gyro sensor 41 (S802). The correction controller 52B calculates the attitude of the vehicle 200, that is, the deviation amount y with respect to the triaxial direction based on the attitude change amount (S803).

The correction controller 52B switches the calculation processing of the vibration correction amount C based on the first image correction error E11 and the second threshold value T2.

The correction controller 52B calculates the first image correction error E11 (S804). For example, similarly to the third embodiment, the correction controller 52B calculates the first image correction error E11 based on the initial position x1 and the deviation amount y of the display content iv using the first correction value table shown in FIG. 20. Alternatively, the correction controller 52B calculates the first image correction error E11 based on the initial position x1 and the deviation correction amount G of the display content Iv using the second correction value table shown in FIG. 22.

The correction controller 52B outputs the first image correction error E11 to the display processing device 30 (S805).

The correction controller 52B determines whether the absolute value of the first image correction error E11 is greater than or equal to the second threshold value T2 (S806). If the absolute value of the first image correction error E11 is greater than or equal to the second threshold value T2 (Yes in S806), the correction controller 52B calculates the vibration correction amount C based on the deviation amount y (S807).

If the absolute value of the first image correction error E11 is smaller than the second threshold value T2 (No in S806), the correction controller 52B calculates the vibration correction amount C based on the deviation amount y and the second image correction error E12. The second image correction error E12 is an image correction error of image correction caused by the vibration correction Processing of correcting the display deviation caused by the attitude variation of the vehicle 200. The second image correction error E12 corresponds to the image correction error E1 of the first to fourth embodiments. In the present embodiment, the second image correction error E12 is an image correction error of a feature portion of the display content Iv. Based on the content display information, the deviation amount y, and the image correction value U (image correction data), the correction controller 52B calculates a second image correction error E12 of the image correction caused by the vibration correction processing of correcting the display deviation caused by the attitude variation of the vehicle 200 (S808). The calculation of the second image correction error E12 is similar to the calculation of the image correction error E1 of the third embodiment. After calculating the second image correction error E12, the correction controller 52B calculates the vibration correction amount C based on the deviation amount y and the second image correction error E12 (S809).

The correction controller 52B outputs the information on the vibration correction amount C to the display processing device 30 (S810).

The correction controller 52B determines whether to continue the calculation processing (S811). If the calculation processing is continued, the process returns to step S801.

As described above, in the present embodiment, the processing switcher 32a switches the order of processing between the image correction processing and the vibration correction processing based on the first image correction error E11 caused by the change in the display position by the vibration correction processing after the image correction processing involving a change in the display position of the display content Iv.

With this configuration, it is possible to suppress positional deviation of the display position of the display content Iv with respect to the superimposition target. In the present embodiment, since the order of processing between the vibration correction processing and the image correction processing can be switched based on the first image correction error E11, the optimum processing can be performed according to the traveling status of the moving body. For example, when the first image correction error E11 is small, the delay time of the vibration correction processing can be shortened and the vibration correction error can be suppressed by performing the vibration correction processing after the image correction processing. When the first image correction error E11 is large, the accuracy of the image correction processing can be improved by performing the image correction processing after the vibration correction processing.

In addition, even when the display content Iv is updated and the display range changes, it is possible to suppress a decrease in correction accuracy of the display position of the display content Iv.

In addition, in the present embodiment, the calculation processing of the vibration correction amount C is switched based on the first image correction error E11 caused by the change in the display position by the vibration correction processing after the image correction processing involving a change in the display position of the display content Iv. Specifically, when the absolute value of the first image correction error E11 is greater than or equal to the second threshold value T2, the vibration correction processing device 50B calculates the vibration correction amount C based on the deviation amount y. If the absolute value of the first image correction error E11 is smaller than the second threshold value T2, the vibration correction processing device 50B calculates the vibration correction amount C based on the deviation amount y and the second image correction error E12. With this configuration, it is possible to further suppress positional deviation of the display position of the display content Iv with respect to the superimposition target. Specifically, when the vibration correction processing is performed after the image correction processing is performed, it is possible to suppress the positional deviation of the display position of the display content Iv due to the second image correction error E12 of the image correction caused by the vibration correction processing. Accordingly, it is possible to further suppress a decrease in correction accuracy of the display position of the display content Iv.

In the present embodiment, the first image correction error E11 is an error in consideration of the image correction errors of all the partitioned areas R11 to R64 in the display area 220 of the display content Iv, and the second image correction error E12 is an image correction error of a feature portion of the display content Iv. In the present embodiment, the quality (for example, the magnitude of the image correction error) of the entire display area 220 is determined by the first image correction error E11, that is, the minimum value or the average value of all the partitioned areas R11 to R64, and the second image correction error E12 is added in order to suppress the display deviation of a feature portion of the display content Iv.

It should be noted that in the present embodiment, an example has been described in which the display processing device 30 acquires the first image correction error E11 from the vibration correction processing device 50, but the present disclosure is not limited thereto. For example, the display processing device 30 may acquire the deviation amount y from the vibration correction processing device 50 and calculate the first image correction error E11 based on the initial position x1 and the deviation amount y of the display content Iv using the first correction value table.

Alternatively, the display processing device 30 may acquire the deviation correction amount G from the vibration correction processing device 50 and calculate the first image correction error E11 based on the initial position x1 and the deviation correction amount G of the display content Iv using the second correction value table.

In addition, when the first image correction error E11 is calculated by the display processing device 30, the vibration correction processing device 50B may acquire the first image correction error E11 from the display processing device 30.

In the present embodiment, an example has been described in which the processing switcher 32a switches the order of processing based on the first image correction error E11 and the second threshold value T2, but the present disclosure is not limited thereto. For example, the processing switcher 32a may switch the order of processing based on the minimum value or the average value of the first image correction error E11 and the second threshold value T2.

In the present embodiment, an example of calculating the first image correction error E11 and the second image correction error E12 has been described, but the present disclosure is not limited thereto. For example, when emphasis is put on the suppression of the display deviation of the feature portion of the display content Iv, the first image correction error E11 may be the same as the second image correction error E12.

In the present embodiment, an example has been described in which when the processing switcher 32a switches the order of processing so as to perform the vibration correction processing after performing the image correction processing, the vibration correction processing device 50B calculates the vibration correction amount C based on the deviation amount y and the second image correction error E12, but the present disclosure is not limited thereto. For example, the vibration correction processing device 50B may calculate the vibration correction amount C based on the deviation correction amount G based on the deviation amount y and the second image correction error E12.

Figure 28:
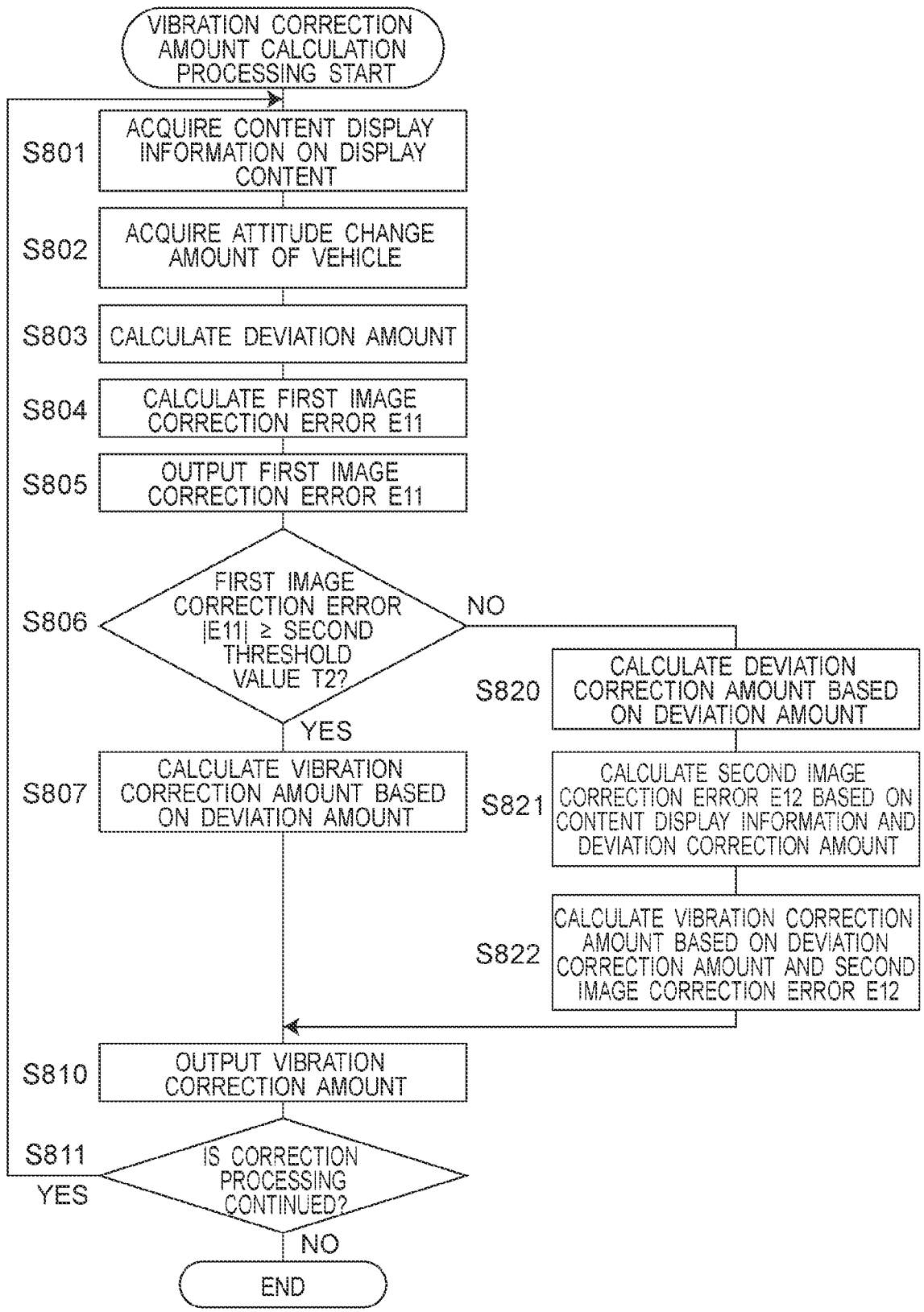
FIG. 28 is a flowchart showing calculation processing of a vibration correction amount according to a modification of the fifth embodiment.

FIG. 28 shows a flowchart showing calculation processing of a vibration correction amount C according to a modification of the fifth embodiment. The calculation processing of the vibration correction amount C of the modification shown in FIG. 28 includes steps S820 to S822 instead of steps S808 to S809 of the fifth embodiment shown in FIG. 27. Steps S820 to S822 show the calculation processing of the vibration correction amount C when the vibration correction processing is performed after the image correction processing. It should be noted that steps S820 to S822 are similar to steps S520 to S522 of the modification of the third embodiment shown in FIG. 21, and thus description thereof will be omitted.

Even with this configuration, it is possible to suppress positional deviation of the display position of the display content Iv with respect to the superimposition target. Specifically, when the vibration correction processing is performed after the image correction processing is performed, it is possible to suppress the positional deviation of the display position of the display content Iv due to the second image correction error E12 of the image correction caused by the vibration correction processing. Accordingly, it is possible to suppress a decrease in correction accuracy of the display position of the display content Iv.

Other Embodiments

As described above, the above embodiments have been described as examples of the technique disclosed in the present application. However, the technique in the present disclosure is not limited to this, and can also be applied to embodiments in which changes, substitutions, additions, omissions, and the like are made as appropriate. Thus, in the following, other embodiments will be exemplified.

In the above embodiments, the case where each of the projection device 10, the information acquisition device 20, the display processing device 30, the attitude detection device 40, and the vibration correction processing device 50 to 50C is a separate device has been exemplified. However, a plurality of devices may be integrally formed as one device. For example, the display processing device 30 and the vibration correction processing device 50 to 50C may be integrally formed as one device. The information acquisition device 20 and the display processing device 30 may be integrally formed as one device. The attitude detection device 40 and the vibration correction processing device 50 to 50C may be integrally formed as one device. The separately formed devices are communicably connected to each other by wire or wirelessly. It should be noted that all of the projection device 10, the information acquisition device 20, the display processing device 30, the attitude detection device 40, and the vibration correction processing device 50 to 50C may be formed as one device. In this case, the communicators 31 and 51 do not need to be provided.

In the above embodiments, an example in which the information acquisition device 20 includes the GPS module 21 has been described. However, the information acquisition device 20 may include a distance sensor that measures a distance and a direction from the vehicle 200 to a surrounding target object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of a GPS module 21, a distance sensor, a camera, an image processing device, an acceleration sensor, a radar, a sound wave sensor, a white line detection device of an advanced driver-assistance systems (ADAS), and the like. In this case, the GPS module 21, the distance sensor, the camera, and the like having a function as the information acquisition device 20 may be built in one device, or may be individually attached to the vehicle 200.

In the above embodiments, an example in which the attitude detection device 40 includes the gyro sensor 41 has been described. However, the attitude detection device 40 may include an acceleration sensor that detects acceleration of the vehicle 200, and may output the detected acceleration as the attitude change amount. The attitude detection device 40 may include a vehicle height sensor that detects a height from the road surface, and may output the detected height as an attitude change amount. The attitude detection device 40 may include other known sensors. The attitude detection device 40 may include one or more of a gyro sensor 41, an acceleration sensor, a vehicle speed sensor, and the like. In this case, the gyro sensor 41, the acceleration sensor, the vehicle height sensor, and the like having a function as the attitude detection device 40 may be built in one device, or may be individually attached to the vehicle 200.

In the above embodiments, an example in which the image corrector 34 is included in the display processing device 30 has been described, but the present disclosure is not limited thereto. For example, the image corrector 34 may be included in the vibration correction processing device 50 to 50C. Alternatively, the image corrector 34 may be included in another device other than the display processing device 30 and the vibration correction processing device 50 to 50C.

In the above embodiments, an example has been described in which the processing switcher 32a is included in the display controller 32, but the present disclosure is not limited thereto. The processing switcher 32a does not need to be included in the display controller 32. For example, the processing switcher 32a may be included in the vibration correction processing device 50 to 50C. Alternatively, the processing switcher 32a may be included in another device other than the display processing device 30 and the vibration correction processing device 50 to 50C.

In the above embodiments, an example in which the image corrector 34 is included in the display processing device 30 has been described, but the present disclosure is not limited thereto. The image corrector 34 may be included in the vibration correction processing device 50 to 50C.

In the above embodiments, the case where the moving body is the vehicle 200 such as an automobile has been described. However, the moving body is not limited to the vehicle 200. The moving body may be a vehicle that travels on the ground, and may be, for example, a train or a motorcycle. The moving body may be a drone capable of traveling by automated driving.

In the above embodiments, the case where the image is displayed in front of the moving body has been described. However, the position where the image is displayed is not limited to the front. For example, the image may be displayed in the side direction or the rear of the moving body.

In the above embodiments, an example in which the display system 100 to 1000 is an HUD system has been described. However, the display system 100 to 100C does not need to be an HUD system. The display system 100 to 100C may include a liquid crystal display or an organic EL display instead of the projection device 10. The display system 100 to 100C may include a screen and a projector.

(Outline of Embodiments)

(1) A display system of the present disclosure which controls a display of display content, includes: a processor; and a memory having stored thereon instructions executable by the processor. The instructions include: performing image correction processing involving a change in the display position of the display content based on image correction data stored in advance; detecting an attitude change amount of a moving body; calculating a vibration correction amount of the display position of the display content based on the attitude change amount of the moving body; switching an order of processing between image correction processing involving a change in the display position of the display content and vibration correction processing of correcting the display position of the display content based on the vibration correction amount; and controlling the display position of the display content by performing the image correction processing and the vibration correction processing based on the order of the processing. Accordingly, the positional deviation of the display position of the display content can be suppressed.

(2) In the display system according to (1), the switching the order of the processing may include acquiring an image processing time of the image correction processing, and switching the order of the processing between the image correction processing and the vibration correction processing based on the image processing time.

(3) In the display system according to (2), the switching the order of the processing based on the image processing time may include: when the image processing time is equal to or less than a first threshold value, switching the order of the processing so that the image correction processing is performed after the vibration correction processing is performed, or when the image processing time is larger than a first threshold value, switching the order of the processing so that the vibration correction processing is performed after the image correction processing is performed.

(4) In the display system according to (1), the instructions may further include detecting that vibration having a specific frequency band component has been generated for a certain period of time or more in attitude variation of the moving body, and switching the order of the processing between the image correction processing and the vibration correction processing based on a detection result.

(5) In the display system according to (4), the vibration having the specific frequency band component may be high-frequency vibration having a high-frequency band component, the switching the order of the processing based on a detection result includes: when the high-frequency vibration has been generated for a certain period of time or more, switching the order of the processing so that the vibration correction processing is performed after the image correction processing is performed, and when the high-frequency vibration has not been generated for a certain period of time or more, switching the order of the processing so that the image correction processing is performed after the vibration correction processing is performed.

(6) In the display system according to (1), the switching the order of the processing may include: acquiring a first image correction error caused by a change in a display position by vibration correction processing after the image correction processing involving the change in the display position of the display content, and switching the order of the processing between the image correction processing and the vibration correction processing based on the first image correction error.

(7) In the display system according to (6), the switching the order of the processing based on the first image correction error may include: when an absolute value of the first image correction error is greater than or equal to a second threshold value, switching the order of the processing so that the image correction processing is performed after the vibration correction processing is performed, or when an absolute value of the first image correction error is smaller than a second threshold value, switching the order of the processing so that the vibration correction processing is performed after the image correction processing is performed.

(8) In the display system according to any one of (1) to (7), when t switching the order of the processing so that the vibration correction processing is performed after the image correction processing is performed, the calculating the vibration correction amount may include: calculating a deviation amount of the display position of the display content based on an attitude change amount of the moving body, calculating an initial position of the display content based on content display information, calculating a second image correction error of the image correction processing caused by the vibration correction processing based on the initial position, the deviation amount, and the image correction data, and calculating the vibration correction amount based on the deviation amount and the second image correction error.

(9) In the display system according to (8), the memory may store a first correction value table to which a first correction value of the image correction processing corresponding to the deviation amount from the initial position is assigned, and the calculating the second image correction error may include calculating the second image correction error based on the initial position, the deviation amount, and the first correction value table.

(10) In the display system according to any one of (1) to (7), the calculating the vibration correction amount may include: calculating a deviation amount of the display position of the display content based on an attitude change amount of the moving body, calculating a deviation correction amount based on the deviation amount, calculating an initial position of the display content based on content display information output from the display processing device, calculating a second image correction error of the image correction processing caused by the vibration correction processing based on the initial position, the deviation correction amount, and the image correction data, and calculating the vibration correction amount based on the deviation correction amount and the second image correction error.

(11) In the display system according to (10), the memory may store a second correction value table to which a second correction value of the image correction processing corresponding to the deviation correction amount from the initial position is assigned, and the calculating the second image correction error may include calculating the second image correction error based on the initial position, the deviation correction amount, and the second correction value table.

(12) In the display system according to any one of (1) to (11), the controlling the display position of the display content may include controlling a display position of a feature portion that determines a shape of the display content at least.

(13) In the display system according to any one of (1) to (12), the performing the image correction processing may include performing distortion correction of the display content.

(14) In the display system according to any one of (1) to (13), the instructions may include projecting light representing the display content.

(15) In the display system according to any one of (1) to (14), the moving body may be a vehicle, and the display content may be content to be displayed in front of a windshield of a vehicle.

The present disclosure is applicable to a display system that controls a display position of display content according to movement of a moving body.

The invention claimed is:
1. A display system which controls a display of display content, comprising:
   a processor; and
   a memory having stored thereon instructions executable by the processor to carry out a method comprising:
   performing an image correction processing involving a change in a display position of the display content based on image correction data stored in advance;
   detecting an attitude change amount of a moving body;
   calculating a vibration correction amount of the display position of the display content based on the attitude change amount of the moving body;
   switching, based on an image processing time of the image correction processing or vibration having a specific frequency band component of vibration correction processing of correcting the display position of the display content based on the vibration correction amount, an order of processing between the image correction processing and the vibration correction processing; and
   controlling the display position of the display content by performing the image correction processing and the vibration correction processing based on the order of the processing to shorten a delay time of a change of the display position of the display content or to improve a correction accuracy of the image correction processing.

2. The display system according to claim 1,
wherein the switching the order of the processing includes:
acquiring the image processing time of the image correction processing, and
switching the order of the processing between the image correction processing and the vibration correction processing based on the image processing time.

3. The display system according to claim 2,
wherein the switching the order of the processing based on the image processing time includes:
when the image processing time is equal to or less than a first threshold value, switching the order of the processing so that the image correction processing is performed after the vibration correction processing is performed, or
when the image processing time is larger than a first threshold value, switching the order of the processing so that the vibration correction processing is performed after the image correction processing is performed.

4. The display system according to a claim 2,
wherein when switching the order of the processing so that the vibration correction processing is performed after the image correction processing is performed, the calculating the vibration correction amount includes:
calculating a deviation amount of the display position of the display content based on the attitude change amount of the moving body,
calculating an initial position of the display content based on content display information,
calculating a second image correction error of the image correction processing caused by the vibration correction processing based on the initial position, the deviation amount, and the image correction data, and
calculating the vibration correction amount based on the deviation amount and the second image correction error.

5. The display system according to claim 4,
wherein the memory stores a first correction value table to which a first correction value of the image correction processing corresponding to the deviation amount from the initial position is assigned, and
wherein the calculating the second image correction error includes calculating the second image correction error based on the initial position, the deviation amount, and the first correction value table.

6. The display system according to claim 2,
wherein the calculating the vibration correction amount includes:
calculating a deviation amount of the display position of the display content based on the attitude change amount of the moving body,
calculating a deviation correction amount based on the deviation amount,
calculating an initial position of the display content based on content display information,
calculating a second image correction error of the image correction processing caused by the vibration correction processing based on the initial position, the deviation correction amount, and the image correction data, and
calculating the vibration correction amount based on the deviation correction amount and the second image correction error.

7. The display system according to claim 6,
wherein the memory stores a second correction value table to which a second correction value of the image correction processing corresponding to the deviation correction amount from the initial position is assigned, and wherein the calculating the second image correction error includes calculating the second image correction error based on the initial position, the deviation correction amount, and the second correction value table.

8. The display system according to claim 2,
wherein the controlling the display position of the display content includes controlling a display position of a feature portion that determines at least a shape of the display content.

9. The display system according to claim 1,
wherein the method further includes detecting that the vibration having the specific frequency band component has been generated for a certain period of time or more in attitude variation of the moving body, and
switching the order of the processing between the image correction processing and the vibration correction processing based on a detection result.

10. The display system according to claim 9,
wherein the vibration having the specific frequency band component is high-frequency vibration having a high-frequency band component,
wherein the switching the order of the processing based on a detection result includes:
when the high-frequency vibration has been generated for the certain period of time or more, switching the order of the processing so that the vibration correction processing is performed after the image correction processing is performed, and
when the high-frequency vibration has not been generated for a certain period of time or more, switching the order of the processing so that the image correction processing is performed after the vibration correction processing is performed.

11. The display system according to claim 1,
wherein the switching the order of the processing includes:
acquiring a first image correction error caused by the change in the display position by the vibration correction processing after the image correction processing involving the change in the display position of the display content, and
switching the order of the processing between the image correction processing and the vibration correction processing based on the first image correction error.

12. The display system according to claim 11,
wherein the switching the order of the processing based on the first image correction error includes:
when an absolute value of the first image correction error is greater than or equal to a second threshold value, switching the order of the processing so that the image correction processing is performed after the vibration correction processing is performed, or
when an absolute value of the first image correction error is smaller than a second threshold value, switching the order of the processing so that the vibration correction processing is performed after the image correction processing is performed.

13. The display system according to a claim 1,
wherein when switching the order of the processing so that the vibration correction processing is performed after the image correction processing is performed, the calculating the vibration correction amount includes:
calculating a deviation amount of the display position of the display content based on an attitude change amount of the moving body, calculating an initial position of the display content based on content display information,
calculating a second image correction error of the image correction processing caused by the vibration correction processing based on the initial position, the deviation amount, and the image correction data, and
calculating the vibration correction amount based on the deviation amount and the second image correction error.

14. The display system according to claim 13,
wherein the memory stores a first correction value table to which a first correction value of the image correction processing corresponding to the deviation amount from the initial position is assigned, and
wherein the calculating the second image correction error includes calculating the second image correction error based on the initial position, the deviation amount, and the first correction value table.

15. The display system according to claim 1,
wherein the calculating the vibration correction amount includes:
calculating a deviation amount of the display position of the display content based on the attitude change amount of the moving body,
calculating a deviation correction amount based on the deviation amount,
calculating an initial position of the display content based on content display information,
calculating a second image correction error of the image correction processing caused by the vibration correction processing based on the initial position, the deviation correction amount, and the image correction data, and
calculating the vibration correction amount based on the deviation correction amount and the second image correction error.

16. The display system according to claim 15,
wherein the memory stores a second correction value table to which a second correction value of the image correction processing corresponding to the deviation correction amount from the initial position is assigned, and
wherein the calculating the second image correction error includes calculating the second image correction error based on the initial position, the deviation correction amount, and the second correction value table.

17. The display system according to claim 1,
wherein the controlling the display position of the display content includes controlling a display position of a feature portion that determines at least a shape of the display content.

18. The display system according to claim 1,
wherein the performing the image correction processing includes performing distortion correction of the display content.

19. The display system according to claim 1,
wherein the method further includes projecting light representing the display content.

20. The display system according to claim 1,
wherein the moving body is a vehicle, and
wherein the display content is content to be displayed in front of a windshield of the vehicle.

* * * * *